(12) United States Patent
Matsuyama

(10) Patent No.: US 6,330,068 B1
(45) Date of Patent: Dec. 11, 2001

(54) IMAGE STORING APPARATUS, IMAGE CONTROL APPARATUS, OUTPUT CONTROL APPARATUS, INFORMATION PROCESSING APPARATUS, SYSTEM OF THESE APPARATUSES, PRINT CONTROL METHOD THEREFOR, AND STORAGE MEDIUM STORING COMPUTER READABLE PROGRAM REALIZING PRINT CONTROL

(75) Inventor: Yoichi Matsuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/064,510

(22) Filed: Apr. 23, 1998

(30) Foreign Application Priority Data

Apr. 24, 1997 (JP) .................................................. 9-107341
Apr. 13, 1998 (JP) ................................................. 10-101044

(51) Int. Cl.⁷ ............................. B41B 15/00; G03F 3/10; H04N 1/46
(52) U.S. Cl. ......................... 358/1.14; 358/1.15; 358/1.2; 358/1.18; 358/527; 358/537; 358/538
(58) Field of Search ..................... 358/1.2, 1.13, 358/1.15, 1.1, 1.6, 1.18, 527, 444, 537, 538, 1.14, 1.16; 707/506, 508, 517; 364/479.05

(56) References Cited

U.S. PATENT DOCUMENTS

| | | | |
|---|---|---|---|
| 5,327,265 | * | 7/1994 | McDonald .......................... 358/527 |
| 5,930,810 | * | 7/1999 | Farros et al. ........................ 707/506 |
| 5,995,723 | * | 11/1999 | Sperry et al. ....................... 358/1.15 |

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

A load on a network image server is reduced during print services via a network. In a print system, images used for editing by a client computer are changed to images of a low resolution, editing information representative of a history of editing and a print order are transmitted to a print controller, and the images are printed by an optimum print server. Images of a high resolution used for printing are not transmitted from the client so that a load on the client can be reduced and a load on data transmission of the network can also be reduced.

125 Claims, 34 Drawing Sheets

FIG. 6

```
#UserID A00001
#PageRange 1, 1
#Copies 1
#Payment cash

#[document 0 0 297 210
[page 1 text("Times New Roman", 48, "Italic", 50, 30,
 "Flower") ;

circle(70, 20, 10, 2) ;
circle(70, 20, 5, 2) ;

image(5, 5, ("http:// image. canon. co. jp/public
/ flower. fpx", 1, ((1, 0)))) ;

#]page
#]document
```

FIG. 8

| ID OF PRINT SERVER A | ID OF IMAGE FILE A | ID OF IMAGE TILE A | FILE NAME OF IMAGE TILE CACHE A-A |
| --- | --- | --- | --- |
| NONE | ID OF IMAGE FILE B | ID OF IMAGE TILE C | NONE |
| | | ........ | |

9001, 9002, 9003, 9004

1507 IMAGE TILE TABLE

FIG. 9

| | |
|---|---|
| ID OF PRINT SERVER A (9001) | NO. OF HITS IN IMAGE TILE CACHE FOR PRINT SERVER A (9006) |
| ID OF PRINT SERVER B | NO. OF HITS IN IMAGE TILE CACHE FOR PRINT SERVER B |
| ID OF PRINT SERVER C | NO. OF HITS IN IMAGE TILE CACHE FOR PRINT SERVER C |
| ⋮ | |

1508
IMAGE CACHE HIT TABLE

FIG. 10

```
#UserID A00001
#PageRange 1, 1
#Copies 1
#Payment cash

#[document 0 0 297 210
[page 1 text("Times New Roman", 48, "Italic", 50, 30,
 "Flower") ;

circle(70, 20, 10, 2) ;
circle(70, 20, 5, 2) ;

image(5, 5, (("http: // image. canon. co. jp / public
 / flower. fpx", (2, 0) ("http: // image. canon. co.
 jp / public / flower. fpx", (3, 0), "http: / print1.
 xxx. co. jp / cache / a01763. til") ("http: // image.
 canon. co. jp/public / flower. fpx", (2, 1), "http:
 // print1. xxx. co. jp / cache/s76533. til") ("http: /
 / image. canon. co. jp / public / flower. fpx", (3, 1),
 "http: / print5. yyy. co. jp / cache / t88844. til")))
 ;

#]page
#]document
```

FIG. 12

| 9001 | 9002 | 9003 | 9004 | 9005 |
|---|---|---|---|---|
| ID OF PRINT SERVER A | ID OF IMAGE FILE A | ID OF IMAGE TILE A | FILE NAME OF IMAGE TILE CACHE A-A | DISCARD TIME OF IMAGE TILE CACHE A-A |
| ID OF PRINT SERVER A | ID OF IMAGE FILE B | ID OF IMAGE TILE C | FILE NAME OF IMAGE TILE CACHE B-C | DISCARD TIME OF IMAGE TILE CACHE B-C |
| ........ | | | | |

1606 IMAGE TILE TABLE

FIG. 13

|  |  |
|---|---|
| FILE NAME OF IMAGE TILE CACHE A (9004) | ID OF IMAGE TILE A (9003) |
| FILE NAME OF IMAGE TILE CACHE B | ID OF IMAGE TILE B |
| ⋮ | ⋮ |

1607 IMAGE TILE FILE TABLE

FIG. 14

```
#UserID A00001
#PageRange 1, 1
#Copies 1
#Payment cash

#[document 0 0 297 210
[page 1 text("Times New Roman", 48, "Italic", 50, 30,
Flower") ;

circle(70, 20, 10, 2) ;
circle(70, 20, 5, 2) ;

image(5, 5, (("/cache/i02335.til", (2, 0) ("/cache/
u04337.til", (3, 0)) ("/cache/h08568.til", (2, 1)) ("
/cache/n24551.til", (3, 1))) ;

#]page
#]document
```

FIG. 17

| ID OF PRINT SERVER A | ID OF IMAGE FILE A | ID OF IMAGE TILE A | FILE NAME OF IMAGE TILE CACHE A-A | DISCARD TIME OF IMAGE TILE CACHE A-A |
|---|---|---|---|---|
| ID OF PRINT SERVER A | ID OF IMAGE FILE B | ID OF IMAGE TILE C | FILE NAME OF IMAGE TILE CACHE B-C | DISCARD TIME OF IMAGE TILE CACHE B-C |
| . . . . . . . . | | | | |

9001, 9002, 9003, 9004, 9005

1506 IMAGE CACHE INFORMATION TABLE

FIG. 24

| 9001 | 9002 | 9003 | 9004 | 9005 |
|---|---|---|---|---|
| ID OF PRINT SERVER A | ID OF IMAGE FILE A | ID OF IMAGE TILE A | FILE NAME OF IMAGE TILE CACHE A-A | DISCARD TIME OF IMAGE TILE CACHE A-A |
| ID OF PRINT SERVER A | ID OF IMAGE FILE B | ID OF IMAGE TILE C | FILE NAME OF IMAGE TILE CACHE B-C | DISCARD TIME OF IMAGE TILE CACHE B-C |
| ........ | | | | |

1608 IMAGE CACHE INFORMATION TABLE

FIG. 29

| USER ID |
|---|
| AXE0012 |
| BTU0156 |
| : |

FIG. 30

| USER ID | PASSWORD | ASSIGNED MEM AMOUNT | REMAINING MEM AMOUNT |
|---|---|---|---|
| AXE0012 | %$#∗LO#W | 20MB | 10MB |
| BUT0156 | +0#Q&%$# | 30MB | 5MB |
| : | : | : | : |

FIG. 31

| ASSIGNED MEM AMOUNT | MONTHLY CHARGE |
|---|---|
| 20MB | ¥2,000 |
| 30MB | ¥3,000 |
| : | : |

FIG. 32

LOGIN

USER ID :

PASSWORD :

LOGIN

FIG. 34

CONFIRMATION

IT IS REQUIRED TO INCREASE ASSIGNED MEM AMOUNT TO 30BM SO AS TO REGISTER SELECTED IMAGE FILE. MONTHLY CHARGE WILL BE ¥3,000. WILL YOU INCREASE MEM AMOUNT TO REGISTER IMAGE FILE ?

YES    NO

IMAGE STORING APPARATUS, IMAGE CONTROL APPARATUS, OUTPUT CONTROL APPARATUS, INFORMATION PROCESSING APPARATUS, SYSTEM OF THESE APPARATUSES, PRINT CONTROL METHOD THEREFOR, AND STORAGE MEDIUM STORING COMPUTER READABLE PROGRAM REALIZING PRINT CONTROL

BACKGROUND OF THE INVENTION

1. Field of the Invention

The present invention relates to an image storing apparatus for storing images, an image control apparatus for transmitting a print order to a print command in response to a print order from a client, an output control apparatus for printing an image in accordance with the print command from the image control apparatus, an information processing apparatus for registering image data in the image storing apparatus, respectively running on a network realizing print services, a system of these apparatuses, a print control method for the system, and to a storage medium storing a computer readable program realizing the print control.

2. Related Background Art

The following methods have been incorporated in using print services on a network. A client which wishes to edit images receives editing images from an image storing apparatus on the network, edits the received images, and transmits the edited image data and a print order to an image control apparatus on the network.

Upon reception of the print order of image data from the client on the network, the image control apparatus (print controller) transmits a print command including the image data to an output control apparatus (print server) which then print the image data. In this case, character string data, graphic data and the like other than the image data are developed into print images and thereafter transmitted to the output control apparatus.

Upon reception of the print command from the image control apparatus on the network, the output control apparatus prints the image data contained in the print command, by using a printer engine.

In a conventional system in which image data is registered in an image server (image storing apparatus) via a network, a user space of the server has a limitation, the user space being used for storing registered image data and a charge for this space being billed to the user. In the case of a home page, for example, a provider lends a space of 5 to 10 MB to a user which can form a home page as desired so long as the memory amount does not exceed this limit. However, if image data is registered more than this limit, the provider gives the user an alarm via an electronic mail or the like, with a predetermined grace time. If the memory amount continues to exceed even after this grace time, an additional charge is billed to the user.

With the conventional methods described above, a client is required to receive editing image data of high resolution from the image storing apparatus. Furthermore, even after editing, image data of high resolution is required to be transmitted back to the image control apparatus. Accordingly, a load on data transmission on the network becomes large and it takes a long time to transmit data. Particularly, when print services are used on the Internet, a connection charge becomes large and the user has a large economic burden.

Further, since character string data, graphic data and the like in the print data contained in a print order transmitted from a client to an image control apparatus on the network, are developed into image data and thereafter transmitted. Therefore, image data, particularly image data having a number of colors, has a large data amount so that a load on data transmission on the network becomes large, and that a load on the image control apparatus receiving print orders from a number of clients becomes large and processing print orders is delayed.

Furthermore, since necessary image data is transmitted always from the image server having original image data, a load on the image server becomes large.

Still further, with the conventional methods, even if a user unintentionally registers image data in excess of a limit space, this excessive registration cannot be recognized at that time so that the registration cannot be stopped or other countermeasures cannot be performed.

An alarm by an electronic mail or the like may not be read by the user so that there is a possibility of billing an additional charge while the user does not recognize.

SUMMARY OF THE INVENTION

The present invention has been made in consideration of the above problems. The image control apparatus of this invention has the following configurations.

The image control apparatus comprises: receiving means for receiving editing information of image data stored in an image storing apparatus from a client; determining means for determining an output destination of output control apparatuses in accordance with the editing information received by the receiving means; and outputting means for outputting a print order corresponding to the editing information to the output destination of the control apparatuses determined by the determining means.

The image control apparatus further comprises managing means for storing and managing identification information of the output control apparatuses and image data stored in the output control apparatuses.

The managing means receives the identification information for identifying the image data stored in the output control apparatuses, from the output control apparatuses.

The determining means determines as the output destination the output control apparatus having a largest amount of image data designated by the editing information, in accordance with the identification information stored and managed by the managing means.

The image control apparatus further comprises instructing means for instructing the image storing apparatus to transmit image data not stored in the output control apparatus determined as the output destination by the determining means, to the output control apparatus.

The print order transmitted to the output control apparatus includes information of image data of a high resolution converted from image data of a low resolution designated by the editing information.

The identification information stored and managed by the managing means includes information of a time when image data is discarded, and after this time lapses, a corresponding identification information is deleted.

The image control apparatus further comprises name setting means for setting an optional file name of image data stored in the output control apparatus.

The image control apparatus further comprises: storing means for storing image data of a plurality of resolutions for each set of image data; and controlling means responsive to a request from the client for controlling to transmit image data of a low resolution to the client and for controlling to transmit image data of a high resolution to be used for the editing information received from the client, to the output control apparatus.

The managing means stores and manages the identification information in the unit of a plurality of tiles divided from each set of image data.

The editing information is described in a script format.

The client and the output control apparatus are interconnected via the Internet.

An image storing apparatus of this invention connected to a client and an output control apparatus via a network, comprises: storing means for storing image data of a plurality of resolutions for each set of image data; and controlling means responsive to a request from the client for controlling to transmit image data of a low resolution to the client and for controlling to transmit image data of a high resolution corresponding to the image data of the low resolution to the output control apparatus.

The controlling means executes a control operation after an instruction of transmitting the image data of the high resolution to the output control apparatus is received from an external apparatus different from the output control apparatus.

The controlling means controls to transmit image data in the unit of tile to the client or to the output control apparatus.

The image storing apparatus further comprises registering means for registering externally input image data in the storing means.

The image storing apparatus further comprises notifying means for comparing a memory amount permitted to an external apparatus transmitted image data with the image data, during a registration process by the registering means, and notifying a comparison result to the external apparatus.

If an instruction of increasing the memory amount is received from the external apparatus, the memory amount permitted to the external apparatus is increased.

The image storing apparatus is connected to the client or to the output control apparatus via the Internet.

An output control apparatus of this invention connected to an image control apparatus via a network, comprises: receiving means for receiving editing information from the image control apparatus; acquiring means for acquiring image data from an external apparatus in accordance with the editing information; and editing means for editing the image data acquired by the acquiring means in accordance with the editing information to generate output data.

The output control apparatus further comprises storing means for storing the image data acquired by the acquiring means, wherein the editing means generates output image data of one page from the image data acquired by the acquiring means and the image data stored in the storing means.

The acquiring means acquires image data of a high resolution from the image control apparatus.

The acquiring means acquires image data of a high resolution from an image storing apparatus which stores image data of a plurality of resolutions for each set of image data.

The output control apparatus further comprises erasing means for erasing image data stored in the storing means, wherein the erasing means erases the image data stored in the storing means when a predetermined time lapses.

The output control apparatus further comprises printing means for printing the output data edited by the editing means.

The output control apparatus further comprises notifying means for notifying the image control apparatus of identification information of the image data stored in the storing means.

The editing information is data described in a script format.

The output control apparatus is connected to the image control apparatus via the Internet.

An information processing apparatus of this invention connected to an image storing apparatus storing image data via a network, comprises: registration instructing means for transmitting an instruction of registering image data in the image storing apparatus; receiving means for receiving image data of a low resolution corresponding to the image data registered in the image storing apparatus; editing means for editing the received image data; and print requesting means for instructing an external apparatus to print editing information representative of the contents edited by the editing means, excepting the image data.

The registration instructing means transmits identification information of the information processing apparatus to the image storing apparatus, and after an access permission is obtained, transmits image data to the image storing apparatus.

The information processing apparatus further comprises displaying means for displaying, when image data is registered in response to an instruction from the registration instructing means and a notice of insufficient memory amount is received from the image storing apparatus, this effect.

The information processing apparatus further comprises instructing means for instructing, when image data is registered in response to an instruction from the registration instructing means and a notice of insufficient memory amount is received from the image storing apparatus, whether or not the memory amount is increased, wherein if the instructing means instructs to increase the memory amount in the image storing apparatus assigned to the information processing apparatus, this effect is notified to the image storing apparatus.

The information processing apparatus is connected to the image storing apparatus via the Internet.

In a print system of this invention connected to a client, an image control apparatus, an image storing apparatus, and output control apparatuses via an network, the image storing apparatus comprises: storing means for storing image data of a plurality of resolutions; and controlling means responsive to a request from the client for controlling to transmit image data of a low resolution to the client and responsive to a request from the output control apparatus for controlling to transmit image data of a high resolution corresponding to the image data of the low resolution to the output control apparatus; the image control apparatus comprises: receiving means for receiving editing information of image data stored in the image storing apparatus; determining means for determining an output destination of the output control apparatuses in accordance with the editing information received by the receiving means; and outputting means for outputting the editing information to the output destination of the control apparatuses determined by the determining means; and each of the output control apparatuses comprises: receiving means for receiving the editing information from the image control apparatus; acquiring means for acquiring image data from the image storing apparatus or another output control apparatus in accordance with the editing information; storing means for storing the image data acquired by the acquiring means; and editing means for reading image data necessary for editing from the storing means and editing the read image data in accordance with the editing information to generate an output image.

In another print system of this invention connected to a client, an image control apparatus and output control apparatuses via an network, the image control apparatus comprises: storing means for storing image data of a plurality of resolutions; controlling means responsive to a request from the client for controlling to transmit image data of a low resolution to the client and responsive to a request from the output control apparatus for controlling to transmit image data of a high resolution corresponding to the image data of the low resolution to the output control apparatus; receiving means for receiving editing information of image data stored in the image storing apparatus; determining means for determining an output destination of the output control apparatuses in accordance with the editing information received by the receiving means; and outputting means for outputting the editing information to the output destination of the control apparatuses determined by the determining means; and each of the output control apparatuses comprises: receiving means for receiving the editing information from the image control apparatus; acquiring means for acquiring image data from the image storing apparatus or another output control apparatus in accordance with the editing information; storing means for storing the image data acquired by the acquiring means; and editing means for reading image data necessary for editing from the storing means and editing the read image data in accordance with the editing information to generate an output image.

Methods for controlling the image control apparatus, image storing apparatus, output control apparatus, information processing apparatus, and print system as well as a storage medium storing computer readable programs realizing such methods, also constitute the present invention.

BRIEF DESCRIPTION OF THE DRAWINGS

FIG. 6 shows an example of a print order file.

FIG. 8 is an image tile table stored in the print controller.

FIG. 9 is an image cache hit table stored in the print controller.

FIG. 10 shows an example of a print order file converted by the print controller.

FIG. 12 shows an image tile table stored in the print server.

FIG. 13 shows an image tile file table stored in the print server.

FIG. 14 shows an example of a print order file converted by the print server.

FIG. 17 shows an image cache information table stored in the print controller.

FIG. 24 shows an image cache information table stored in the print server.

FIG. 29 shows an ID list stored in the image server.

FIG. 30 shows a user information table stored in the image server.

FIG. 31 shows a toll table stored in the image server.

FIG. 32 shows a login dialog box.

FIG. 34 shows a dialog box used for confirming an increased memory amount of the image server.

DETAILED DESCRIPTION OF THE PREFERRED EMBODIMENTS

First Embodiment

System Structure

Figure 1:
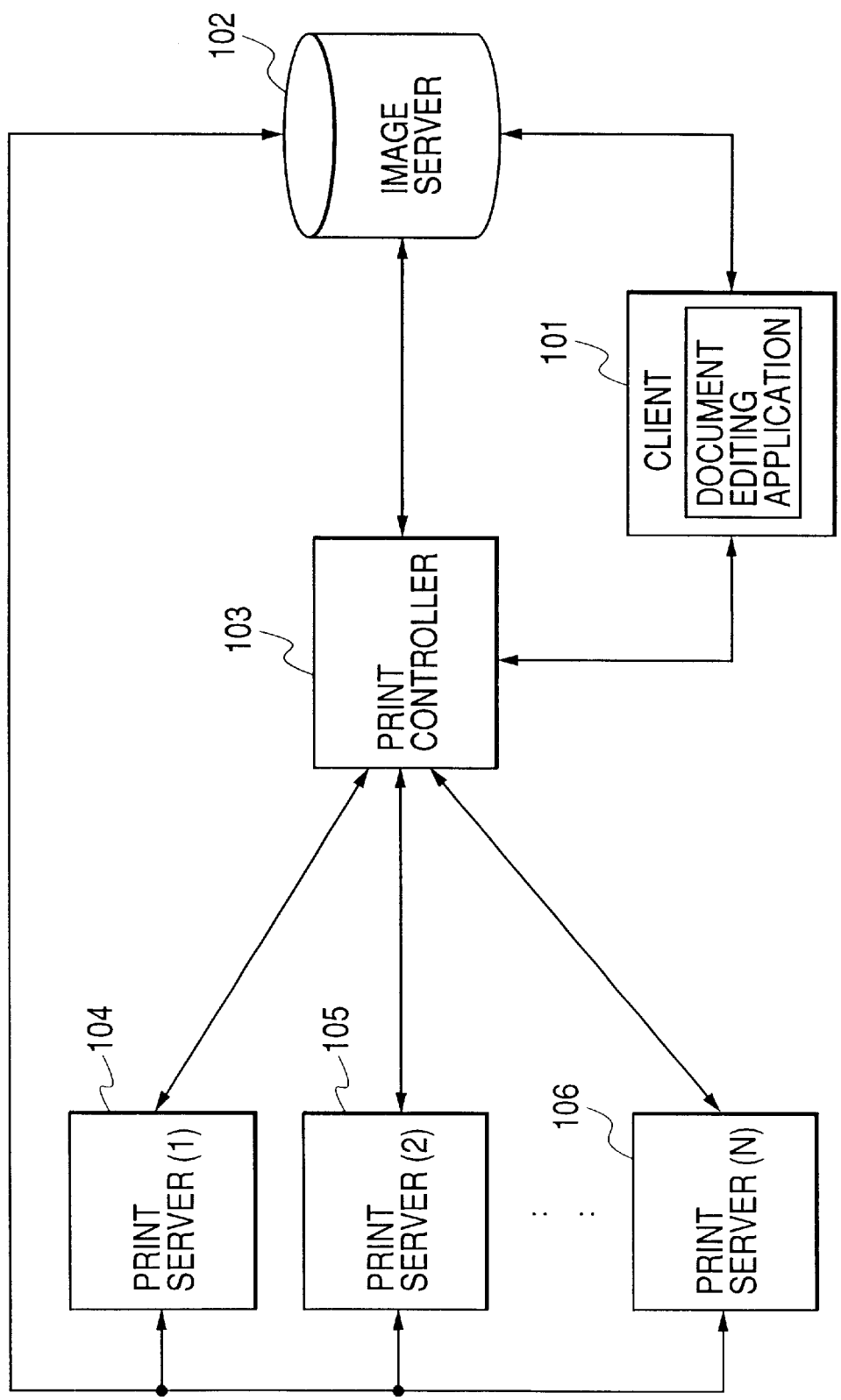
FIG. 1 is a block diagram showing the system structure of a print control apparatus of the invention.

FIG. 1 is a block diagram showing the structure of a print control system of this invention.

In FIG. 1, reference numeral 101 represents a client computer as an embodiment of an information processing apparatus of this invention. The client computer 101 has document editing applications which constitute image editing means for editing images and documents. The client computer 101 is provided with a function of generating and editing a document containing character string data, graphic data, image data and the like and a function of converting document data into page descriptive language.

Reference numeral 102 represents an image server as an embodiment of an image storing apparatus of this invention. The image server 102 stores image data having a plurality of resolutions, one frame of the image data having an image format managed by a plurality of divided tiles. The image data or image tile data in the image film having a designated resolution is transmitted via the network to the client computer 101 and to print server 104–106 to be described later.

Reference numeral 103 represents a print controller as an embodiment of an image control apparatus of this invention. The print controller 103 receives from the client computer 101 a print script described with page descriptive language and a print order, selects a print server which processes the print order, and transmits the print script and print order to the selected print server.

Reference numerals 104, 105 and 106 each represent a print server as an example of an output control apparatus of this invention. The print server processes the print script, in response to a print order from the print controller 103.

The client computer 101, image server 102, print controller 103, and print servers 104, 105 and 106 are interconnected by a network. More specifically, it is assumed in this embodiment that the print controller 103 and image server 102 are interconnected by a private line and connected to the Internet, and other apparatuses are connected to the Internet through dialup.

Print Controller

Figure 4:
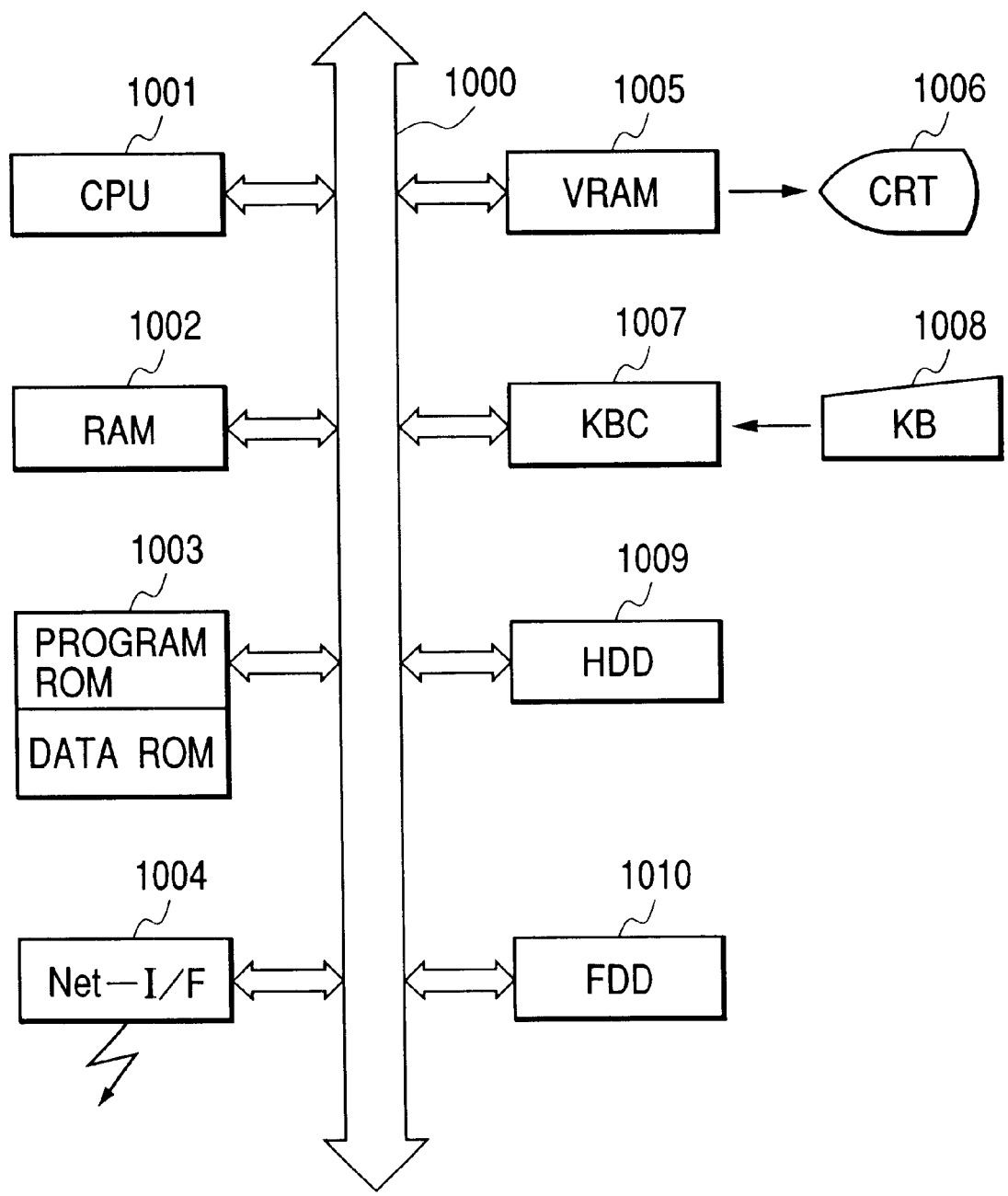
FIG. 4 is a block diagram showing the system structure of a print controller.

FIG. 4 is a block diagram showing the system structure of the print controller 103.

In FIG. 4, reference numeral 1001 represents a CPU for controlling the whole of the print controller 103, CPU 1001 constituting control means of the image control apparatus of the embodiment.

Reference numeral 1002 represents a RAM as temporary storage means, functioning as a main memory of CPU 1001, as a working area for programs (control programs illustrated in the flow charts of FIGS. 7A, 7B, 25A and 25B), and as a temporary save area. RAM 1002 temporarily stores an image tile table (FIG. 8), an image cache hit table (FIG. 9) and an image cache information table (FIG. 17) all to be described later.

Reference numeral 1003 represents a ROM which stores an operation procedure of CPU 1001. ROM 1003 includes a program ROM and a data ROM, the former storing system programs for controlling the print controller and the control programs illustrated in FIGS. 7 and 25, and the latter storing information necessary for operating the system.

Reference numeral 1004 represents a network interface (Net-I/F) which controls a data transfer to and from the print server and controls and diagnoses data to be transmitted to the network system (Internet or the like) to interconnect a user terminal and the system. It is therefore possible to receive editing information from a user terminal to be described later and to transmit it to the print server.

Reference numeral 1005 represents a video RAM (VRAM) for developing an image to be displayed on the screen of a CRT 1006 as display means which displays the system running state, and for controlling the display.

Reference numeral 1007 represents a keyboard controller for controlling a signal input from an external input device such as a keyboard. Reference numeral 1008 represents an external input device for receiving an instruction, which is generally a keyboard and a pointing device (mouse).

Reference numeral 1009 represents a hard disk drive (HDD) as storage means for storing image data. A hard disk in HDD 1009 stores the image tile table (FIG. 8), image cache hit table (FIG. 9) and image cache information table (FIG. 17). As described earlier, these tables stored in a hard disk in HDD 100 are developed in RAM 1002. As will be later described, in accordance with these tables, CPU 1001 determines a destination print server to which data is transmitted.

Reference numeral 1010 represents a removable disk drive (FDD) such as a floppy disk drive as an external storage unit, FDD being used for reading an application program from a floppy disk. This system may be realized by storing the programs illustrated in FIGS. 7A and 7B in a floppy disk in FDD 1010 and loading them in a hard disk.

Reference numeral 1000 represents an I/O bus (address bus, data bus and control bus) for interconnecting the above-described various units.

Print Server

Figure 5:
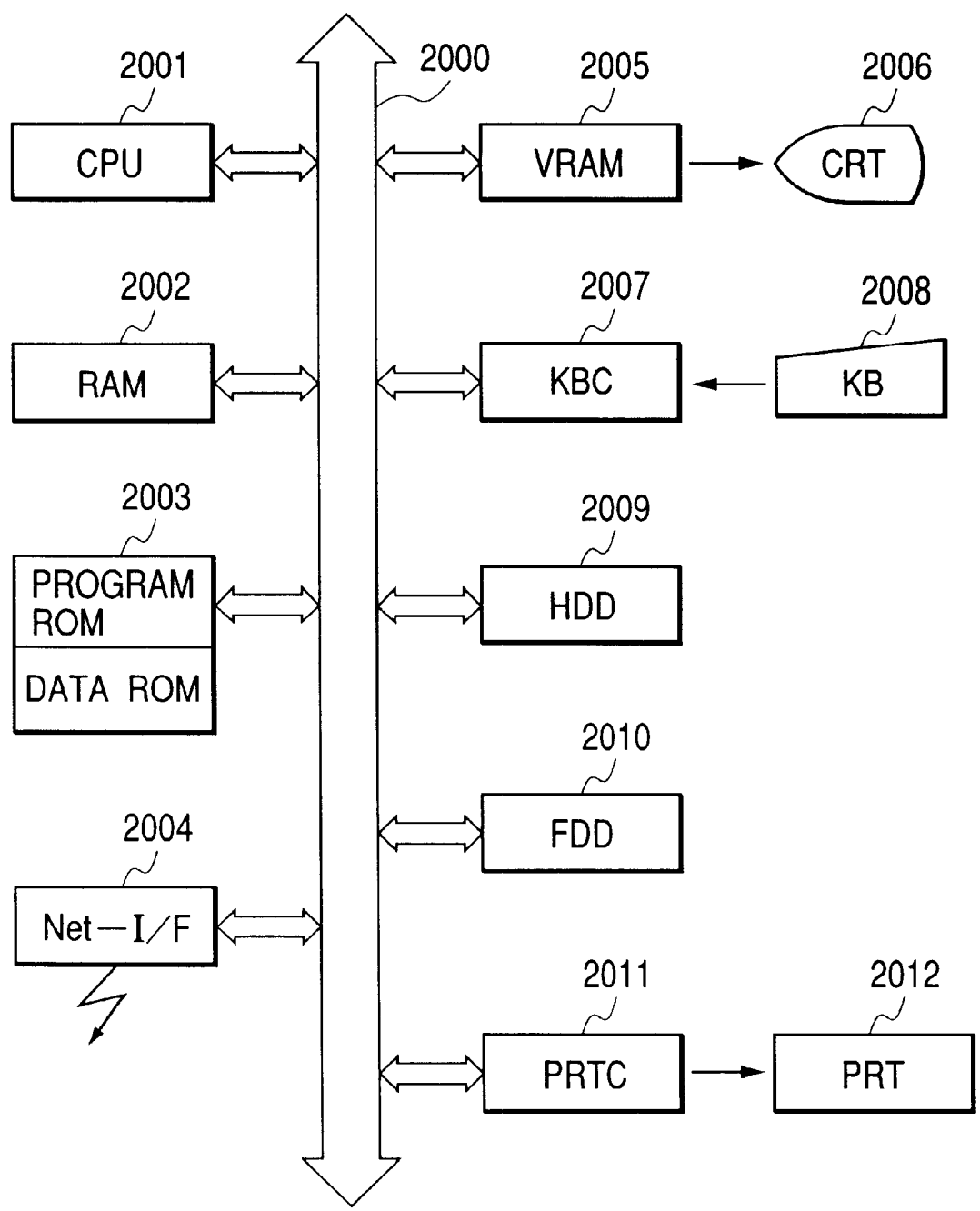
FIG. 5 is a block diagram showing the system structure of a print server.

FIG. 5 is a block diagram showing the system structure of the print server 104–106.

In FIG. 5, reference numeral 2001 represents a CPU for controlling the whole of the print server. CPU 2001 controls to generate an output image in accordance with editing information supplied via a network interface 2004.

Reference numeral 2002 represents a RAM functioning as a main memory of CPU 2001, as a working area for programs and as a temporary save area. RAM 2002 temporarily stores an image tile table (FIG. 12) and an image file table (FIG. 13) both to be described later. RAM 2002 is also used as an area for developing an output image.

Reference numeral 2003 represents a ROM which stores an operation procedure of CPU 2001. ROM 2003 includes a program ROM and a data ROM, the former storing system programs for controlling the print server and programs illustrated in FIGS. 11A and 11B, and the latter storing information necessary for operating the system.

Reference numeral 2004 represents a network interface (Net-I/F) which controls a data transfer to and from the print controller and controls and diagnoses image data to be transmitted to another print server and the image server.

Reference numeral 2005 represents a video RAM (VRAM) for developing an image to be displayed on the screen of a CRT 2006 as display means which displays the system running state, and for controlling the display.

Reference numeral 2007 represents a keyboard controller for controlling a signal input from an external input device such as a keyboard. Reference numeral 2008 represents an external input device for receiving an instruction, which is generally a keyboard and a pointing device (mouse).

Reference numeral 2009 represents a hard disk drive (HDD) for storing image data. CPU 2001 may control in such a manner that the image tile table (FIG. 12) and image file table (FIG. 13) are stored not in RAM 2002 but in a hard disk in HDD 2009 and in accordance with the contents of the tables, image data may be acquired from the image server 102 or another print server 104–106.

Reference numeral 2010 represents a removable disk drive (FDD) such as a floppy disk drive as an external storage unit, FDD being used for reading an application program from a floppy disk. This system may be realized by storing the programs illustrated in FIGS. 11A and 11B in a floppy disk in FDD 2010 and loading them in a hard disk.

Reference numeral 2011 represents a printer controller (PRTC) for controlling a printer 2012 and an output image.

Reference numeral 2012 represents the printer as print means for performing a print operation at the print server. The printer 2012 has a printer engine for printing an image generated by CPU 2001 basing upon the print order, editing information and image data received from the network interface 2004, in accordance with the program stored in a hard disk in HDD 2009. A plurality of printers 2012 may be connected to one print server.

Reference numeral 2000 represents an I/O bus (address bus, data bus and control bus) for interconnecting the above-described various units.

Image Format

Figure 2:
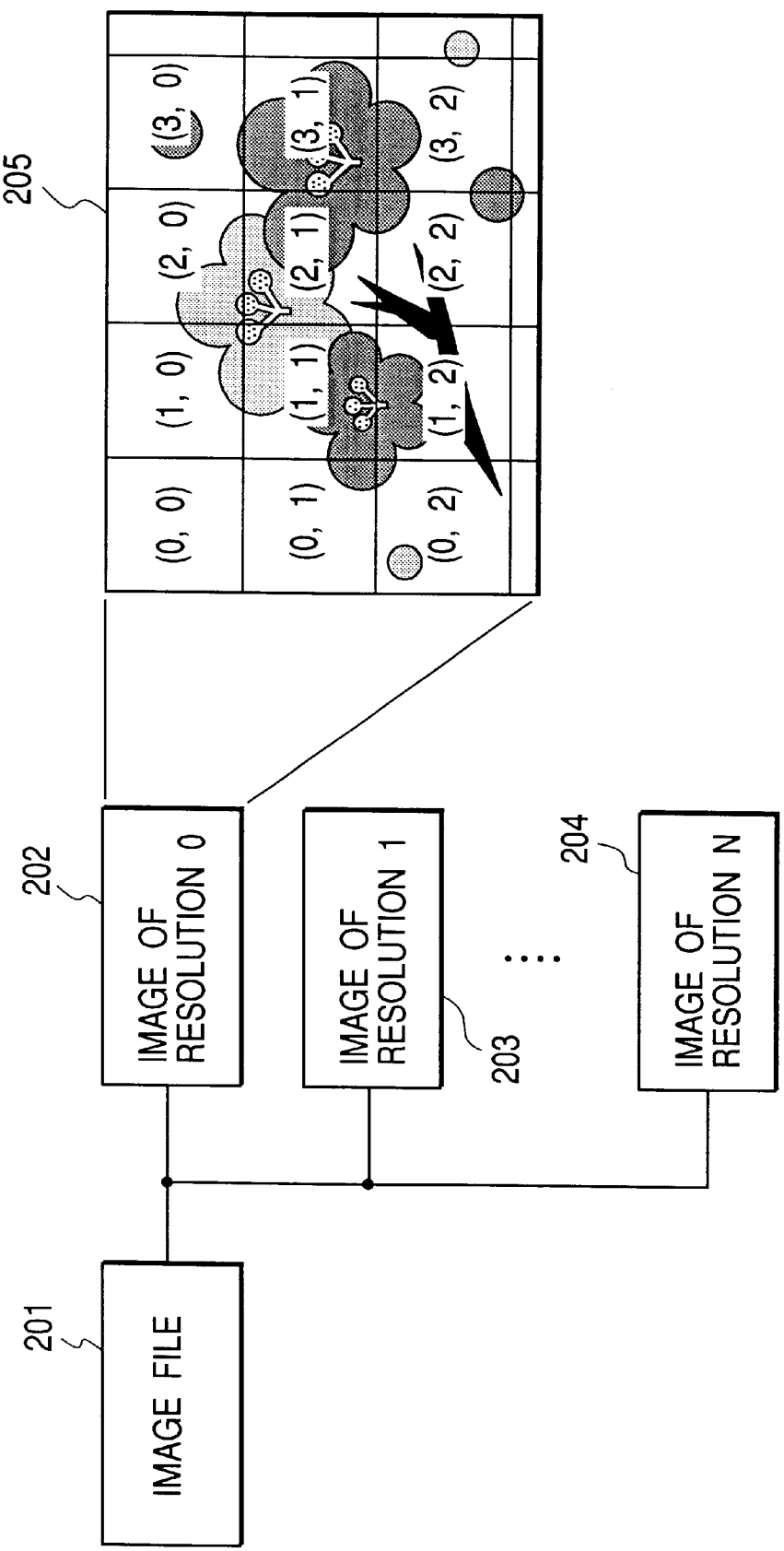
FIG. 2 is a diagram illustrating an image format to be used by the invention.

FIG. 2 shows an example of image data to be used by the invention. The image data has an image format of FlashPix (registered trademark). The image server 102 has a plurality of image files of this format. Obviously, the invention is applicable to other image files of formats different from the FlashPix format. Image formats other than the FlashPix format include a bit map data format and a compression data format such as JPEG, TIF and ZIP. The invention may obviously use any format.

In FIG. 2, reference numeral 201 represents an image file of the FlashPix format. The image file 201 hierarchically stores images having a plurality of resolutions, resolution 0 to resolution n. The smaller the suffix number, the larger the resolution. The resolution 0 has a highest resolution, and an increment of the suffix by "1" halves the resolution. Reference numerals 202, 203 and 204 represent images of resolutions 0, 1 and n.

The image of each resolution is divisionally managed as square image tiles each having the predetermined number of pixels. Reference numeral 205 indicates a relationship between an image of the resolution 0 stored in the image file 201 and respective image tiles. Indices (X, Y) indicated on the image tiles are image tile IDs for discriminating between image tiles.

Since each image tile has the fixed number of pixels, an image having a different resolution has a different number of image tiles and IDs. For example, an area of the image tile having the resolution 0 is four times that of the image tile having the resolution 0 and showing the same image. Therefore, an area of four image tiles with the image tile IDs (0, 0), (1, 0), (0, 1) and (1, 1) having the resolution 0 is equal to an area of one image tile with the image tile ID (0,0) having the resolution 1.

As described above, the image storing apparatus of this invention stores image data having a plurality of resolutions. Accordingly, an image of a low resolution can be used for the process such as an editing process not requiring a high resolution of the image, reducing a use amount of memory and speeding up the data transfer process.

Script

Figure 3:
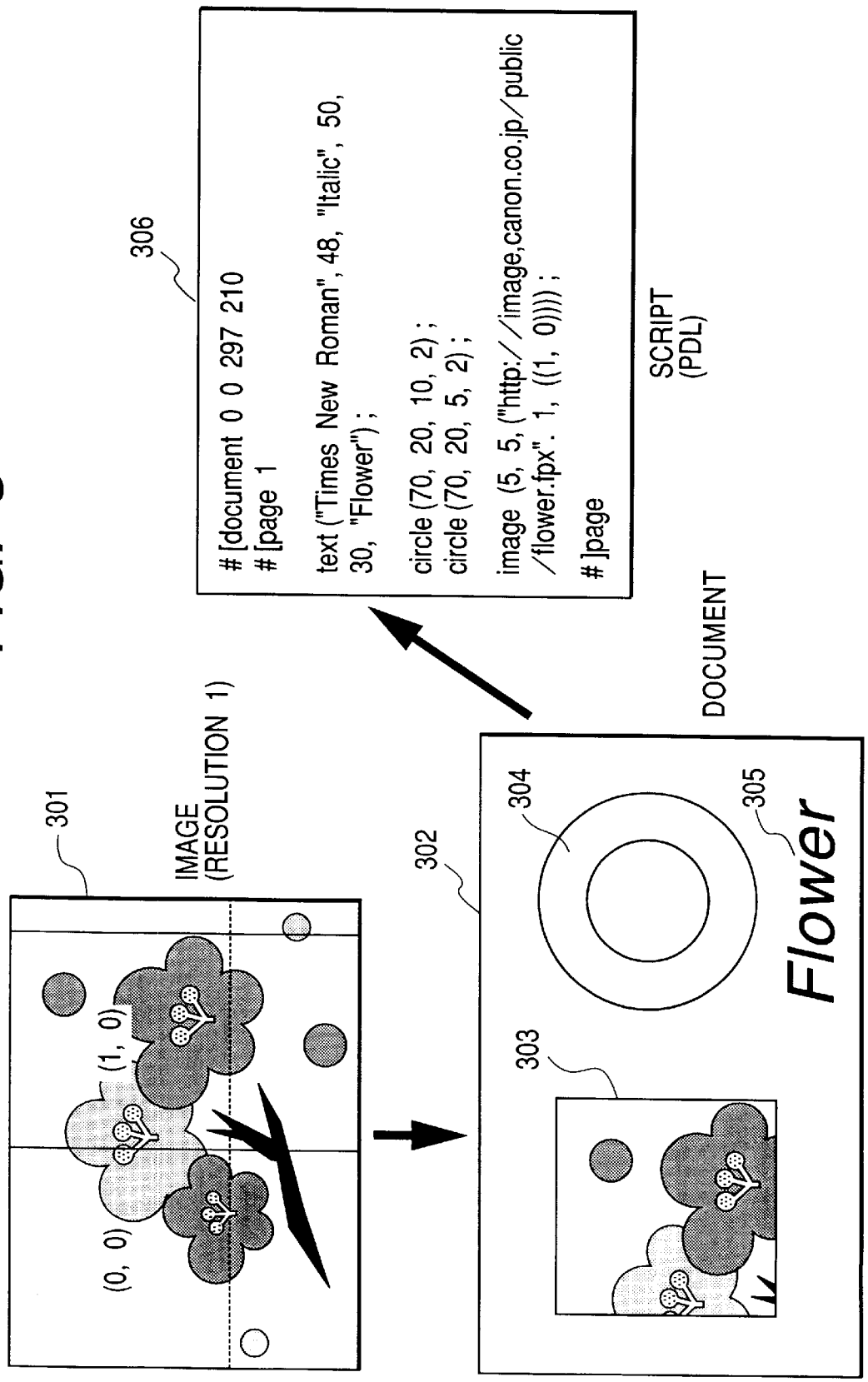
FIG. 3 is a diagram illustrating an example of a script described with page descriptive language to be used by the invention.

FIG. 3 illustrates an example of a script described with page descriptive language to be used by the invention.

In FIG. 3, reference numeral 301 indicates a relationship between an image 203 having the resolution 1 shown in FIG. 2 and respective image tiles.

Reference numeral 302 represents a document generated in accordance with the document editing application of the client computer 101. Reference numerals 303, 304 and 305 represent image data, graphic data, and character string data contained in the document 302. Reference numeral 306 represents a script obtained by converting the document 302 into page descriptive language by using the document editing application of the client computer 101.

In editing a document by using the document editing application, the use amount of memory is reduced by using the image having the resolution 1. This is also effective in acquiring the image data via the network. In this embodiment, although the image having the resolution 1 is used, the image having the lower resolution 2, 3 or the like may be used to further reduce the amount of image data to be transmitted.

The document 302 contains only an image tile with the image tile ID (1, 0) of the image 301 having the resolution 1. In converting the document 302 into the script 306, the image data 303 itself is not used but an image file ID of the image file 201, a resolution index and an image tile ID are described and only when the script is processed, the image data is actually used. In this manner, the size of the script can be reduced and the load of the network during data transmission can be lowered.

In this script 306, numerals following "document" indicate an document ID which is uniquely assigned by the document editing application. Numerals following "page" indicate the page number. Those described after "text" indicate that a word "Flower" is written at the position (50, 30) by using "Times New Roman" italic fonts of 48 point. The next "circle" is a circle write command. With this command, a circle having a diameter of 10 and a thickness of 2 is written at a position (70, 20). The last "image" indicates a presence of image data which is a tile image with the tile ID (1, 0) having the resolution 1, written at a position (5, 5) and stored at a URL [http://image.canon.jp/public/flower. fpx].

A history of editing commands by the document editing application of the client 101 is generated as a script form file. An editing process of this embodiment may include: processes to be performed relative to the whole image, such as a mosaic process, an unsharping process, a color conversion process (color balancing) and a gradation process (including grey scale process); a process of adding a template (image data) such as a photograph frame and a text insertion frame; a process of drawing a graphic; and a process of inserting a text. These processes are included in the definition of the editing process of this embodiment. A history of editing processes defined as above is generated as the script format file by the client computer 101.

As described earlier, the client computer 101 accesses the Internet by dial-up connection and requests for image data of a low resolution to the image server to receive it. The client computer 101 edits the image data of a low resolution, and the history of editing is generated as a script format file. This editing information is transmitted to the print controller via the Internet through dial-up connection to issue a print order. A user can edit the image data in a desired manner, generate the print order having a small data amount as the history of editing, and transmit as the print order the editing information containing an ID of the image data to be edited. It is therefore possible to shorten the connection time to the Internet when the print order is issued.

Image Server

Figure 20:
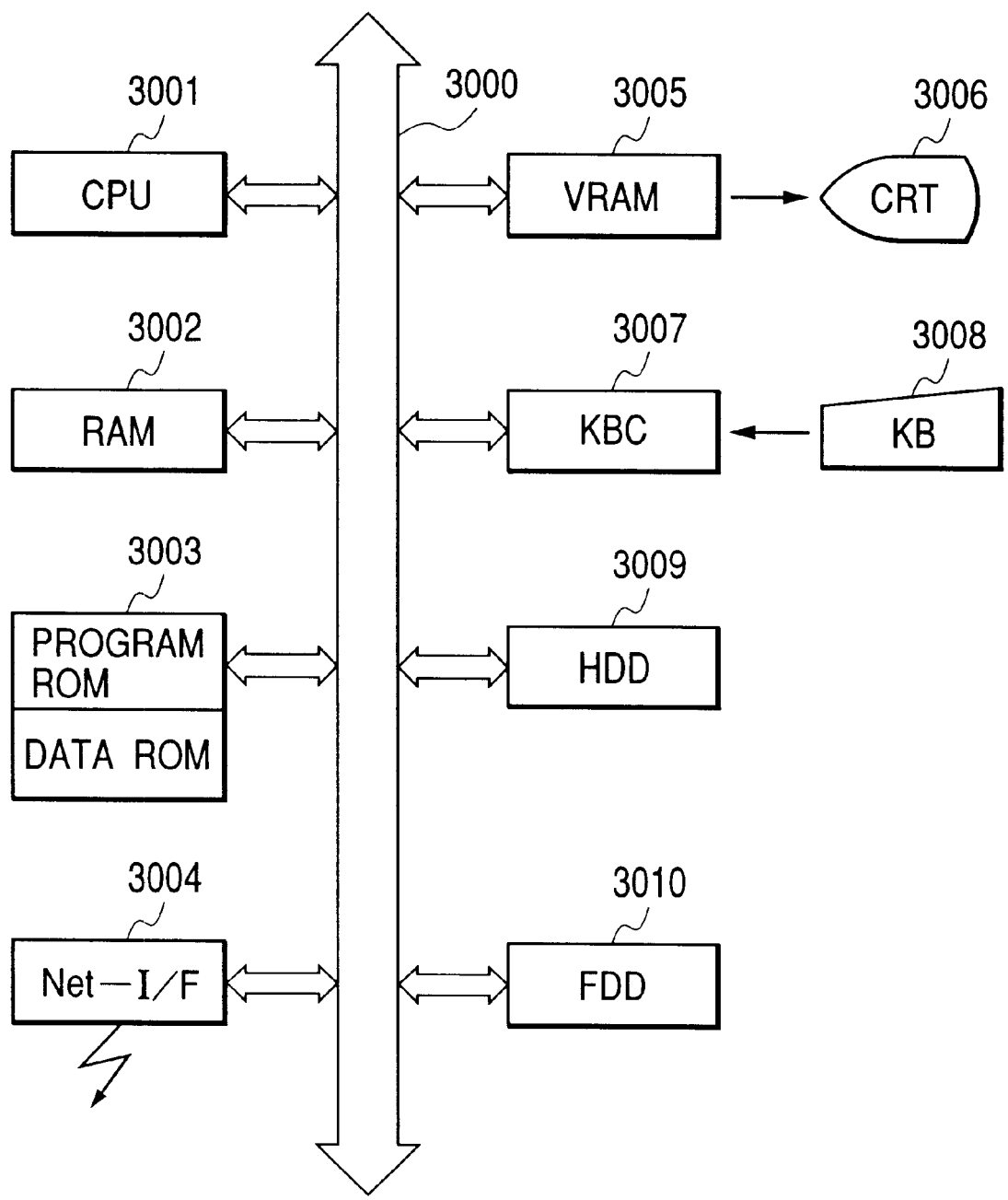
FIG. 20 is a block diagram showing the system structure of the image server.

FIG. 20 is a block diagram showing the system structure of the image server 102.

In FIG. 20, reference numeral 3001 represents a CPU for controlling the whole of the image server 102, CPU 3001 constituting control means of the image storing apparatus of the embodiment.

Reference numeral 3002 represents a RAM as temporary storage means, functioning as a main memory of CPU 1001, as a working area for control programs, and as a temporary save area. Reference numeral 3003 represents a ROM which stores an operation procedure of CPU 3001. ROM 3003 includes a program ROM and a data ROM, the former storing system programs for controlling the image server and the latter storing information necessary for operating the system.

Reference numeral 3004 represents a network interface (Net-I/F) which controls a data transfer to and from the print server and client computer and diagnoses data to be transmitted.

Reference numeral 3005 represents a video RAM (VRAM) for developing an image to be displayed on the screen of a CRT 3006 as display means which displays the system running state, and for controlling the display.

Reference numeral 3007 represents a keyboard controller for controlling a signal input from an external input device such as a keyboard. Reference numeral 3008 represents an external input device for receiving an instruction, which is generally a keyboard and a pointing device (mouse).

Reference numeral 3009 represents a hard disk drive (HDD) as storage means which is used for storing image data.

Reference numeral 3010 represents a removable disk drive (FDD) such as a floppy disk drive as an external storage unit, FDD being used for reading an application program from a floppy disk.

Reference numeral 3000 represents an I/O bus (address bus, data bus and control bus) for interconnecting the above-described various units.

Description of Operation

With reference to FIG. 3 and FIGS. 6 to 9, the overall operation of this system will be described.

By using a document generating application of the client computer 101, a user acquires from the image server 102 the image data 303 to form a document 302, the image data 303 having the image tile ID 9003 (1, 0) and contained in the image data 203 in the image file 201 having the resolution 1.

As the user performs a print service request operation, the document editing application of the client computer 101 converts the document 302 into the script 306, adds the print order information, and forms a print order file shown in FIG. 6 to transmit it to the print controller 103. The print order information includes: user information (#UserID) such as an address, name and credit card number; and print information such as a print range (#PageRange), a copy number (#Copies) and a payment method (#Payment). FIG. 6 shows an example of the print order file.

Figures 7, 7A:
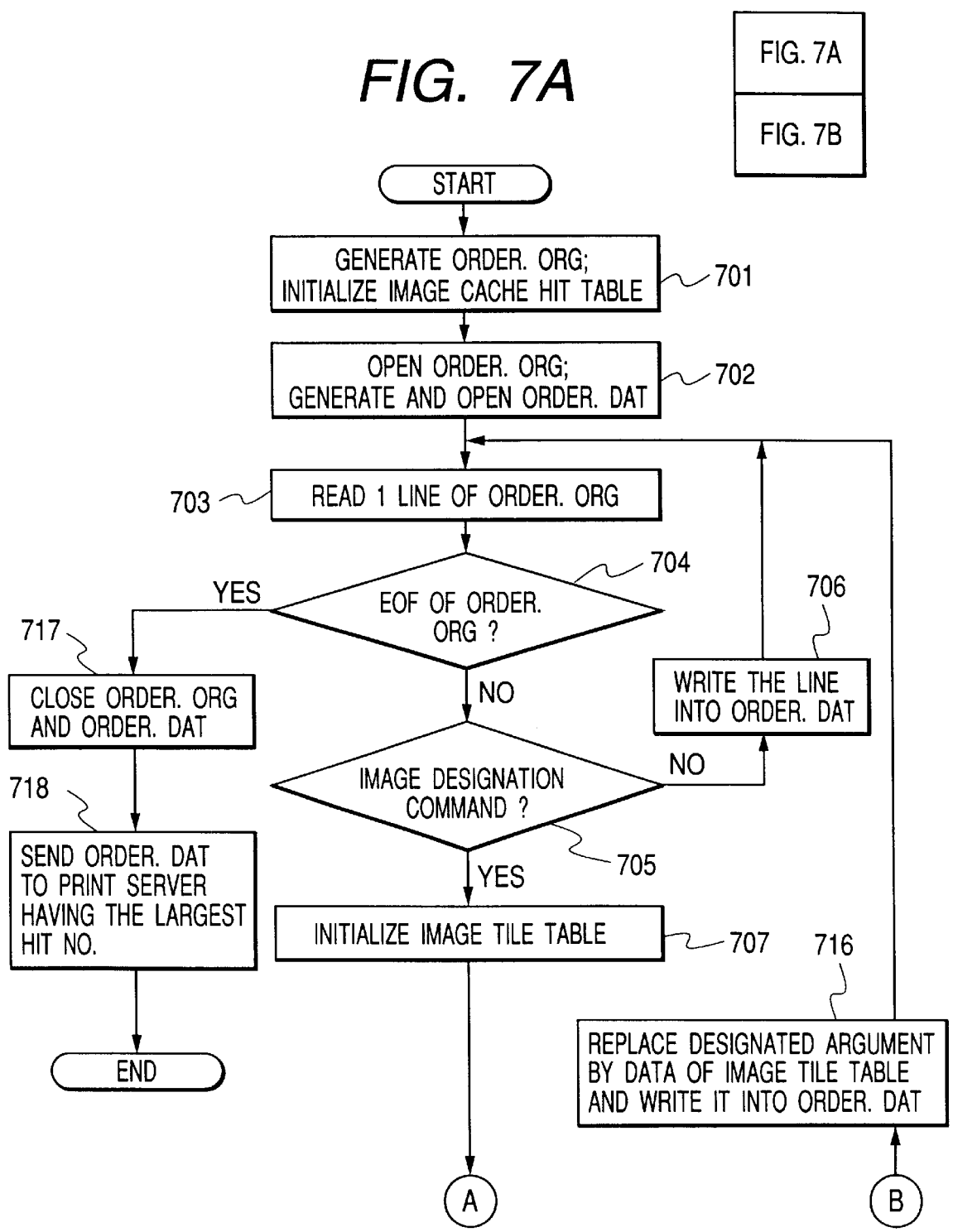
FIG. 7, which is comprised of FIGS. 7A and 7B, is a flow chart illustrating the operation of the print controller.
Figure 7B:
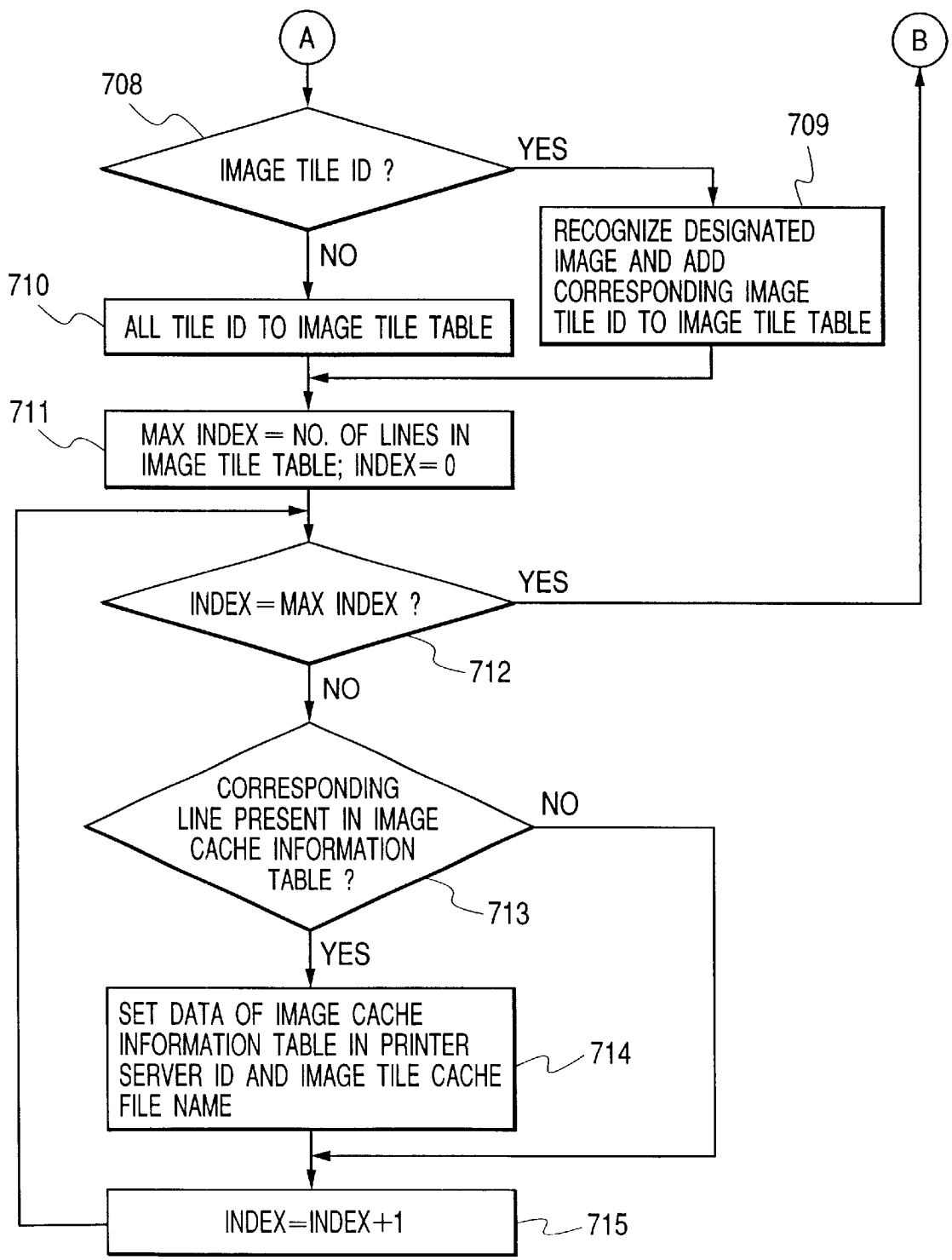

FIGS. 7A and 7B are flow charts illustrating the control program of the print controller 103, FIG. 8 shows the image tile table 1507 stored in RAM 1002 of the print controller, and FIG. 9 shows the image cache hit table 1508 stored in RAM 1002. As described earlier, these may be stored in a hard disk in HDD 1009.

The image tile table 1507 shown in FIG. 8 has the number of rows corresponding to the number of tiles of image data. A print server ID 9001 is an ID of the print server in which image data of the tile is stored. An image file ID 9002 is an ID of an image file storing the tile. An image tile ID is an ID of the tile in the image file. An image tile cache file name 9004 is a name of the file to which the tile is cached.

The image cache hit table 1508 shown in FIG. 9 has rows of a print server ID 9001 and an image cache hit number 9006.

The operation of the print controller 103 as an embodiment of the image control apparatus of this invention will be described with reference to FIGS. 7 to 9.

At Step 701, the print controller 103 receives the print order file (FIG. 6) containing image editing information from t he client 101 having the document editing application via the network interface 1004. This can be realized by the client 101 accessing the Internet by dial-up connection. The print controller 103 stores the received print order file (FIG. 6) in a hard disk in HDD 1009 as a file ORDER.ORG, and initializes the contents of the image cache hit table 1508 (FIG. 9) in RAM 1002.

At Step 702, the print controller 103 opens the input file ORDER.ORG in HDD 1009 and generates an output file ORDER.DAT in a hard disk in HDD 1009 to open it.

At Step 703, the print controller 103 reads one line of the file ORDER.ORG in HDD 1009.

At Step 704, the print controller 103 checks whether the read line is the last (EOF: End of file) of the file ORDER.ORG in HDD 1009. If the last line, the flow advances to Step 717, whereas if not, the flow advances to Step 705.

At Step 705, the print controller 103 judges whether the read row is an image designation command ("image()" in FIG. 6). If not, the flow advances to Step 706, whereas if the image designation command, the flow advances to Step 707.

If it is judged at Step 705 that the read row is not the image designation command, at Step 706 the print controller 103 writes the row read at Step 703 into the file ORDER.DAT to return to Step 703.

If it is judged at Step 705 that the read row is the image designation command, at Step 707 the print controller 103 initializes the image tile table 1507 in RAM 1002.

Next, at Step 708 the print controller 103 checks whether arguments of the image designation command in the order file ORDER.ORG contain an image tile designation (image tile ID). If there is the image tile designation, the flow advances to Step 709, whereas if not, the flow advances to Step 710.

If it is judged at Step 708 that there is the image tile designation, at Step 709 the print controller 103 recognizes the image designated by the image file ID 9002 (in this embodiment, [http://image.canon.jp/public/flower.fpx]), resolution (in this embodiment, "1" in FIG. 6) and image tile ID 9003 (in this embodiment, (1, 0)) stored in the order file ORDER.ORG. Then, the print controller 103 calculates the image tile ID 9003 of the image 205 having the resolution 0 in the image file 201 designated by the image file ID 9002, and adds the image file ID 9002 and the calculated image tile ID 9003 to the items of image file ID 9002 and image tile ID 9003 of the image tile table 1507 (FIG. 8) in RAM 1002. In this case, the print controller 103 designates NONE to the items of the print server ID 9001 and image tile cache file name 9004 of the image tile table 1507 (FIG. 8) in RAM 1002. Thereafter, the flow advances to Step 711.

If it is judged at Step 708 that there is no image tile designation, at Step 710 the print controller 103 determines the image server 102 (http://image.canon.co.jp/) from the image file ID ([http://image.canon.jp/public/flower.fpx]) in the image designation command, and acquires from the image server 102 the numbers (X, Y) of tiles in the X- and Y-directions constituting the image 205 having the resolution 0 in the image file 201 designated by the image file ID 9002. Next, with reference to the numbers (X, Y), the print controller 103 adds all image tile IDs 9003 constituting the image having the resolution 0 in the image file 201 designated by the image file ID 9002, as well as the image file ID 9002, to the image tile table 1507 in RAM 1002. In this case, the print controller 103 designates NONE to the items of the print server ID 9001 and image tile cache file name 9004 of the image tile table 1507.

In this embodiment, the image tile ID 9003 in the image designation command is converted at Steps 709 and 710 into the image tile ID 9003 of the image having the resolution 0 in the image file 201 designated by the image file ID 9002. This conversion may be performed when the document editing application of the client computer 101 generates the script 306.

At Step 711 the print controller 103 sets the number of rows of the image tile table 1507 in RAM 1002 to a variable MAX_INDEX and initializes a variable INDEX to 0. The variable MAX_INDEX contains the number of already read tiles of the order file now being edited.

At Step 712 the print controller 103 judges whether the value of the variable INDEX is equal to the value of the variable MAX_INDEX. If equal, the flow advances to Step 716, whereas if not, the flow advances to Step 713.

At Step 713 the print controller 103 checks whether the row having the same image file ID 9002 and image tile ID 9003 as those of the INDEX-th row of the image tile table 1507 in RAM 1002 is contained in the image cache information table 1506 (FIG. 17) in RAM 1002. If not contained, the flow advances to Step 715, whereas if contained, the flow advances to Step 714.

FIG. 17 shows the image cache information table 1506. The image cache information table in RAM 1002 is initialized when the print controller 103 is started up. The image cache information table shown in FIG. 17 indicates the printer servers 104 to 106 as an embodiment of the output control apparatus of this invention connected to the network or Internet, and their cached image tiles.

The print server 104 receives via the print controller 103 the print order file generated by the client computer 101. If the image designation command in the print order file contains an image tile not present in HDD 2009, the print server 104 copies the image tile file from the image server 102 or another print server 105, 106 and stores it in HDD 2009 as a cache file. In this case, the print server 104 supplies the print controller 103 with the information on the cache file stored in HDD 2009. This process will be later described with reference to FIGS. 11A and 11B.

Upon reception of the image cache information from the print server 104, the print controller 103 adds a row to the image cache information table 1506 (FIG. 17) in RAM 1002 and sets the notified cache file information to the row. The print controller 103 registers a time (image tile cache file discard time 9005) when a cache file is discarded and made invalid, in the image cache information table 1506 in RAM 1002, this time item being an additional item not set to the image tile table 1507. The print controller 103 periodically checks the contents of each row of the image cache information table 1506 in RAM 1002, and deletes the row having the image tile cache file discard time earlier than the current time, from the image cache information table 1506 in RAM 1002.

If it is judged at Step 713 that there is a corresponding row in the image cache information table (FIG. 17), at Step 714 the print controller 103 sets the terms of the print server ID 9001 and image tile cache file name 9004 at the row of the image cache information table 1506 (FIG. 17) in RAM 1002, the row having the same image file ID 9002 and image tile ID 9003 in the image tile table 1507 at the INDEX-th, to the terms of the print server ID 9001 and image tile cache file name 9004 of the image tile table 1507 (FIG. 8) in RAM 1002 at the INDEX-th row. At the same time, the print controller 103 checks whether the image cache hit table 1508 (FIG. 9) in RAM 1002 has the row having the same print server ID 9001 as that set to the image tile table 1507 at the INDEX-th row. If it has such a row, the value of the image tile cache hit number 9006 at the row is incremented by 1, whereas if it has not the row, a row is added to the image cache hit table 1508 in RAM 1002, the term of the print server ID 9001 is set with the term in the print server ID 9001 at the INDEX-th row of the image tile table 1507 in RAM 1002, and the term of the image tile cache hit number 9006 is set with 1.

At Step 715, the print controller 103 increments the value of the variable INDEX by 1 and the flow returns to Step 712.

If it is judged at Step 712 that all INDEXs have been processed, at Step 716 the print controller 103 replaces the image data designation argument in the image designation command by the contents of the image tile table 1507 in RAM 1002, and writes the contents in the file ORDER.DAT in HDD 1009 to follow Step 703. In this manner, the image data designation argument (represented by a lower resolution) in the image designation command in the print order file is replaced by the tile image having a high resolution 0, in this embodiment.

At Step 717 the print controller 103 closes the files ORDER.ORG and ORDER.DAT in HDD 1009.

At Step 718 the print controller 103 transmits the print order file ORDER.DAT in HDD 1009 to the print server designated by the print server ID having the maximum cache hit number, with reference to the image tile cache hit number 9006 in RAM 1002.

An example of the results of the script 306 shown in FIG. 3 processed in the above-described manner is shown in FIG. 10. In FIG. 10, the image having the resolution "1" shown in FIG. 6 is changed to the image having the resolution "0", and the number of tiles is increased. The storage destinations of these images are indicated by URL.

In the flow charts of FIGS. 7A and 7B, after the print order file containing editing information is received from the client computer 101, a print server having the maximum amount of image data to be used by the print order file is determined as an output destination. Obviously, the invention is not limited only to this embodiment, but the print server designated in the print order file may be determined as an output destination.

Figure 11:
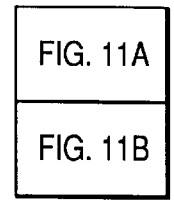
FIG. 11, which is comprised of FIGS. 11A and 11B, is a flow chart illustrating the operation of the print server.
Figure 11A:
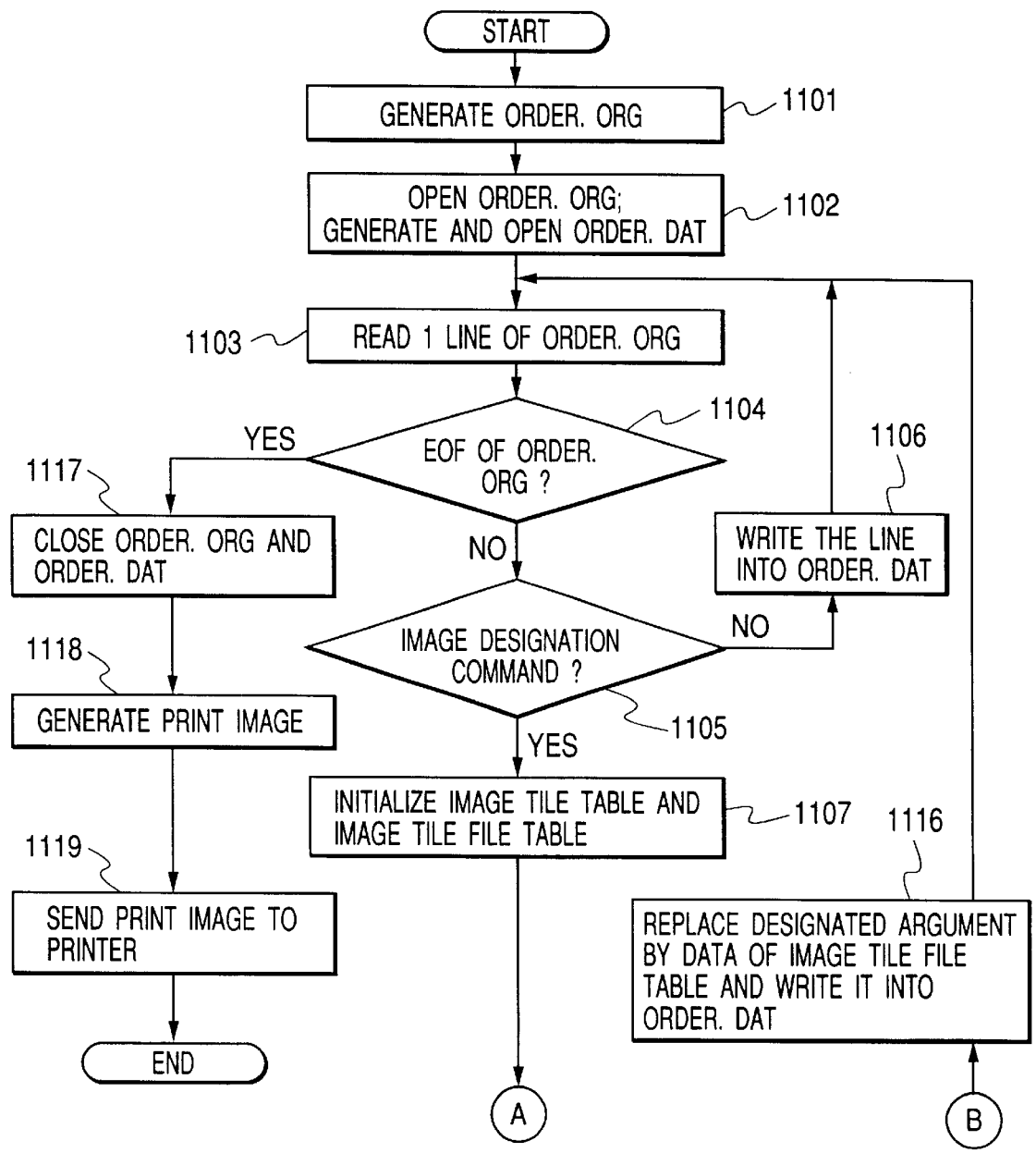
Figure 11B:
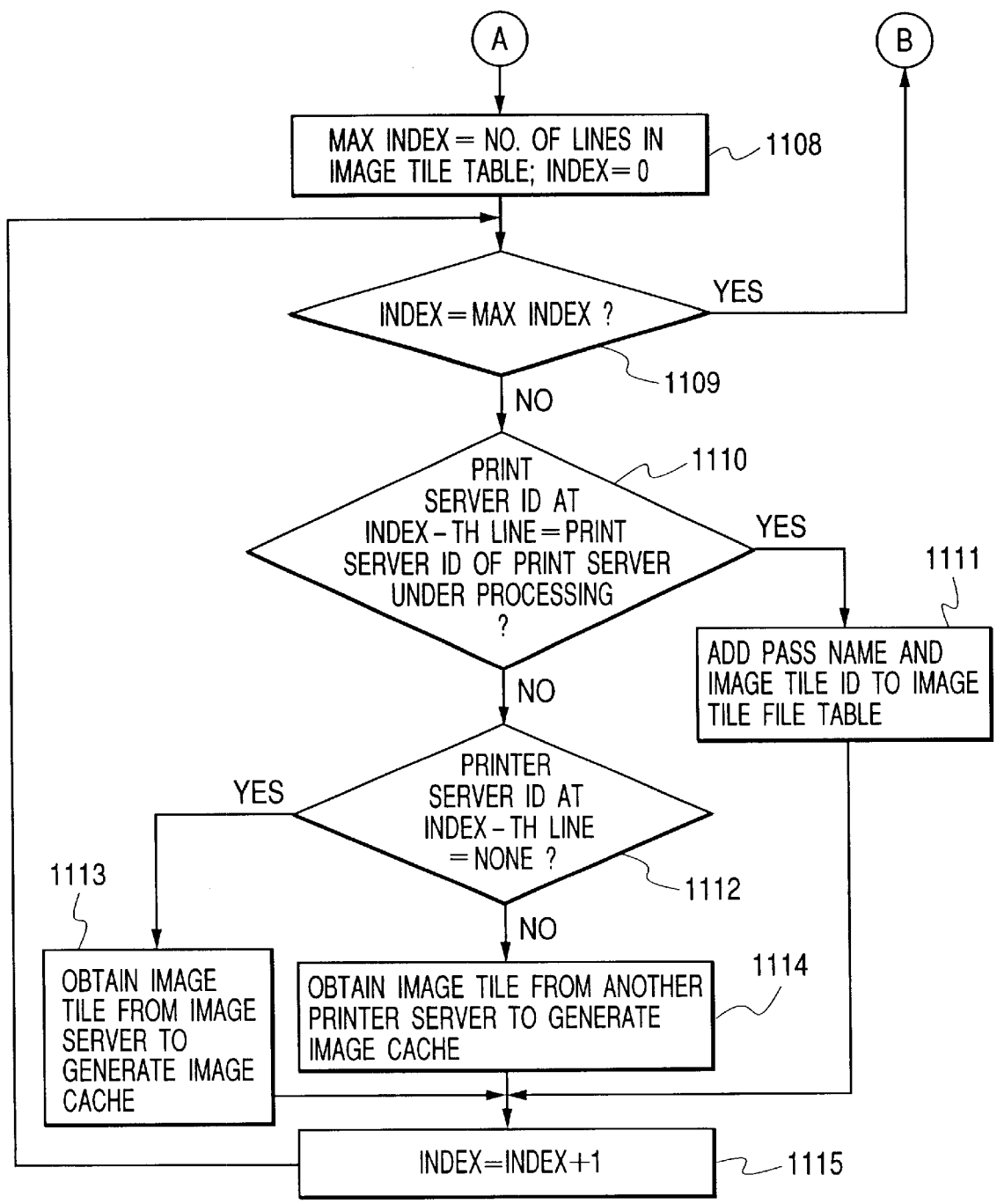

FIGS. 11A and 11B are flow charts illustrating the processes to be executed by the print server 104 as an embodiment of the output apparatus of this invention. FIG. 12 shows the image tile table 1606 in RAM 2002, and FIG. 13 shows the image tile file table 1607 in RAM 2002.

The rows of the image tile table 1606 shown in FIG. 12 include a print server ID 9001, an image file ID 9002, an image tile ID 9003, an image tile cache file name 9004, and an image tile cache file discard time 9005.

The rows of the image tile file table 1607 shown in FIG. 13 include an image tile cache file name 9004 and an image tile ID 9003.

The operation of the print server 104 will be described with reference to FIGS. 11A, 11B to 13.

The print server 104 receives the print order file ORDER.DAT as a print request file from the print controller 103 via the network interface 2004.

At Step 1101, the print server 104 stores the received print order file in HDD 2009 as a file ORDER.ORG.

At Step 1102, the print server 104 opens the input file ORDER.ORG in HDD 2009 and generates an output file ORDER.DAT in a hard disk in HDD 2009 to open it.

At Step 1103, the print server 104 reads one line of the file ORDER.ORG in HDD 2009.

At Step 1104, the print server 104 checks whether the read line is the last (EOF: End of file) of the file ORDER.ORG in HDD 2009. If the last line, the flow advances to Step 1117, whereas if not, the flow advances to Step 1105.

At Step 1105, the print server 104 judges whether the read row is an image designation command ("image()" in FIG. 10). If not the flow advances to Step 1106, whereas if the image designation command, the flow advances to Step 1107.

If it is judged at Step 1105 that the read row is not the image designation command, at Step 1106 the print server 104 writes the row read at Step 1103 into the file ORDER.DAT to return to Step 1103.

If it is judged at Step 1105 that the read row is the image designation command, at Step 1107 the print server 104 initializes the contents of the image tile table 1606 (FIG. 12) and image tile file table 1607 (FIG. 13) in RAM 2002.

At Step 1108 the print server 104 develops the image data description contents in the image designation command onto the image tile table 1606 in RAM 2002. The print server 104 sets the number of rows of the developed image tile table 1606 to the variable MAX_INDEX, and initializes the variable INDEX to 0. More specifically, when the print order file shown in FIG. 10 is received, the second image in the image designation command [(http://image.canon.jp/public/flower.fpx), (3, 0), (http://printl.xxx.co.jp/cache/a01763.til)] is developed onto the image tile table 1606 in RAM 2002. In this case, the print server ID 9001 is [printl.xxx.co.jp], the image file ID 9002 is [flower.fpx], the image tile ID 9003 is [(3, 0)], and the image tile cache file name 9004 is [a01763.til]. The image tile cache discard time 9005 is not stored.

At Step 1109 the print server 104 judges whether the value of the variable INDEX is equal to the value of the variable MAX_INDEX. If equal, the flow advances to Step 1116, whereas if not, the flow advances to Step 1110.

At Step 1110 the print server 104 checks whether the print server ID 9001 at the INDEX-th row in the image tile table 1606 in RAM 2002 is the same as the print server ID 9001 of the print server under operation. If the same, it means that the print server under operation has the tile at the INDEX-th row and the flow advances to Step 1111. If not the same, it means that the tile at the INDEX-th row is present in another print server or in the image server and the flow advances to Step 1112.

At Step 1111 the print server 104 adds a path name (e.g., \cache\a01763.til in FIG. 10) and the image tile ID 9003 to the image tile file table 1607 in RAM 2002 to follow Step 1115. The path name is formed by adding, to the directory name (\cache in FIG. 10) at which the image data is stored in HDD 2009, the image tile cache file name 9004 (a01763.til in FIG. 10) at the INDEX-th row in the image tile table 1606 in RAM 2002. Namely, the path name is added to the image tile cache file name 9004 of the image tile file table shown in FIG. 13.

At Step 1112, the print server 104 judges whether or not the print server ID 9001 at the INDEX-th row in the image tile table 1606 in RAM 2002 is NONE. If NONE, it means that the corresponding image tile is not stored in any one of the print servers. Therefore, in order to acquire the image tile from the image server, the flow advances to Step 1113. Whereas if not NONE, it means that the image tile is stored in another print server and the flow advances to Step 1114.

At Step 1113 the print server 104 requests for the image tile cache file name 9004 to the print controller 103. The print controller 103 generates a file name which is unique in the system and random, and returns it to the print server 104. With a random file name, it becomes difficult to guess an original image from the file name in the image storage directory of HDD 2002 of the print server 104 or to reconfigure an original image from a plurality of files. It is therefore possible to prevent fraud use of images not free. In order to generate the image tile cache file name randomly, the print controller 103 manages in advance the image data and file names cached by all the print servers in the image cache information table (FIG. 24) and CPU 1001 sets a random file name to be transmitted to the print server 104.

After the image tile cache file name 9004 is acquired from the print controller 103, the print server 104 requests for the image tile having the image tile ID 9003 and the resolution 0 and stored in the image file having the image file ID 9002 at the INDEX-th row in the image tile table 1606 in RAM 2002, to the image server 102. After the corresponding image tile is acquired, it is stored in HDD 2009 at the image storage directory, under the image tile cache file name 9004 acquired from the print controller 103, and the path name and image tile ID 9003 are added to the image tile file table 1607 in RAM 2002.

At the same time, the print server 104 registers the cache state information in the print controller 103, by using as arguments the printer server ID 9001, image file ID 9002, image tile ID 9003, image tile cache file name 9004 and image tile cache file discard time 9005. The image tile cache file discard time 9005 is calculated by the print server 104 by adding the time when the image tile cache file is generated in HDD 2009 to a cache holding time set by the print server 104. The print server 104 registers the cache information stored in the print controller 103 also in the image cache information table 1608 (FIG. 24) in RAM 2002 or HDD 2009. Thereafter, the flow advances to Step 1115.

Similar to Step 1113, at Step 1114 the print server 104 requests for the image tile cache file name 9004 to the print controller 103. Next, the print server 104 requests for the image tile having the image tile ID 9003 and the resolution 0 and stored in the image file having the image file ID 9002 at the INDEX-th row in the image tile table 1606, to the print server having the print server ID 9001 in the image tile table 1606 in RAM 2002 at the INDEX-th row. After the corresponding image tile is acquired, it is stored in HDD 2009 at the image storage directory, under the image tile cache file name 9004 acquired from the print controller 103, and the path name and image tile ID 9003 are added to the image tile file table 1607 in RAM 2002.

At the same time, the print server 104 registers the cache state information in the print controller 103, by using as arguments the printer server ID 9001, image file ID 9002, image tile ID 9003, image tile cache file name 9004 and image tile cache file discard time 9005. The print server 104 registers the cache information stored in the print controller 103 also in the image cache information table 1608 (FIG. 24) in RAM 2002 or HDD 2009.

At Step 1115 the print server 104 increments the value of the variable INDEX by 1 to follow Step 1109.

If it is judged at Step 1109 that all INDEXs have been processed, at Step 1116 the print server 104 replaces the image data designation argument in the image designation command by referring to the contents of the image tile table 1607 in RAM 2002, and writes the contents in the file ORDER.DAT in HDD 2009. In this manner, the image data designation argument for designating the image data which the print order file indicates that it is being stored in another print server or in the image server 102, is replaced by the image data designation argument for designating the image data cached in the print server 104.

If it is judged at Step 1104 that the read line is the end line of the file, at Step 1117 the print server 104 closes the files ORDER.ORG and ORDER.DAT.

At Step 1118 the print server 104 processes the script described with page descriptive language in the file ORDER.DAT in HDD 2009 to generate print images. This is performed by reading from HDD 2009 the image data and tiles designated by the image designation argument in ORDER.DAT and developing them onto a designated area. If the script requests to process the images, an image process such as a mosaic process and a color tone changing process is performed, and print images of bit map data are generated and stored in RAM 2002.

At Step 1119 the print server 104 sends the print images generated at Step 1118 to the printer 2012 via the printer control unit 2011 to print the images.

An example of the results of the script shown in FIG. 10 processed in the above-described manner is shown in FIG.

14. As shown in FIG. 14, all the image data designated by the image designation command is replaced by cached image data.

Figure 15:
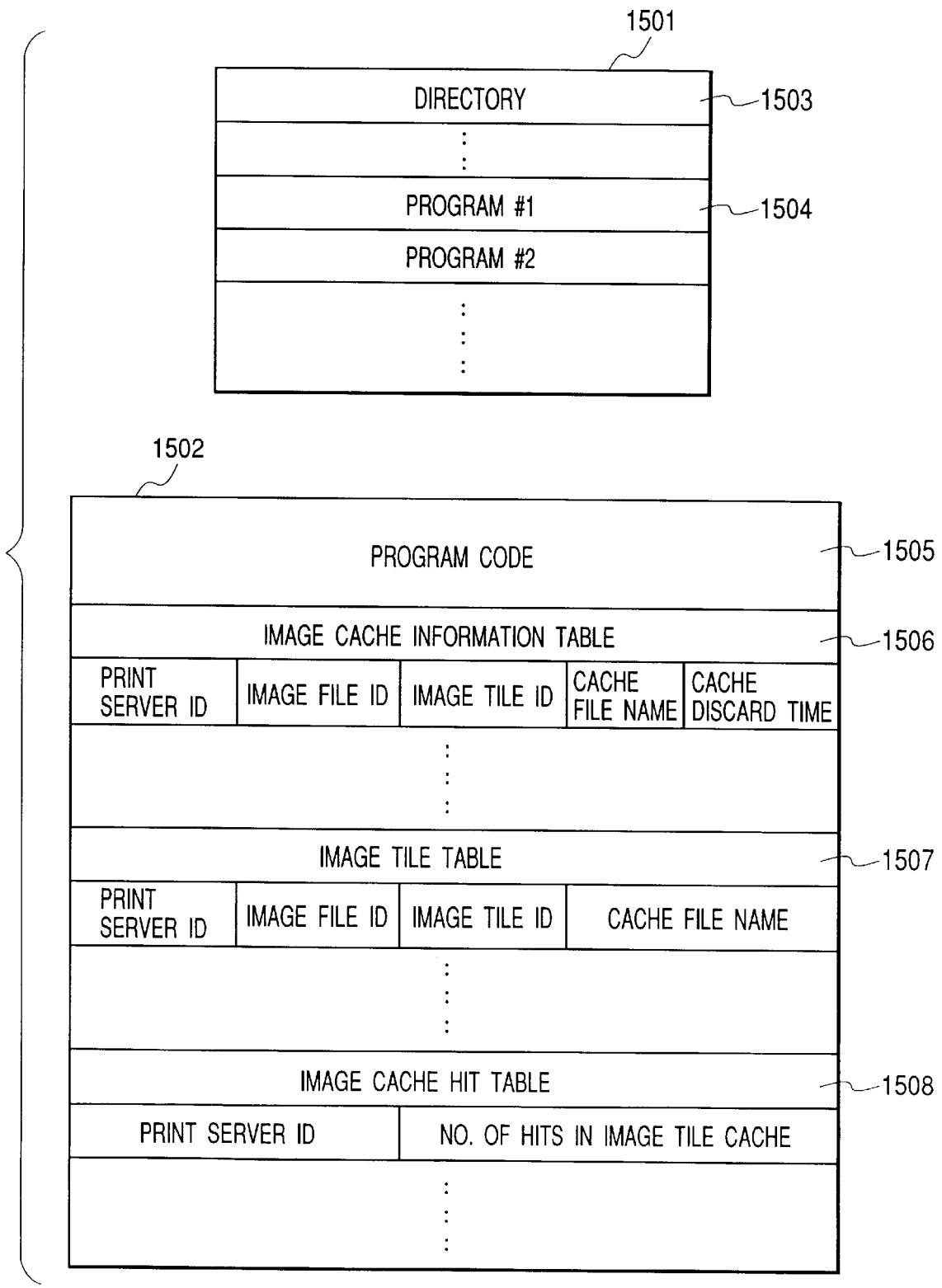
FIG. 15 is a memory map of the print controller.
Figure 16:
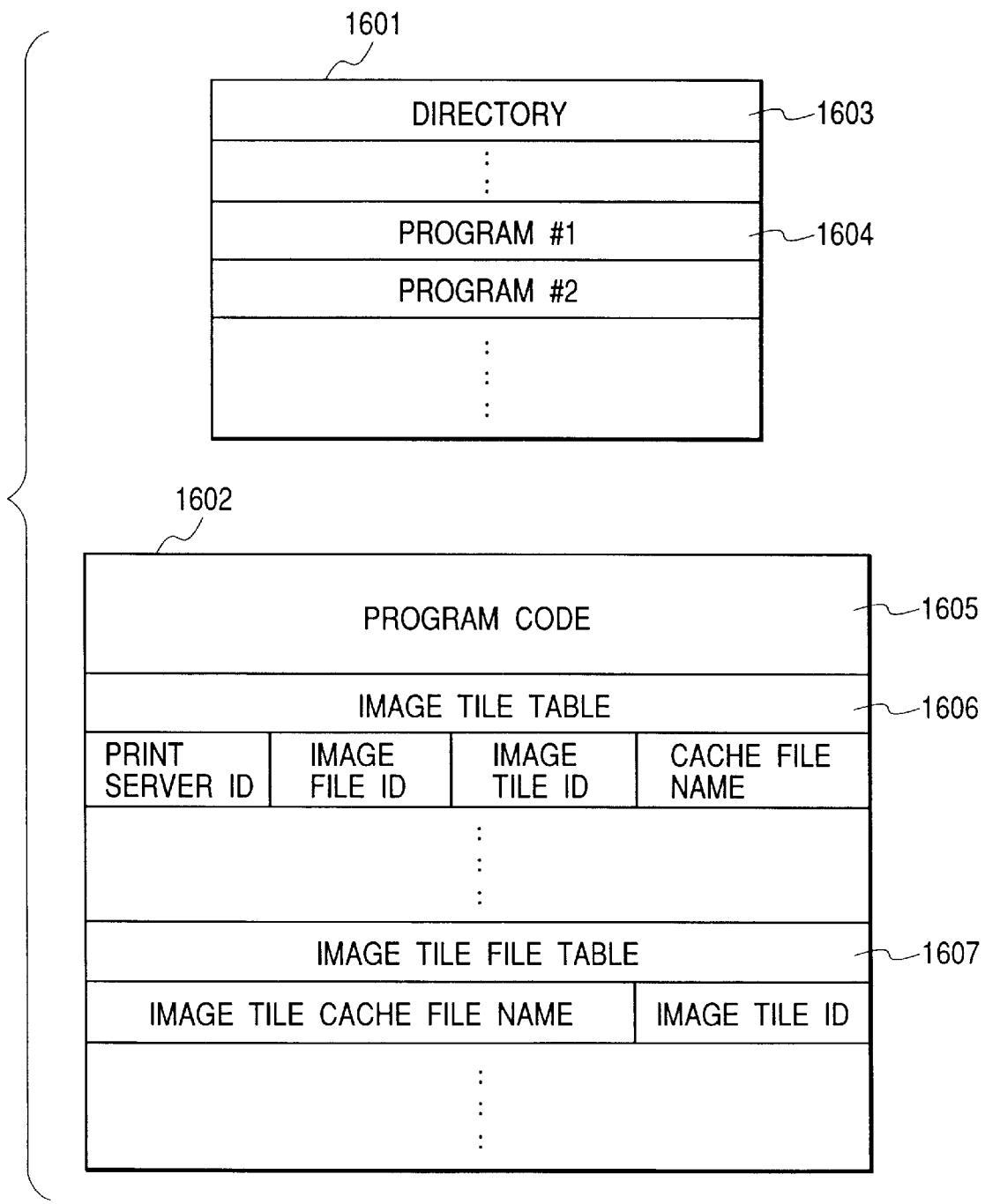
FIG. 16 is a memory map of the print server.

The memory maps of the print controller 103 and print server 104 are shown in FIGS. 15 and 16.

In FIG. 15, reference numeral 1501 represents a memory map of a storage device storing the program realizing the control of the print controller 103 illustrated in the flow chart of FIGS. 7A and 7B. The storage device may be a hard disk in HDD 1009 or a floppy disk in the removable disk drive 1010. Executable files of the program managed by directory information 1503 are allocated in the area at 1504 and following areas.

Reference numeral 1502 represents a memory map when the print controller 103 is operating. Program codes 1505, an image cache information table 1506, an image tile table 1507, and an image cache hit table 1508 are stored in RAM 1002 or ROM 1003.

Reference numeral 1601 shown in FIG. 16 represents a memory map of a storage device storing the program realizing the control of the print server 104. The storage device may be a hard disk in HDD 2009 or a floppy disk in the removable disk drive 2010. Executable files of the program managed by directory information 1603 are allocated in the area at 1604 and following areas.

Reference numeral 1602 represents a memory map when the print server 104 is operating. Program codes 1605, an image tile table 1606 and an image tile file table 1607 are stored in RAM 2002 or ROM 2003.

Each print server periodically monitors the image tile cache file discard time 9005 in the image cache information table 1608 in RAM 2002 or HDD 2009, deletes the row having the image tile cache file discard time 9005 earlier than the current time, from the image cache information table 1606 in RAM 2002, and at the same time deletes the corresponding image tiles at the unrepresented image storage directory in HDD 2009. In this manner, the old image tiles can be deleted and image tiles can be stored efficiently in HDD.

The image tile cache file discard time may be changed not only when an image tile is acquired from the image server 102 or another print server, but also when a tile in the image file of its own print server is used. In this case, re-registration in the print controller 103 is performed.

With the above arrangement, a tile frequently used can be cached in HDD 2009 longer than a file not frequently used. Therefore, the number of times acquiring an image file (tile) from the image server 102 can be reduced and the load on the network can be reduced.

Processes of Image Server

Figure 21:
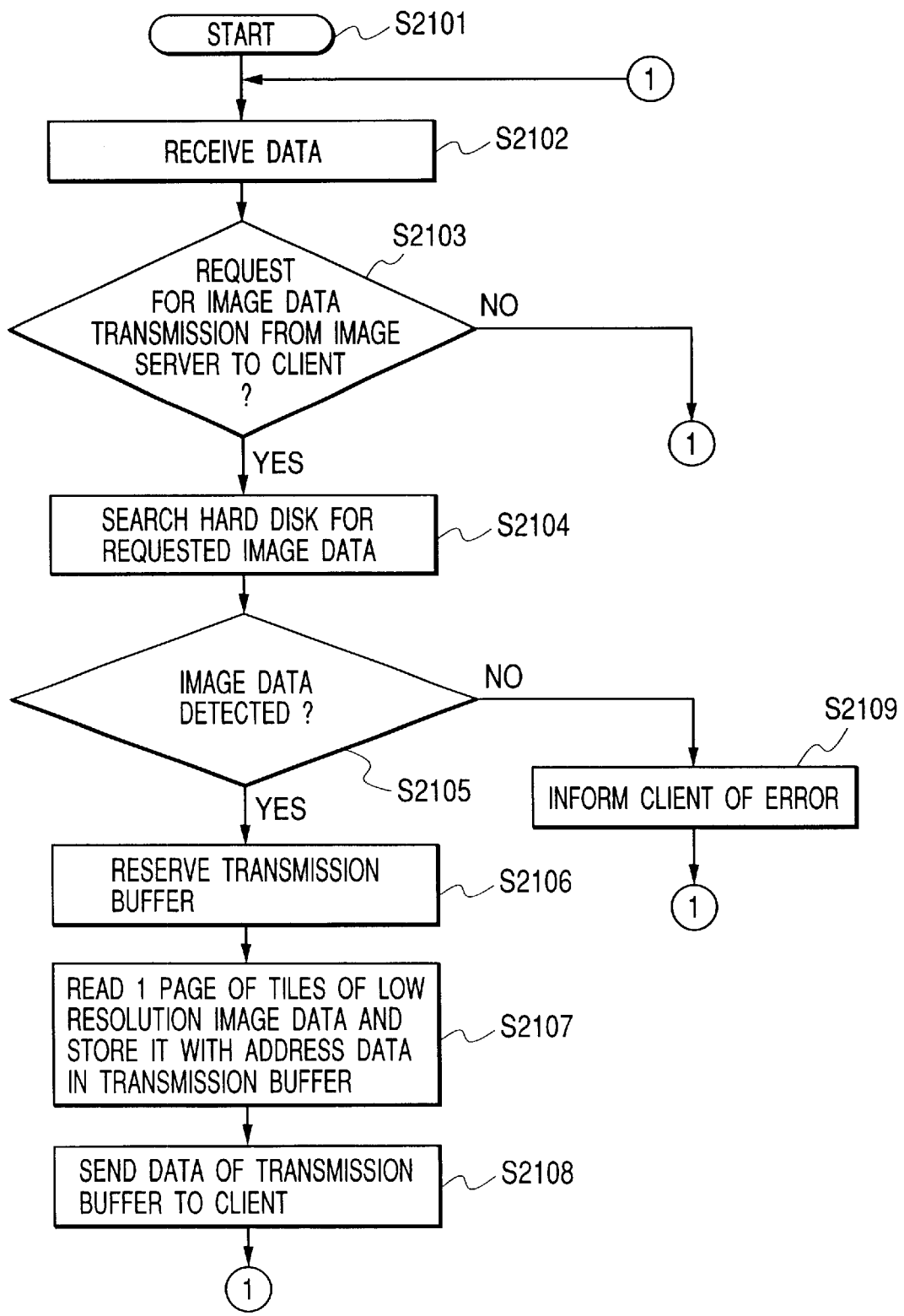
FIG. 21 is a flow chart illustrating the processes to be executed by the image server.
Figure 22:
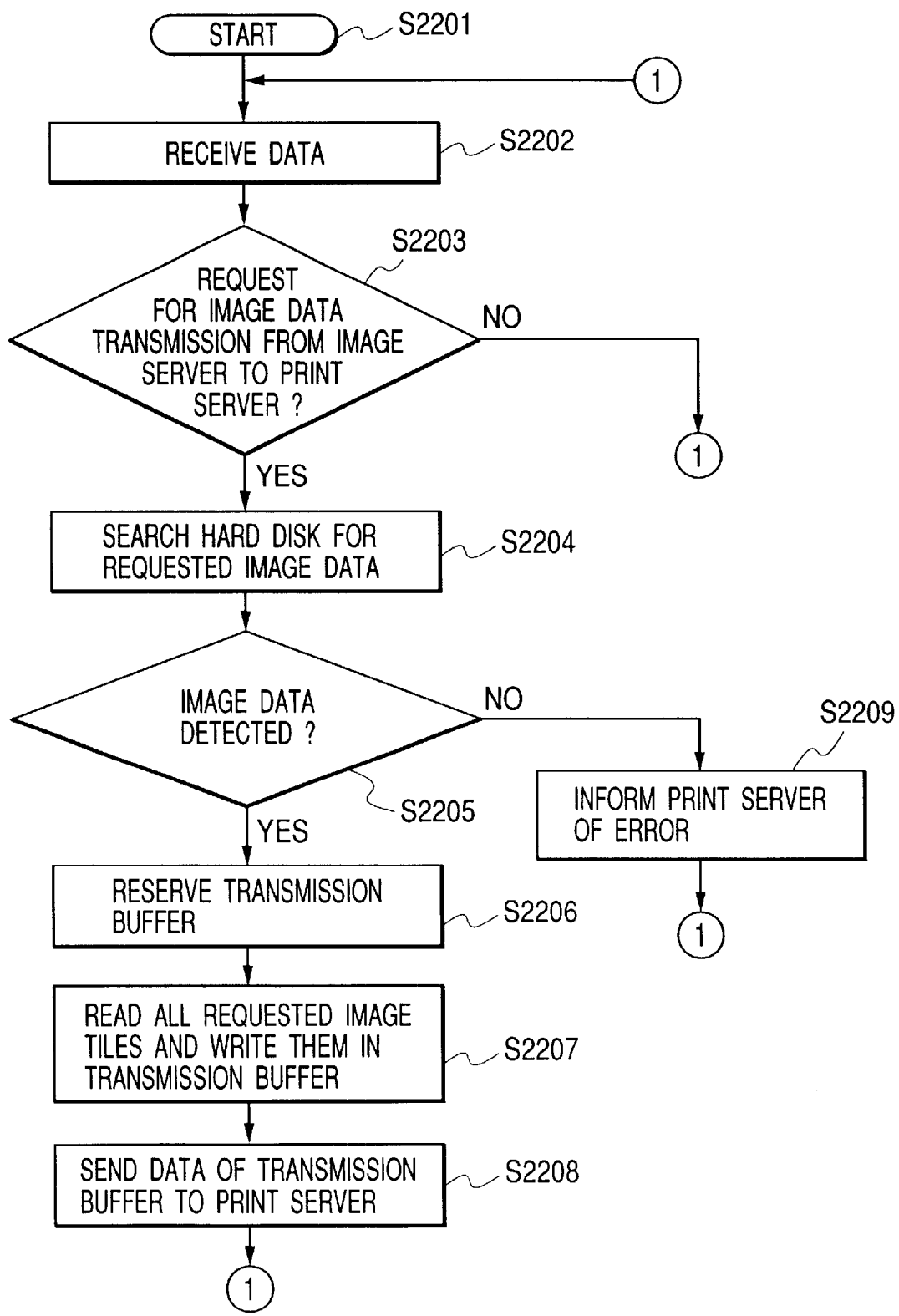
FIG. 22 is a flow chart illustrating the processes to be executed by the image server.

FIGS. 21 and 22 are flow charts illustrating the processes of the image server according to the present invention.

FIG. 21 is a flow chart illustrating the processes of the image server in response to a request from a client.

Referring to FIG. 21, when the process of the image server starts at Step 2101, the image server enters a stand-by state so that a data transmission request from the client 1101, print servers 104 to 106 and print controller 103 can be received.

When any data is received at Step 2102, the image server 102 performs analysis processes at Step 2103 and following Steps. If the received contents correspond to an image data transmission to the client 101 at Step 2103, the processes at Step 2104 and following Steps are performed, whereas if not, a different process is performed and the flow returns to Step 2102. The description of this different process is not given herein.

If the data received at Step 2102 is an image data request from the client, the following processes are performed. At Step 2104 the image data requested at Step 2103 is searched from HDD 3009. It is judged at Step 2105 whether the requested image data is present. If not present, an error is notified to the client at Step 2109 to return to Step 2102 to wait for the next data reception. In this case, a proper process is performed, such as a process of displaying an alarm message on the screen of the client. If the judgement at Step 2105 indicates that the requested image file is present, at Step 2106 a transmission buffer is reserved on RAM 3002 to prepare for the transmission of the image data.

Next, at Step 2107 one page of the image tiles having a lower resolution to be used for the editing process by the client is read from the corresponding image data file, and at Step 2108 written in the reserved transmission buffer.

The image file is managed for each resolution as described with FIG. 2. It is therefore easy to acquire the image tiles having a desired resolution from the image file. Written in the transmission file also at Step 2107 is an identifier uniquely indicating the image file, typically an Internet address. This address is written in the script 306 shown in FIG. 3 as a means for identifying the image file.

Of the information entered in the script, the image tile ID is not designated by the image server at Step 2107, because this ID is determined only during the editing process by the client.

After the data is written in the transmission buffer, this data is transmitted to the client at Step 2108 to thereafter return to Step 2102 to wait for the next data reception.

FIG. 22 is a flow chart illustrating the processes of the image server in response to a request from a print server.

Referring to FIG. 22, when the process of the image server starts at Step 2201, the image server enters a stand-by state so that a data transmission request from the client 1101, print servers 104 to 106 and print controller 103 can be received. When any data is received at Step 2202, the image server 102 performs analysis processes at Step 2203 and following Steps. If the received contents correspond to an image data transmission to the print server or print controller at Step 2203, the processes at Step 2204 and following Steps are performed, whereas if not, a different process is performed and the flow returns to Step 2202. The description of this different process is not given herein.

If the received data is an image data request from the print server (or print controller), at Step 2104 the requested image data is searched from HDD 3009.

If the requested image data is not present at Step 2205, an error is notified to the print server (or print controller) at Step 2209 to return to Step 2202 to wait for the next data reception. In this case, a proper process is performed, such as a process of displaying an alarm message on the screen of the print server (or print controller).

If the requested image file is present, at Step 2206 a transmission buffer is reserved on RAM 3002 to prepare for the transmission of the image data.

Next, at Step 2207 all the image tiles having the requested resolution and ID are read from the corresponding image data file, and written in the transmission buffer reserved at Step 2206.

The image file is managed for each resolution as described with FIG. 2. It is therefore easy to acquire the image tiles having a desired resolution and ID from the image file. After the data is written in the transmission buffer, the data is transmitted to the print server at Step 2208 to thereafter return to Step 2202 to wait for the next data reception.

Program Load from Storage Medium

Figure 23:
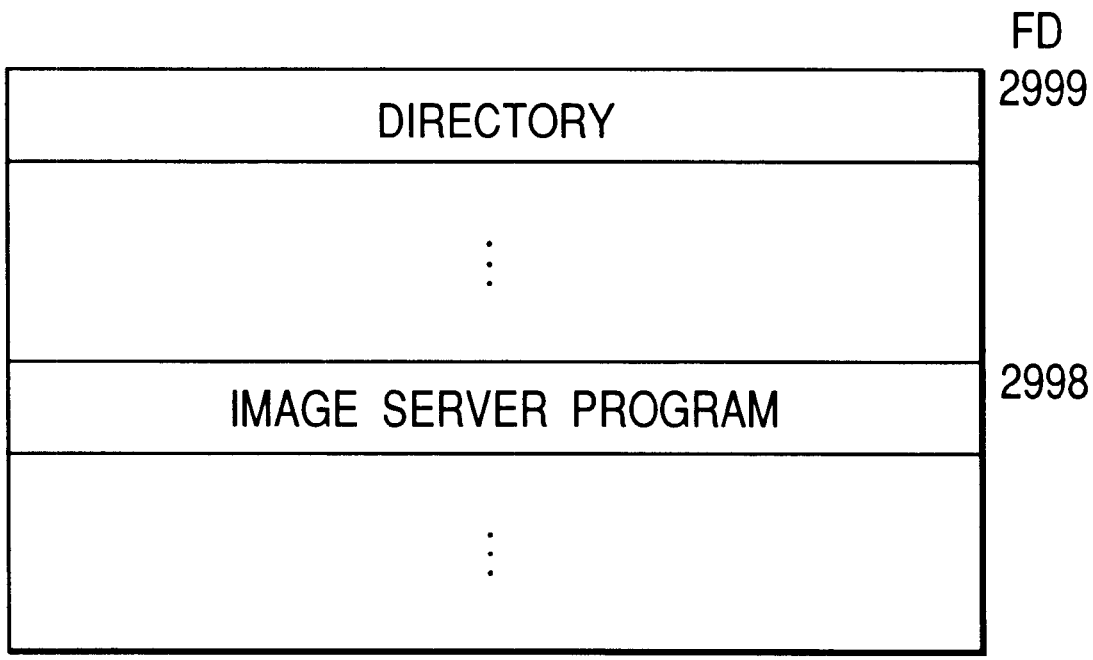
FIG. 23 is a memory map of an external storage device which stores the control program of the image server.

FIG. 23 shows an example of a memory map of an external storage device (removable disk such as a floppy disk) storing the control program of the image server.

In FIG. 23, reference numeral 2999 represents an area in which directory information is stored. The directory information indicates the storage locations 2998 in which the program codes of the image server are stored.

The image server control program is read from FDD 3010 at the locations 2998 of this memory map and loaded din RAM 3002 to become executable.

The objects of the invention can be achieved by supplying a storage device storing software program codes realizing the embodiment functions to a system or apparatus whose computer (CPU or MPU) reads the program codes and execute them.

In this case, the software program codes themselves realize the novel functions of this invention. Therefore, a storage medium storing the program codes constitute the present invention.

The storage medium storing such program codes may be a floppy disk, a hard disk, an optical disk, a magneto-optical disk, a CD-ROM, a CD-R, a magnetic tape, a non-volatile memory card, and a ROM.

Such program codes are other types of embodiments of this invention, not only for the case wherein the embodiment functions are realized by executing the program codes supplied to the computer but also for the case wherein the embodiment functions are realized by the program codes used with an OS (operating system) on which the computer runs to perform the whole or part of the actual processes.

Furthermore, the scope of the invention also includes the case wherein in accordance with the program codes stored in a memory of a function expansion board or unit connected to the computer supplied with the program codes, a CPU or the like of the function board or unit executes part or the whole of the actual tasks for realizing the embodiment functions.

In this embodiment described above, the print controller 103 transmits only the order file (FIG. 10) to the output destination print server 104 to 106, and the image data or tile data among the image data necessary for the printing at the print server, not stored in the print server, is requested to another print server or image server 102. Instead of the print server, the print controller may request for the image data or tile data to another print server or image server. In the processes of this embodiment, this process is performed at Step 718 when the print controller transmits the order file to the print server having the maximum amount of image caching. For example, the print controller transmits information to instruct the image server to transmit the image data or tile data not cached at the print server to this print server. Upon reception of this information, the image server transmits this information as well as the image data or tile data designated by the information, to the output destination print server designated by the information. The print server receives the information and image data or tile data, and in accordance with a job ID contained in the information, judges whether the image data or tile data is used by what print request, and edits and prints out the image data or tile data. With such a control, the system similar to the embodiment system can be realized.

The print controller may acquire the image data from the image server and then transmit it to the output destination print server. In the processes of this embodiment, this is performed by the following processes to be performed at Step 718 when the print controller transmits the order file to the print server. For example, the print controller transmits information to instruct the image server to transmit the image data not cached at the print server to the print controller. Upon reception of this information, the image server returns back this information as well as the image data designated by the information, to the print controller. The print controller receives the information and image data, and in accordance with a job ID contained in the information, judges whether the image data is used by what print request, and transmits the print request (order file) as well as the received image data to the output destination print server determined at Step 718. With such a control, the system similar to the embodiment system can be realized. In this case, however, the number of times transmitting the image data over the network increases and the load on the network cannot be reduced. However, since the print controller can manage this system completely, the functions of the print server can be reduced and become easy to be implemented.

As described so far, according to the first embodiment, when a client uses print services on the network, the client sends to the print server only the information of image data location and editing information in the form of script or PLD. Accordingly, the amount of data to be transmitted from the client can be reduced and the load on the network can be reduced.

Further, since only the necessary image data is transmitted from the image server to the print server, the data transmission amount can be reduced and the load on the network can be reduced.

Still further, the print controller requests for the necessary image data to the print server having the maximum amount of caching. Accordingly, the caches in the print server can be used efficiently, and only the image data not cached is transmitted so that the load on the network can be reduced more than a conventional system.

Furthermore, the print server requests for the necessary image data to other print servers as much as possible. Accordingly, the number of image data transmission requests to the image server which presumably has a considerable load can be reduced and the load on the image server can be reduced.

Furthermore, the print controller randomly sets a file name of the print server. It becomes therefore difficult to guess an original image from the file name in the image storage directory of HDD 2002 of the print server 104 or to reconfigure an original image from a plurality of files. It is therefore possible to prevent fraud use of images not free.

Second Embodiment

In the second embodiment described hereinunder, the print controller has a roll of the image server.

System Structure

Figure 18:
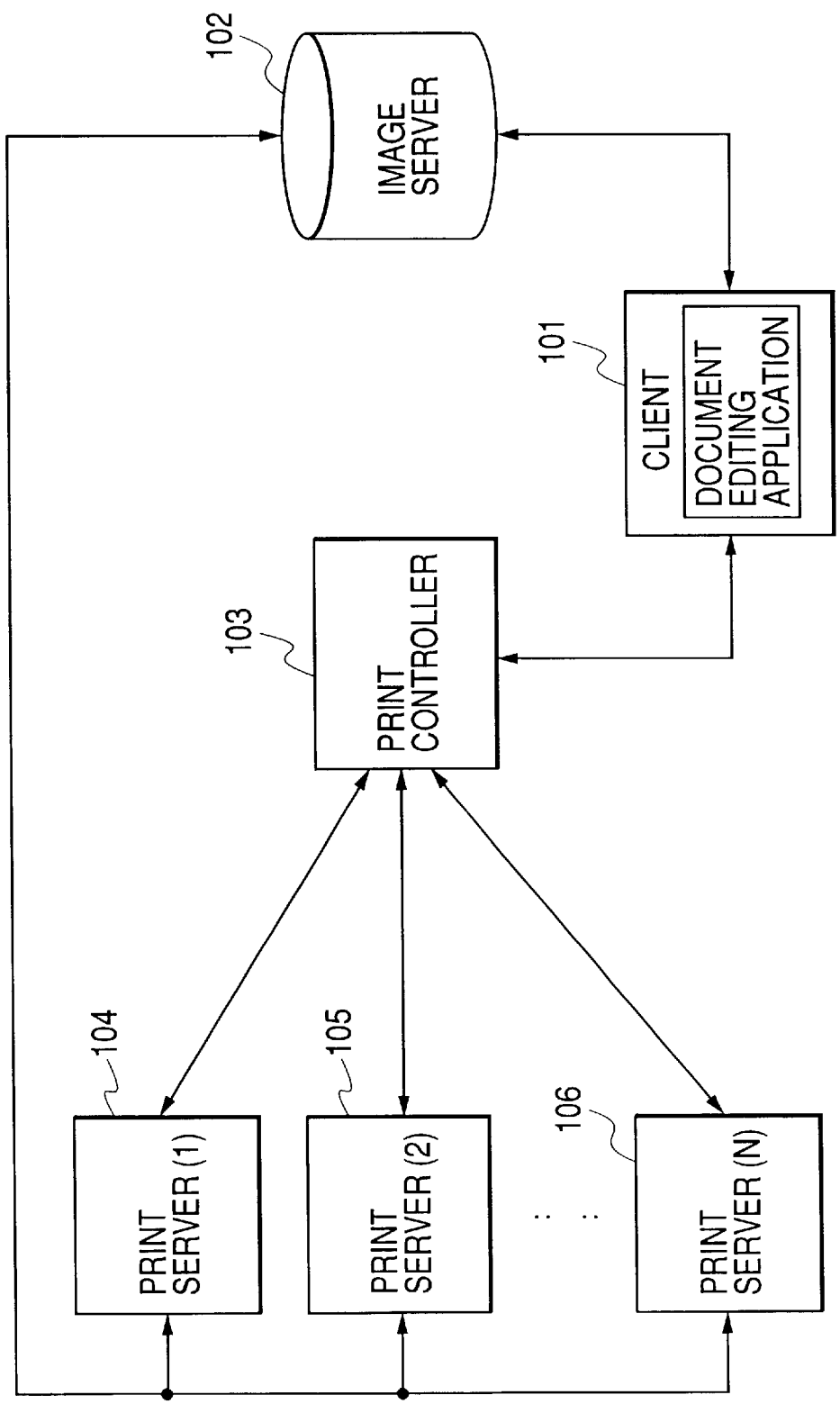
FIG. 18 shows the structure of a print control system according to a second embodiment of the invention.

FIG. 18 shows the structure of a system of the second embodiment which system is constituted of an image control apparatus, an image storing apparatus and an output control apparatus.

In FIG. 18, reference numeral 101 represents a client computer similar to that shown in FIG. 1. The client computer 101 has document editing applications which is provided with a function of generating and editing a document containing character string data, graphic data, image data and the like and a function of converting document data into page descriptive language.

Reference numeral 102 represents an image server as an embodiment of an image storing apparatus of this invention, similar to that shown in FIG. 1. The image server 102 stores image data having a plurality of resolutions, one frame of the image data having an image format managed by a plurality of divided tiles. The image data or image tile data in the image film having a designated resolution is supplied via the network. The format of the image data stored in the image server may be a FlashPix (registered trademark) format, a bit map data format, a JPEG format, a TIF format, a ZIP format and the like.

Reference numeral 103 represents a print controller as an embodiment of an image control apparatus of this invention, similar to that shown in FIG. 1. Similar to the image server 102, the print controller 103 stores in its HDD 1009 image data having a plurality of resolutions in the image format (e.g., FlashPix format) managing one frame by a plurality of divided tiles and ordinary image data (e.g., bit map data), and transmits the image data or image tile data having a designated resolution in the image file to the external via the network. The print controller 103 also receives from the document editing application of the client computer 101 a print script described with page descriptive language and a print order, and selects a print server, which processes the print order, from a plurality of print servers 104 to 106. The print controller 103 transmits the print request order corresponding to the print script and print order to the selected print server.

Reference numerals 104, 105 and 106 each represent a print server as an example of an output control apparatus of this invention, similar to those shown in FIG. 1. The print server processes the print script, in response to a print order from the print controller 103.

The client computer 101, image server 102, print controller 103, and print servers 104, 105 and 106 are interconnected by a network or the Internet.

The block diagrams showing the structure of the image server 102, print controller 103, and print servers 104, 105 and 106 are similar to those of the first embodiment.

Description of Operation

With reference to FIGS. 3 and 6, the overall operation of this system will be described.

By using the document generating application of the client computer 101, a user acquires from the print controller 103 the image data 303 to form a document 302, the image data 303 having the image tile ID 9003 (1, 0) and contained in the image data 203 in the image file 201 having the resolution 1.

As the user performs a print service request operation, the document editing application of the client computer 101 converts the document 302 into the script 306, adds the print order information, and forms a print order file shown in FIG. 6 to transmit it to the print controller 103. The print order information includes: user information (#UserID) such as an address, name and credit card number; and print information such as a print range (#PageRange), a copy number (#Copies) and a payment method (#Payment). FIG. 6 shows an example of the print order file.

Figures 25, 25A:
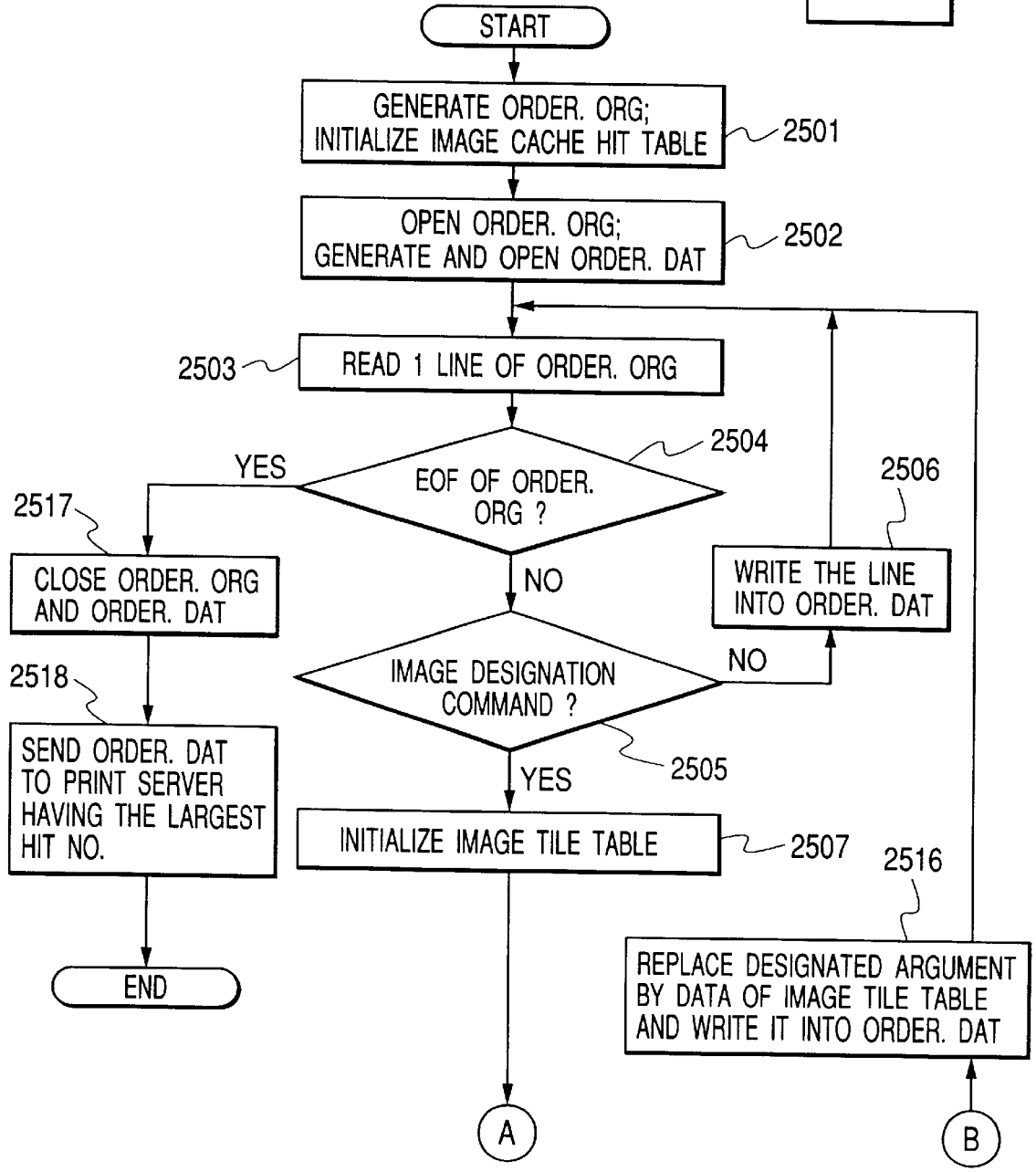
FIG. 25, which is comprised of FIGS. 25A and 25B, is a flow chart illustrating the processes to be executed by the print controller.
Figure 25B:
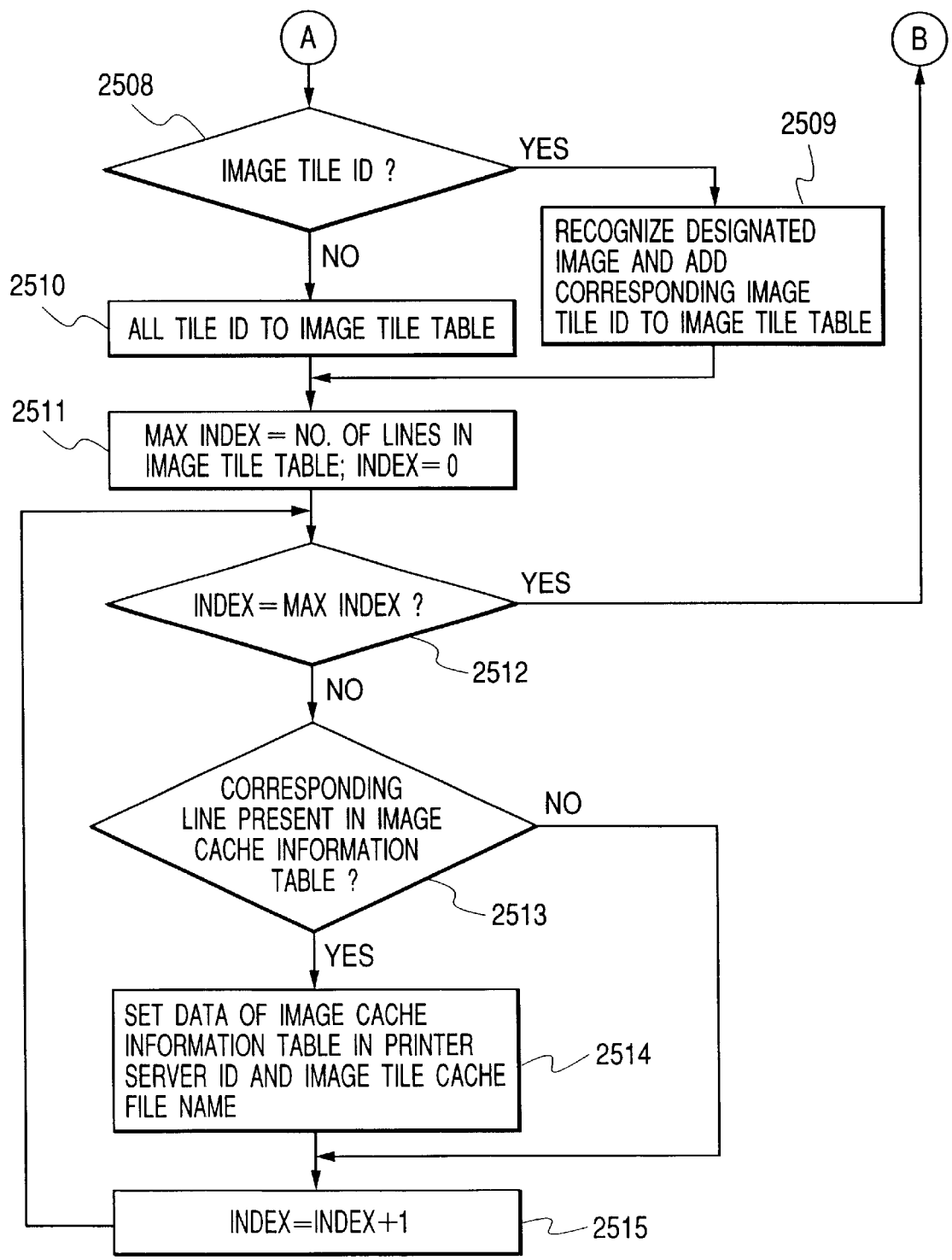

FIGS. 25A and 25B are flow charts illustrating the control program of the print controller 103, FIG. 8 shows the image tile table 1507 stored in RAM 1002 of the print controller, and FIG. 9 shows the image cache hit table 1508 stored in RAM 1002. As described earlier, these may be stored in a hard disk in HDD 1009.

The image tile table 1507 shown in FIG. 8 has the number of rows corresponding to the number of tiles of image data. A print server ID 9001 is an ID of the print server in which image data of the tile is stored. An image file ID 9002 is an ID of an image file storing the tile. An image tile ID is an ID of the tile in the image file. An image tile cache file name 9004 is a name of the file to which the tile is cached.

The image cache hit table 1508 shown in FIG. 9 has rows of a print server ID 9001 and an image cache hit number 9006.

The operation of the print controller 103 will be described with reference to FIGS. 25A, 25B, and FIGS. 8 and 9.

At Step 2501, the print controller 103 receives the print order file (FIG. 6) containing image editing information indicating an editing method for the image data in the print controller 103, from the client 101 having the document editing application via the network interface 1004. Similar to the first embodiment, it is obvious that the editing information may indicate an editing method of image data not in the print controller 103 but in the image server 102. The print controller 103 stores the received print order file in a hard disk in HDD 1009 as a file ORDER.ORG, and initializes the contents of the image cache hit table 1508 (FIG. 9) in RAM 1002.

At Step 2502, the print controller 103 opens the input file ORDER.ORG in HDD 1009 and generates an output file ORDER.DAT in a hard disk in HDD 1009 to open it.

At Step 2503, the print controller 103 reads one line of the file ORDER.ORG in HDD 1009.

At Step 2504, the print controller 103 checks whether the read line is the last of the file ORDER.ORG in HDD 1009. If the last line, the flow advances to Step 2517, whereas if not, the flow advances to Step 2505.

At Step 2505, the print controller 103 judges whether the read row is an image designation command ("image( )" in FIG. 6). If not, the flow advances to Step 2506, whereas if the image designation command, the flow advances to Step 2507.

At Step 2506 the print controller 103 writes the row read at Step 2503 into the file ORDER.DAT to return to Step 2503.

At Step 2507 the print controller 103 initializes the image tile table 1507 in RAM 1002.

At Step 2508 the print controller 103 checks whether arguments of the image designation command in the order file ORDER.ORG contain an image tile designation (image tile ID). If there is the image tile designation of the image tile ID 9003, the flow advances to Step 2509, whereas if not, the flow advances to Step 2510.

At Step 2509 the print controller 103 calculates the image tile ID 9003 of the image 205 having the resolution 0 in the image file 201 designated by the image file ID 9002, the image 205 corresponding to the image designated by the image file ID, resolution and image tile ID in the order file, and adds the image file ID 9002 and the calculated image tile ID 9003 to the items of image file ID 9002 and image tile ID 9003 of the image tile table 1507 (FIG. 8) in RAM 1002. In this case, the print controller 103 designates NONE to the items of the print server ID 9001 and image tile cache file name 9004 of the image tile table 1507 (FIG. 8) in RAM 1002. Thereafter, the flow advances to Step 2511.

At Step 2510 the print controller 103 acquires the numbers (X, Y) of tiles in the X- and Y-directions constituting the image 205 having the resolution 0 in the image file 201 designated by the image file ID 9002 in the image designation command. The numbers (X, Y) are derived from the information in the image file stored in HDD 1009 of the print controller 103 and designated by the image file ID 9002.

Next, with reference to the numbers (X, Y), the print controller 103 adds all image tile IDs 9003 constituting the image having the resolution 0 in the image file 201 designated by the image file ID 9002, as well as the image file ID 9002, to the image tile table 1507 in RAM 1002. In this case, the print controller 103 designates NONE to the items of the print server ID 9001 and image tile cache file name 9004 of the image tile table 1507.

At Step 2511 the print controller 103 sets the number of rows of the image tile table 1507 in RAM 1002 to a variable MAX_INDEX and initializes a variable INDEX to 0. The variable MAX_INDEX contains the number of rows of the order file now being edited, i.e., the number of already read tiles.

At Step 2512 the print controller 103 judges whether the value of the variable INDEX is equal to the value of the variable MAX_INDEX. If equal, the flow advances to Step 2516, whereas if not, the flow advances to Step 2513.

At Step 2513 the print controller 103 checks whether the row having the same image file ID 9002 and image tile ID 9003 as those of the INDEX-th row of the image tile table 1507 in RAM 1002 is contained in the image cache information table 1506 (FIG. 17) in RAM 1002. If not contained, the flow advances to Step 2515, whereas if contained, the flow advances to Step 2514.

FIG. 17 shows the image cache information table 1506. The image cache information table 1506 in RAM 1002 is initialized when the print controller 103 is started up.

The print server 104 receives via the print controller 103 the print order file generated by the client computer 101. If the image designation command in the print order file contains an image tile not present in HDD 2009, the print server 104 copies the image tile file from the image server 102 or another print server 105, 106 and stores it in HDD 2009 as a cache file. As described in the first embodiment, in this case, the print server 104 supplies the print controller 103 with the information on the cache file stored in HDD 2009.

Upon reception of the image cache information from the print server 104, the print controller 103 adds a row to the image cache information table 1506 (FIG. 17) in RAM 1002 and sets the notified cache file information to the row. The print controller 103 registers a time (image tile cache file discard time 9005) when a cache file is discarded and made invalid, in the image cache information table 1506 in RAM 1002, this time item being an additional item not set to the image tile table 1507. The print controller 103 periodically checks the contents of each row of the image cache information table 1506 in RAM 1002, and deletes the row having the image tile cache file discard time earlier than the current time, from the image cache information table 1506 in RAM 1002.

At Step 2514 the print controller 103 sets the terms of the print server ID 9001 and image tile cache file name 9004 at the row of the image cache information table 1506 in RAM 1002, the row having the same image file ID 9002 and image tile ID 9003 in the image tile table 1507 at the INDEX-th, to the terms of the print server ID 9001 and image tile cache file name 9004 of the image tile table 1507 in RAM 1002 at the INDEX-th row.

At the same time, the print controller 103 checks whether the image cache hit table 1508 in RAM 1002 has the row having the same print server ID 9001 as that set to the image tile table 1507 at the INDEX-th row. If it has such a row, the value of the image tile cache hit number 9006 at the row is incremented by 1, whereas if it has not the row, a row is added to the image cache hit table 1508 in RAM 1002, the term of the print server ID 9001 is set with the term in the print server ID 9001 at the INDEX-th row of the image tile table 1507 in RAM 1002, and the term of the image tile cache hit number 9006 is set with 1.

At Step 2515, the print controller 103 increments the value of the variable INDEX by 1 and the flow returns to Step 2512.

At Step 2516 the print controller 103 replaces the image data designation argument in the image designation command by the contents of the image tile table 1507 in RAM 1002, and writes the contents in the file ORDER.DAT in HDD 1009 to follow Step 2503. In this manner, the image data designation argument (represented by a lower resolution) in the image designation command in the print order file is replaced by the tile image having a high resolution 0, in this embodiment.

At Step 2517 the print controller 103 closes the files ORDER.ORG and ORDER.DAT in HDD 1009.

At Step 2518 the print controller 103 transmits the print order file ORDER.DAT in HDD 1009 to the print server designated by the print server ID 9001 having the maximum cache hit number, with reference to the image tile cache hit number 9006 in RAM 1002. If the cache hit number is the same, a desired one of the print servers having the maximum hit number is selected and the print order file is transmitted to the selected one.

As described above, in the second embodiment, upon reception of a print order (including editing information) from the client 101, the print controller 103 controls to transmit the print request information to the destination print server.

As described above, the print controller 103 of the second embodiment has a function of the image server 102. Obviously, it has, therefore, the function of realizing the procedure of the image server of the first embodiment described with the flow charts of FIGS. 21 and 22.

Figures 19, 19A:
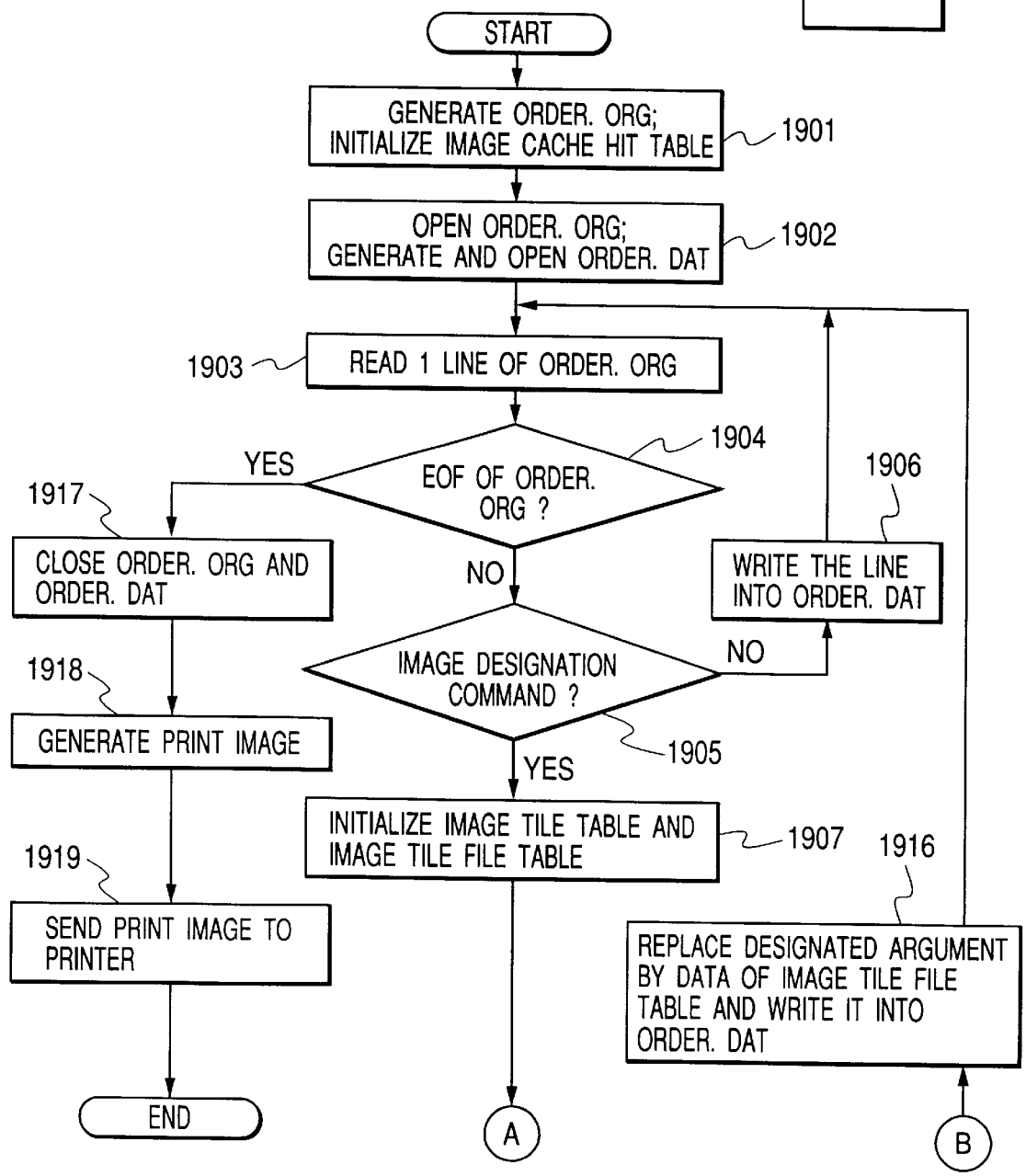
FIG. 19, which is comprised of FIGS. 19A and 19B, is a flow chart illustrating the processes to be executed by the print server according to another embodiment of the invention.
Figure 19B:
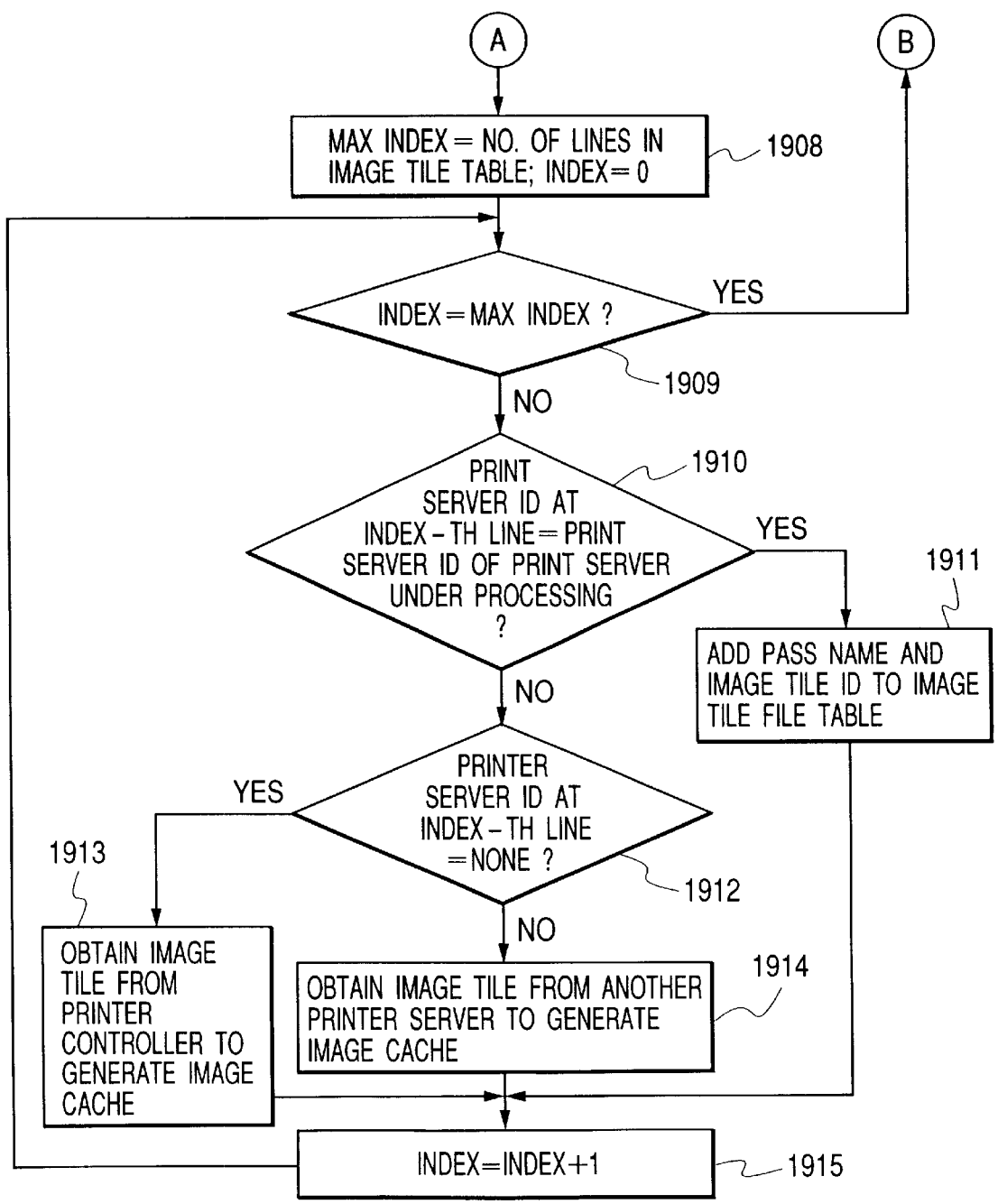

Next the processes to be executed by the print server as the output control apparatus of this invention will be described. FIGS. 19A and 19B are flow charts illustrating the processes to be executed by the print server 104.

The operation of the print server 104 will be described with reference to FIGS. 19A and 19B and FIGS. 12 and 13.

The print server 104 receives the print order file ORDER.DAT from the print controller 103 via the network interface 2004. At Step 1901 the print server 104 stores the received print order file in HDD 2009 as a file ORDER.ORG.

At Step 1902, the print server 104 opens the input file ORDER.ORG in HDD 2009 and generates an output file ORDER.DAT in a hard disk in HDD 2009 to open it.

At Step 1903, the print server 104 reads one line of the file ORDER.ORG in HDD 2009.

At Step 1904, the print server 104 checks whether the read line is the last of the file ORDER.ORG in HDD 2009. If the last line, the flow advances to Step 1917, whereas if not, the flow advances to Step 1905.

At Step 1905, the print server 104 judges whether the row read from the file ORDER.ORG is an image designation command ("image( )" in FIG. 10). If not the flow advances to Step 1906, whereas if the image designation command, the flow advances to Step 1907.

At Step 1906 the print server 104 writes the row read at Step 1903 into the file ORDER.DAT to return to Step 1903.

At Step 1907 the print server 104 initializes the contents of the image tile table 1606 and image tile file table 1607 in RAM 2002.

At Step 1908 the print server 104 develops the image data description contents in the image designation command onto the image tile table 1606 in RAM 2002. The print server 104 sets the number of rows of the developed image tile table 1606 to the variable MAX_INDEX, and initializes the variable INDEX to 0.

At Step 1909 the print server 104 judges whether the value of the variable IN DEX is equal to the value of the variable MAX_INDEX. If equal, the flow advances to Step 1916, whereas if not, the flow advances to Step 1910.

At Step 1910 the print server 104 checks whether the print server ID 9001 at the INDEX-th row in the image tile table 1606 in RAM 2002 is the same as the print server ID 9001 of the print server under operation. If the same, it means that the print server under operation has the tile at the INDEX-th row and the flow advances to Step 1911. If not the same, it means that the tile at the INDEX-th row is present in another print server or in the print controller 103 and the flow advances to Step 1912.

At Step 1911 the print server 104 adds a path name and the image tile ID 9003 to the image tile file table 1607 in RAM 2002 to follow Step 1915. The path name is formed by adding, to the directory name at which the image data is stored in HDD 2009, the image tile cache file name 9004 at the INDEX-th row in the image tile table 1606 in RAM 2002.

At Step 1912, the print server 104 judges whether or not the print server ID 9001 at the INDEX-th row in the image tile table 1606 in RAM 2002 is NONE. If NONE, it means that the corresponding image tile is not stored in any one of the print servers. Therefore, in order to acquire the image tile from the print controller 103, the flow advances to Step 1913. Whereas if not NONE, it means that the image tile is stored in another print server and the flow advances to Step 1914.

At Step 1913 the print server 104 requests for the image tile cache file name 9004 to the print controller 103. The print controller 103 generates a file name which is unique in th e system and random, and returns it to the print server 104. With a random file name, it becomes difficult to guess an original image from the file name in the image storage directory of HDD 2002 of the print server 104 or to reconfigure an original image from a plurality of files. It is therefore possible to prevent fraud use of images not Next, the print server 104 requests for the image tile having the image tile ID 9003 and the resolution 0 and stored in the image file having the image file ID 9002 at the INDEX-th row in the image tile table 1606 in RAM 2002, to the print controller 103. After the corresponding image tile is acquired, it is stored in HDD 2009 at the image storage directory, under the image tile cache file name 9004 acquired from the print controller 103, and the path name and image tile ID 9003 are added to the image tile file table 1607 in RAM 2002.

At the same time, the print server 104 registers the cache state information in the print controller 103, by using as arguments the printer server ID 9001, image file ID 9002, image tile ID 9003, image tile cache file name 9004 and image tile cache file discard time 9005. The image tile cache file discard time 9005 is calculated by the print server 104 by adding the time when the image tile cache file is generated in HDD 2009 to a cache holding time set by the print server 104. The print server 104 registers the cache in formation stored in the print controller 103 also in the image cache information table 1608 (FIG. 18) in RAM 2002 or HDD 2009. Thereafter, the flow advances to Step 1915.

Similar to Step 1913, at Step 1914 the print server 104 requests for the image tile cache file name 9004 to the print controller 103.

Next, the print server 104 requests for the image tile having the image tile ID 9003 and the resolution 0 and stored in the image file having the image file ID 9002 at the INDEX-th row in the image tile table 1606, to the print server having the print server ID 9001 in the image tile table 1606 in RAM 2002 at the INDEX-th row. After the corresponding image tile is acquired, it is stored in HDD 2009 at the image storage directory, under the image tile cache file name 9004 acquired from the print controller 103, and the path name and image tile ID 9003 are added to the image tile file table 1607 in RAM 2002.

At the same time, the print server 104 registers the cache state information in the print controller 103, by using as arguments the printer server ID 9001, image file ID 9002, image tile ID 9003, image tile cache file name 9004 and image tile cache file discard time 9005. The print server 104 registers the cache information stored in the print controller 103 also in the image cache information table 1608 (FIG. 18) in RAM 2002 or HDD 2009.

At Step 1915 the print server 104 increments the value of the variable INDEX by 1 to follow Step 1909.

At Step 1916 the print server 104 replaces the image data designation argument in the image designation command by referring to the contents of the image tile table 1607 in RAM 2002, and writes the contents in the file ORDER.DAT in HDD 2009.

At Step 1917 the print server 104 closes the files ORDER.ORG and ORDER.DAT.

At Step 1918 the print server 104 processes the script described with page descriptive language in the file ORDER.DAT in HDD 2009 to generate print images.

At Step 1919 the print server 104 sends the print images generated at Step 1918 to the printer 2012 via the printer control unit 2011 to print the images.

As described so far, according to the second embodiment, when a client uses print services on the network, the client sends to the print server only the information of image data location and editing information in the form of script or PLD. Accordingly, the amount of data to be transmitted from the client can be reduced and the load on the network can be reduced.

Further, since only the necessary image data is transmitted from the print controller to the print server, the data transmission amount can be reduced and the load on the network can be reduced.

Still further, the print controller requests for the necessary image data to the print server having the maximum amount of caching. Accordingly, the caches in the print server can be used efficiently, and only the image data not cached is transmitted from the print controller so that the load on the network can be reduced more than a conventional system.

Furthermore, the print server requests for the necessary image data to other print servers as much as possible. Accordingly, the number of image data transmission requests to the print controller which presumably has a considerable load can be reduced and the load on the image server can be reduced.

Further more, the print controller randomly sets a file name of the print server. It becomes therefore difficult to guess an original image from the file name in the image storage directory of HDD 2002 of the print server 104 or to reconfigure an original image from a plurality of files. It is therefore possible to prevent fraud use of images not free.

The print controller 103 of the image control apparatus of this embodiment of the invention is controlled as described above. The characteristic configurations of the image control apparatus of this embodiment will be described hereinunder.

The image control apparatus comprises: receiving means (network interface 1004, Step 701) for receiving editing information (FIG. 6) of image data stored in an image storing apparatus (image server 102) from a client; determining means (function of CPU 1001 determined particularly at Step 718 shown in FIGS. 7A and 7B) for determining an output destination of output control apparatuses (print server) in accordance with the editing information received by the receiving means; and outputting means (network interface, Step 718) for outputting a print order (FIG. 10) corresponding to the editing information to the output destination of the control apparatuses determined by the determining means. It is therefore possible to provide an apparatus in which the output destination can be determined in accordance with the editing information supplied from the client, and the print order can be output.

The image control apparatus further comprises managing means (CPU 1001 using the memory map shown in FIG. 15) for storing and managing identification information of the output control apparatuses and image data stored in the output control apparatuses. It is therefore possible to provide an apparatus in which what image data is stored in the output destination of the output control apparatuses can be always grasped.

The managing means receives the identification information for identifying the image data stored in the output control apparatuses, from the output control apparatuses (transmission from the print server 104 to the print controller 103 at Steps 1113 and 1114 in FIGS. 11A and 11B. It is therefore possible to provide an apparatus in which what image data is stored in the output destination of the output control apparatuses can be managed always by using latest information.

The determining means determines as the output destination the output control apparatus having a largest amount of image data designated by the editing information, in accordance with the identification information stored and managed by the managing means (function of CPU 1001 using the control program at Steps 712 to 715). It is therefore possible to provide an apparatus in which the output control apparatus having a largest amount of image data necessary for printing can be determined so that the number of times transmitting image data after the print order can be reduced and a load on the network can be reduced.

The image control apparatus further comprises instructing means (function of CPU 1001 described with Step 718) for instructing the image storing apparatus to transmit image data not stored in the output control apparatus determined as the output destination by the determining means, to the output control apparatus. Since the image control apparatus instructs the image storing apparatus to transmit image data, the output control apparatus only waits for image data reception. It is therefore possible to provide an apparatus in which circuits and modules for collecting image data are not necessary.

The print order (FIG. 10) transmitted to the output control apparatus includes information of image data of a high resolution converted (Step 716 in FIGS. 7A and 7B) from image data of a low resolution designated by the editing information. It is therefore possible to provide an apparatus in which the output control apparatus uses the image data designated by the print order so that it is not necessary to prepare a specific correspondence table.

The identification information (FIG. 17) stored and managed by the managing means includes information of a time when image data is discarded, and after this time lapses, a corresponding identification information is deleted. It is therefore possible to provide an apparatus in which at the same time when the image data is discarded in the output control apparatus, the identification information is deleted in the image control apparatus.

The image control apparatus further comprises name setting means (function of CPU 1001 for randomly setting a file name) for setting an optional file name of image data stored in the output control apparatus. It is therefore possible to provide an apparatus in which it becomes difficult to guess an original image from the file name in the image storage directory of the storing means of the output control apparatus, to reconfigure an original image from a plurality of files, or to prevent fraud use of images not free.

The image control apparatus further comprises: storing means (hard disk 1009) for storing image data of a plurality of resolutions for each set of image data; and controlling means (CPU 1001) responsive to a request from the client for controlling to transmit image data of a low resolution to the client (FIG. 21 of the second embodiment) and for controlling to transmit image data of a high resolution to be used for the editing information received from the client, to the output control apparatus (FIG. 22 of the second embodiment). It is therefore possible to provide an apparatus having a function of the image storing apparatus.

The managing means stores and manages the identification information in the unit of a plurality of tiles divided from each set of image data. It is therefore possible to provide an apparatus in which since the image data can be transmitted in the unit of necessary tiles, a load on data transmission on the network can be reduced.

The editing information is described in a script format. It is therefore possible to provide an apparatus in which the client can describe only the history of editing information of the image data in the script format so that the data amount can be reduced and the editing information can be formed easily.

The client and the output control apparatus are interconnected via the Internet. It is therefore possible to provide print services via the Internet.

The characteristic configurations of the image server 102 as an embodiment of the image storing apparatus of this invention will be described hereinunder.

The image storing apparatus of this invention connected to a client (101) and an output control apparatus (104–106) via a network, comprises: storing means (HDD 3009) for storing image data of a plurality of resolutions for each set of image data; and controlling means (function of CPU 4001 as illustrated in FIGS. 21 and 22) responsive to a request from the client for controlling to transmit image data of a low resolution to the client (flow chart of FIG. 21) and for controlling to transmit image data of a high resolution corresponding to the image data of the low resolution to the output control apparatus (flow chart of FIG. 22). It is possible to provide an apparatus in which a small amount of image data of a low resolution is transmitted to the client for image data editing, whereas a large amount of image data of a high resolution is transmitted to the output control apparatus for image data printing, so that a load on the network can be reduced.

The controlling means executes a control operation after an instruction of transmitting the image data of the high resolution to the output control apparatus (print server) is received from an external apparatus (print controller 103 in the embodiment) different from the output control apparatus. It is therefore possible to provide an apparatus in which requested image data is transmitted from the external apparatus.

The controlling means controls to transmit image data in the unit of tile to the client or to the output control apparatus. It is therefore possible to reduce a load on data transmission of the network because a necessary small amount of image data is transmitted.

The image storing apparatus is connected to the client or to the output control apparatus via the Internet. It is therefore possible to efficiently transmit image data via the Internet.

The characteristic configurations of the print server as an embodiment of the output control apparatus of this invention will be described hereinunder.

The output control apparatus of this invention connected to an image control apparatus (print controller 103) via a network, comprises: receiving means for receiving editing information (FIG. 10) from the image control apparatus; acquiring means (function of CPU 2001 using the control program illustrated at Steps 1110 to 1115 of FIGS. 11A and 11B) for acquiring image data from an external apparatus in accordance with the editing information; and editing means (function of CPU 2001 using the control program at Step 1118) for editing the image data acquired by the acquiring means in accordance with the editing information to generate output data. It is therefore unnecessary for the image control apparatus to request for a print order to the output control apparatus after the image data is collected, because necessary image data is collected and edited by receiving the information discriminating the image data and the editing information indicating how the image data is edited.

The output control apparatus further comprises storing means (HDD 2009) for storing the image data acquired by the acquiring means, wherein the editing means generates output image data of one page from the image data acquired by the acquiring means (Steps 1113 and 1114) and the image data stored in the storing means (Step 1111). It is therefore possible to provide an apparatus capable of collecting image data stored in a plurality of apparatuses and generating image data of one page therefrom.

The acquiring means acquires image data of a high resolution from the image control apparatus. It is therefore possible to provide an apparatus in which the image data can be printed at a high resolution than the image data used for editing by the client and image data is transmitted only once over the network, so that a load on the network can be reduced.

The acquiring means acquires image data of a high resolution from an image storing apparatus (image server 102) which stores image data of a plurality of resolutions for each set of image data. It is therefore possible to provide an apparatus in which the image data can be printed at a high resolution than the image data used for editing by the client and image data is transmitted only once over the network, so that a load on the network can be reduced.

The output control apparatus further comprises erasing means for erasing image data stored in the storing means. It is therefore possible to provide an apparatus in which the storing means does not become insufficient in the memory amount in storing image data.

The erasing means erases the image data stored in the storing means when a predetermined time lapses. It is possible to provide an apparatus in which during the period while there is a possibility of reusing image data, this image data is left in the storing means so that it is not necessary to acquire it from the external apparatus, whereas during the period while there is only a small possibility of reusing image data, this image data is erased, so that the memory amount can be used efficiently.

The output control apparatus further comprises printing means (Step 1119, PRT 2012) for printing the output data edited by the editing means. It is therefore possible to provide an apparatus capable of printing visual images on a recording medium.

The output control apparatus further comprises notifying means (transmission at Steps 1113 and 1114 of FIGS. 11A and 11B from the print server 104 to the print controller 103) for notifying the image control apparatus of identification information of the image data stored in the storing means. It is therefore possible to provide an apparatus capable of making the image control apparatus always grasp the image data stored in the storing means.

The editing information is data described in a script format. It is therefore possible to provide an apparatus in which the client can describe only the history of editing information of the image data in the script format so that the data amount can be reduced and the editing information can be formed easily.

The output control apparatus is connected to the image control apparatus via the Internet. It is therefore possible to provide print services via the Internet.

Third Embodiment

In the third embodiment of the invention, a function of transmitting a designated local image file to the image server 102 and registering it therein will be described as one function of the document editing application of the client computer 101 as an embodiment of the information processing apparatus of the invention.

System Structure

The structure of a system of the third embodiment which system is constituted of an image control apparatus, an image storing apparatus and an output control apparatus, is the same as that of the first embodiment shown in FIG. 1.

Client Computer

Figure 26:
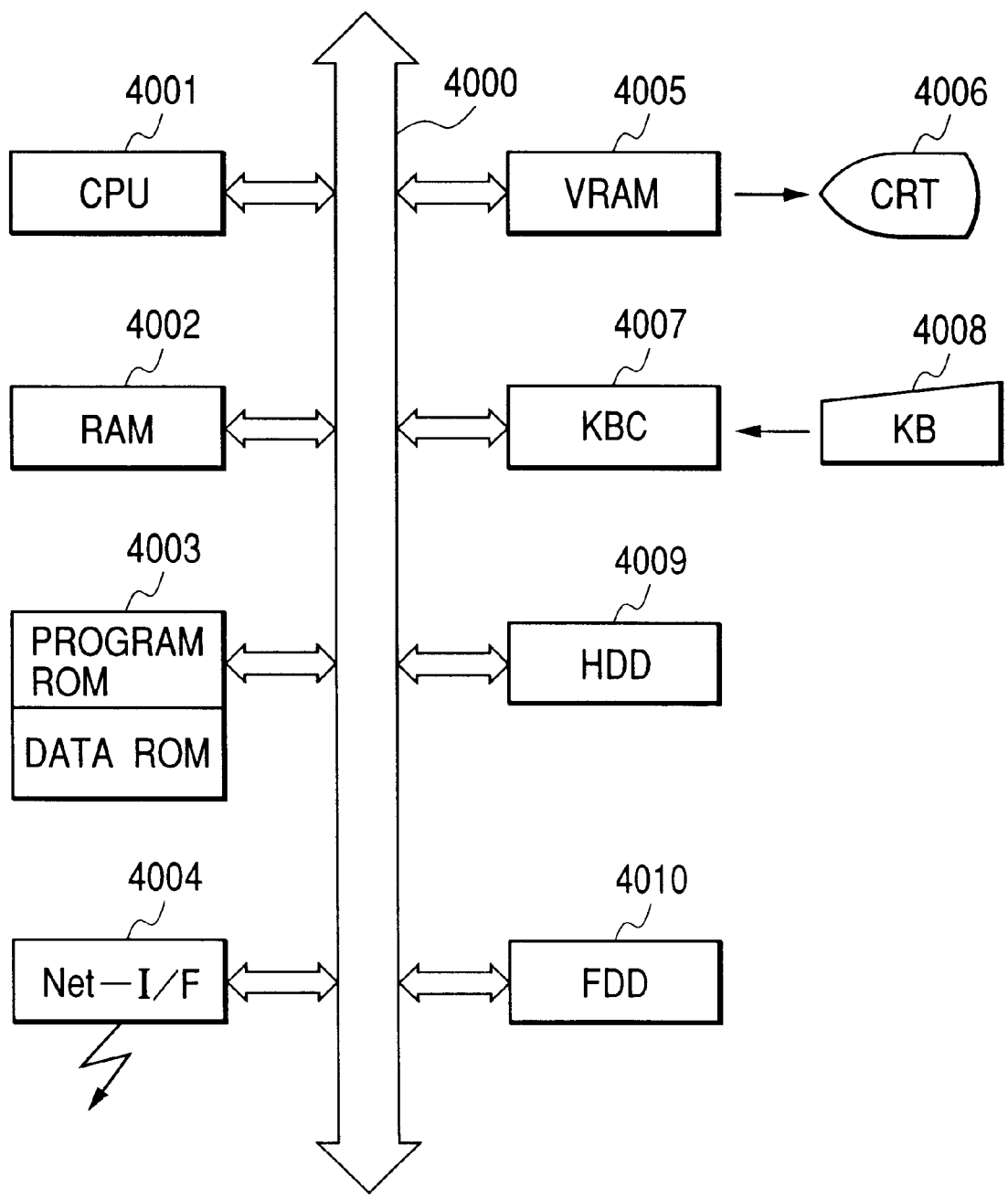
FIG. 26 is a block diagram showing the system structure of a client computer.

FIG. 26 is a block diagram showing the system structure of a client computer 101.

In FIG. 26, reference numeral 4001 represents a CPU for controlling the whole of the client computer 101, CPU 4001 constituting control means of the information processing apparatus of the embodiment.

Reference numeral 4002 represents a RAM as temporary storage means, functioning as a main memory of CPU 4001, as a working area for control programs, and as a temporary save area.

Reference numeral 4003 represents a ROM which stores an operation procedure of CPU 4001. ROM 4003 includes a program ROM and a data ROM, the former storing system programs for controlling the client computer 101 and the control programs illustrated in FIG. 28, and the latter storing information necessary for operating the system.

Reference numeral 4004 represents a network interface (Net-I/F) which controls a data transfer to and from the image server to be described later. The network interface 4004 is also used for transmitting editing information from the client 101 to the print controller 103.

Reference numeral 4005 represents a video RAM (VRAM) for developing an image to be displayed on the screen of a CRT 1006 as display means which displays the system running state, and for controlling the display.

Reference numeral 4007 represents a keyboard controller for controlling a signal input from an external input device such as a keyboard. Reference numeral 4008 represents an external input device for receiving an instruction, which is generally a keyboard and a pointing device (mouse).

Reference numeral 4009 represents a hard disk drive (HDD) as storage means for storing image data. A hard disk in HDD 1009 stores application programs and image data to be described later.

Reference numeral 4010 represents a removable disk drive (FDD) such as a floppy disk drive as an external storage unit, FDD being used for reading an application program from a floppy disk. This system may be realized by storing the programs illustrated in FIG. 28 in a floppy disk in FDD 1010 and loading them in a hard disk.

Reference numeral 4000 represents an I/O bus (address bus, data bus and control bus) for interconnecting the above-described various units.

The structure of the image server 102 is the same as the second embodiment, and so the drawing thereof is not duplicated.

Description of Operation

Figure 27:
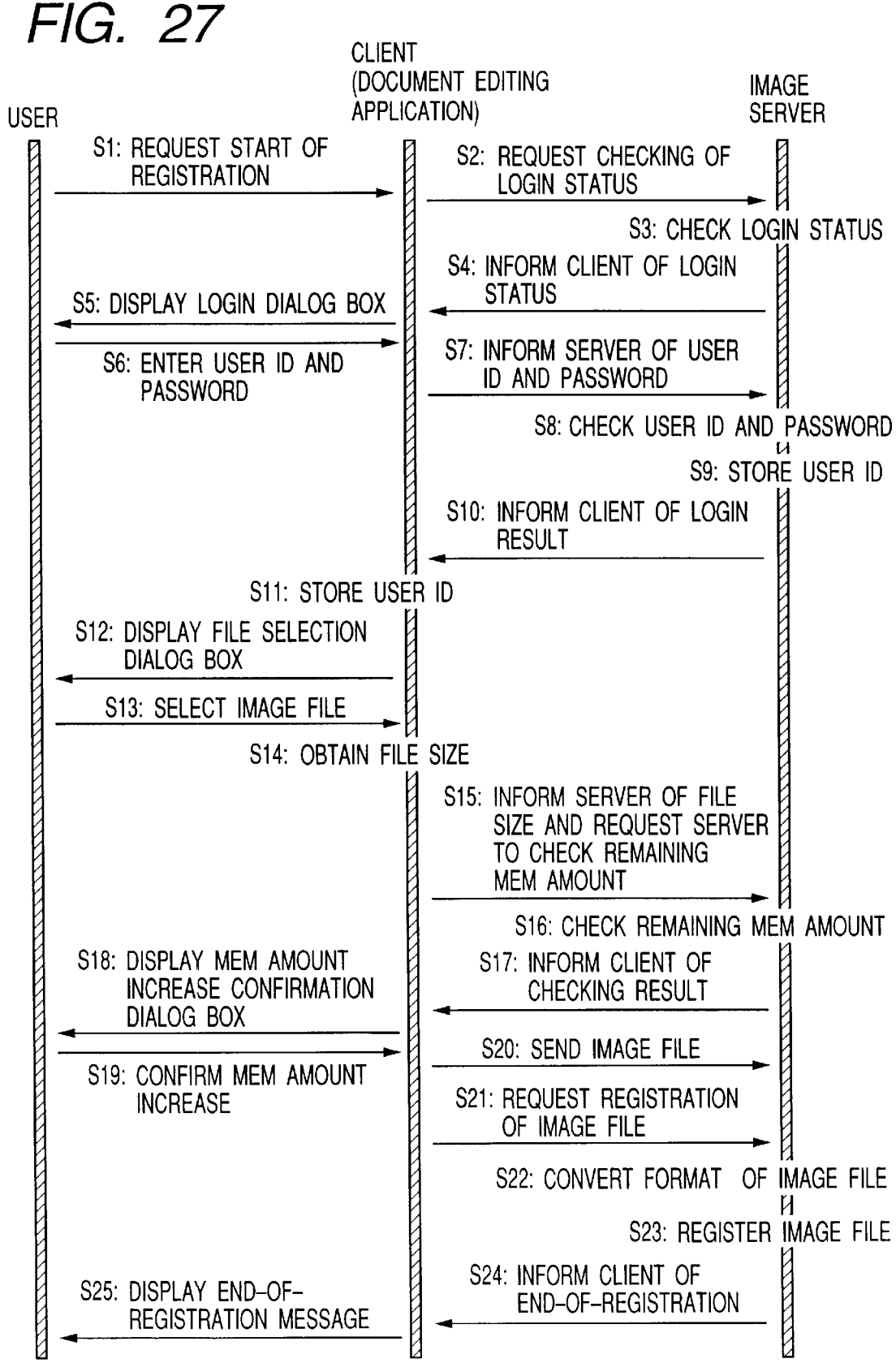
FIG. 27 is a timing chart illustrating the operation of a print control system according to a third embodiment of the invention.
Figure 28:
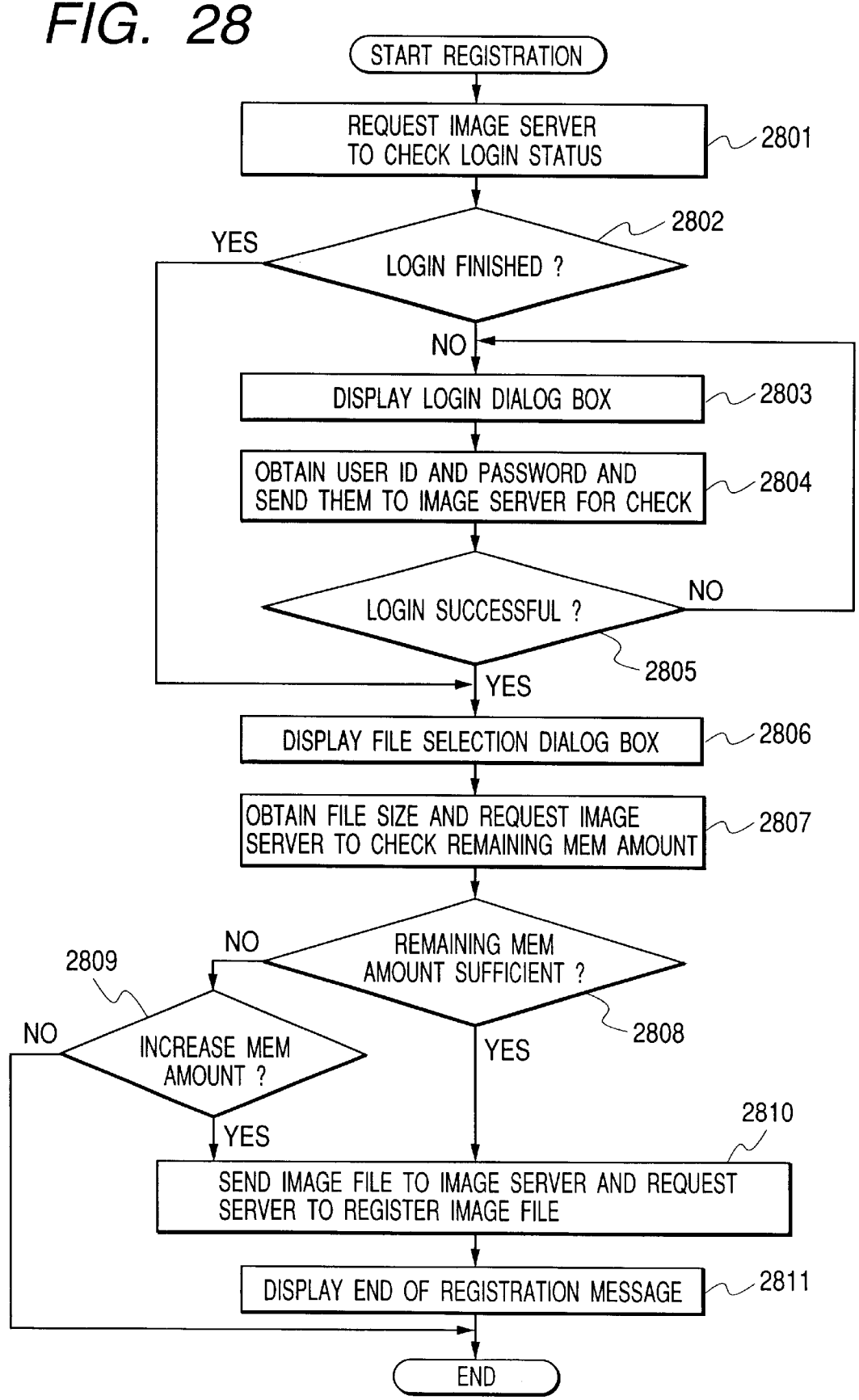
FIG. 28 is a flow chart illustrating an image file registration process to be executed by the client computer.

FIG. 27 is a timing chart illustrating a process of registering an image file in the image server. FIG. 28 is a flow chart illustrating the image file registration process to be executed by the client 101. FIG. 29 shows a user ID list (login user ID list) stored in the image serve and showing IDs of login users. FIG. 30 is a user information table stored in the image server. This user information table stores therein passwords, assigned memory amounts, and remaining memory amounts, respectively of users.

Figure 33:
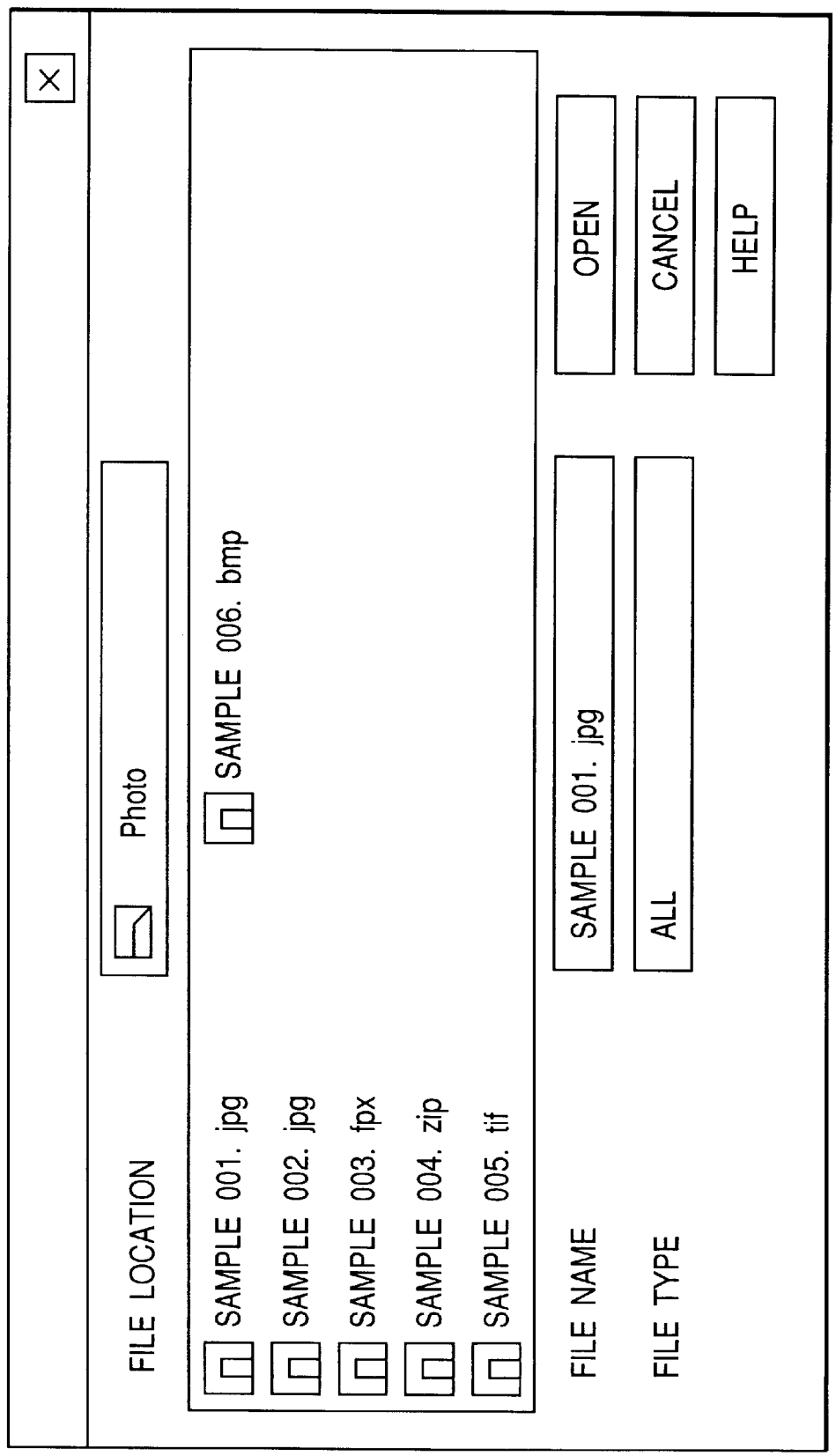
FIG. 33 shows a file selection dialog box.

FIG. 31 is a toll table stored in the image server. FIG. 32 shows a login dialog box displayed when the image server is accessed for login by using the document editing application of the client 101. FIG. 33 shows a file selection dialog box. FIG. 34 shows a dialog box for confirming a memory amount increase.

With reference to FIGS. 27 to 34, the image file registration process to be executed by the embodiment system will be described.

At Step S1 shown in FIG. 27, a user instructs a registration start by selecting "image file registration" from a menu of the document editing application of the client 101. Next, at Step S2 shown in FIG. 27 and Step S2801 shown in FIG. 28, the client 101 requests the image server 101 to check a login state. In this case, a user ID to be checked is passed from the client 101 to the image server 102, as an argument. In this example, since the login is not still performed, the user ID is not passed at this time.

At Step S3 shown in FIG. 27, the image server 102 checks the login state. With this login state check, it is checked whether the user ID passed from the client 101 is contained in the login user ID list (FIG. 29) in RAM 3002 of the image server 102. In this example, the user ID as an argument is not contained in the login user ID list, at Step S4 shown in FIG. 27 the image server 102 notifies the client 101 of that the login is not still established.

At Step S2802 shown in FIG. 28, in response to the notice from the image server 102, the client 101 asks the image server 102 to confirm whether the login is completed. In this example, since the login is not still completed, at Step S4 shown in FIG. 27 and at Step S2803 shown in FIG. 28 the client 101 displays the login dialog box (FIG. 32) on CRT 4006.

As the user enters the user ID and password and depresses a login button at Step S6 of FIG. 27, the client 101 transmits the user ID and password as arguments to the image server 102 at Step S7 of FIG. 27 and at Step S2804 of FIG. 28, to request the image server 102 to check the user ID and password.

At Step S8 of FIG. 27, the image server 102 checks whether the user ID passed as an argument is present in the user information table shown in FIG. 30 and whether the password as another argument is coincident with the password in a corresponding row. If this check succeeds, at Step S9 of FIG. 27 the user ID is stored in the login user ID list shown in FIG. 29, and at Step S10 of FIG. 27 the client 101 is notified of a login success. If the user ID is not present in the user information table (FIG. 30) or if the password is not coincident, a login failure is notified to the client at Step S10 of FIG. 27.

The client 101 notified of the login result checks this result at Step S2805 of FIG. 28. In the case of a login success, the client 101 displays the file selection dialog box shown in FIG. 33 on CRT 4006 at Step S12 of FIG. 27 and at Step S2806 of FIG. 28.

At Step S13 of FIG. 27, as the user selects an image file in the file selection dialog box (FIG. 33) and depresses an "open button", the client 101 acquires the file size of the selected image file at Step S14 of FIG. 27 and at Step S2807 of FIG. 28. In acquiring the file size, a function "staf" of a C run-time library is used.

After the file size is acquired at Step S2807 shown in FIG. 28, the client 101 asks the image server 102 to check the remaining memory amount, by using the user ID and file size as arguments, at Step S15 of FIG. 27 and at Step S2807 of FIG. 28.

At Step S16 of FIG. 27 the image server 102 checks the remaining memory amount. The image server 102 acquires the remaining memory amount corresponding to the user ID as the argument, from the user information table (FIG. 30). It is assumed here that the user ID is AXE0012. In this case, the remaining memory capacity is 10 MB. The image server 102 compares the remaining memory amount with the file size passed as the argument. If the remaining memory amount is equal to or larger than the file size, at Step S17 of FIG. 27 the image server 102 notifies the client 101 of that the image file can be registered. If the remaining memory amount is smaller than the file size, it is notified that the toll table shown in FIG. 31 may be used for the registration. In this case, the image server 102 acquires from the toll table (FIG. 31) an assigned memory amount allowing the image file to be registered and a monthly charge thereof, and notifies them to the client 101 at Step S17 of FIG. 27. Assuming that the file size to be registered is 15 MB, the assigned memory amount of 30 MB, capable of registering a total of 25 MB because the remaining memory amount is 10 MB, and its monthly charge of Yen 3,000 are acquired from the toll table (FIG. 31) and notified to the client 101.

Upon reception of the notice from the image server 102, the client 101 confirms the remaining memory amount at Step S2808 of FIG. 28. If the remaining memory amount is sufficient, the client 101 registers the image file selected by the user in the image server 102. If the remaining memory amount is not sufficient, at Step S18 of FIG. 27 the client 101 displays the dialog box shown in FIG. 34 for confirming to increase the assigned memory amount at the monthly charge notified from the image server 102.

As the user depresses a "YES" button at Step S19 of FIG. 27, a judgement Step S2809 of FIG. 28 becomes YES and the image file registration process is performed. If the user depresses a "NO" button, the judgement Step S2809 of FIG. 28 becomes NO and the image file registration process is not performed and the procedure is terminated.

If the remaining memory amount is sufficient or if the user instructs to increase the assigned memory amount, at Step S20 of FIG. 27 and at Step S2810 of FIG. 28, the client 101 transmits the image file to the image server 102 at its transmission directory. After the image file is transmitted, at Step S21 of FIG. 27 and at Step S2810 of FIG. 28 the client 101 requests the image server 102 to register the image file, by using the user ID and the name of the transmitted image file as arguments.

At Step S22 of FIG. 27 the image server 102 converts the image file designated by the transmission directory argument into the image format capable of being stored in the image server 102. Next, at Step S23 of FIG. 27 the image file with its format converted at the preceding Step is copied at directory having the same name as the user ID in the image storing directory. If the user instructs to increase the assigned memory amount at Step S2809 of FIG. 28, at Step S23 of FIG. 27 the assigned memory amount and remaining memory amount are renewed in the user information table (FIG. 30) at the row of the user ID passed as the argument.

After the registration process, at Step S24 of FIG. 27 the image server 102 notifies the client 101 of a completion of the registration process. In response to the received notice of the registration process completion, at Step S2811 of FIG. 28 the client 101 displays a registration completion message on CRT 4006 to notify the user of the registration completion.

The characteristic configurations of the image server 102 described above as an embodiment of the image storing apparatus of this invention will be described hereinunder.

The image storing apparatus of this invention connected to a client (101) and an output control apparatus (104–106) via a network, comprises: storing means (HDD 3009) for storing image data of a plurality of resolutions for each set of image data; and controlling means (function of CPU 4001 as illustrated in FIGS. 21 and 22) responsive to a request from the client for controlling to transmit image data of a low resolution to the client (flow chart of FIG. 21) and for controlling to transmit image data of a high resolution corresponding to the image data of the low resolution to the output control apparatus (flow chart of FIG. 22). The image storing apparatus further comprises registering means for registering externally input image data in the storing means. It is therefore possible to provide an apparatus in which a small amount of image data of a low resolution is transmitted to the client for image data editing, whereas a large amount of image data of a high resolution is transmitted to the output control apparatus for image data printing, so that a load on the network can be reduced. Furthermore, the image data can be registered in the image storing apparatus from an external apparatus (client 101).

The image storing apparatus further comprises notifying means for comparing (Step S16 in FIG. 27) a memory amount permitted to an external apparatus transmitted image data with the image data, during a registration process by said registering means, and notifying (step S17 in FIG. 27) a comparison result to the external apparatus. It is therefore possible to provide an apparatus capable of notifying the external apparatus intending to resister image data of whether the image data can be registered.

If an instruction of increasing the memory amount is received from the external apparatus, the memory amount permitted to the external apparatus is increased. It is therefore possible to provide an apparatus capable of increasing the amount of image data to be registered from the external apparatus, after receiving a confirmation from the external apparatus.

The characteristic configurations of the client computer 101 described above as an embodiment of the information processing apparatus of this invention will be described hereinunder.

The information processing apparatus of this invention connected to an image storing apparatus (image server 102) storing image data via a network, comprises: registration instructing means (function of CPU 4001 using the control program at Step S2810 of FIG. 28) for transmitting an instruction of registering image data in the image storing apparatus; receiving means (network interface 4004) for receiving image data (301 in FIG. 2) of a low resolution corresponding to the image data registered in the image storing apparatus; editing means (function of CPU 4001 using the document editing application) for editing the received image data; and print requesting means (outputting a print order shown in FIG. 6) for instructing an external apparatus to print editing information (FIG. 6) representative of the contents edited by said editing means, excepting the image data. Since the image data of a high resolution used for printing is registered in advance in the external apparatus and the image data of the high resolution is transmitted only once over the network, a load of the network can be reduced. It is therefore possible to provide an apparatus which is not necessary to transmit image data each time a printing operation is performed.

The registration instructing means transmits identification information (user ID in the embodiment) of the information processing apparatus to the image storing apparatus, and after an access permission is obtained (YES at Step S2805 in FIG. 28), transmits image data to the image storing apparatus (Step S2810 in FIG. 28). It is therefore possible to provide an apparatus capable of preventing the image data from being registered as possessed by a different information processing apparatus.

The information processing apparatus further comprises displaying means (CRT 4006) for displaying, when image data is registered in response to an instruction from said registration instructing means and a notice of insufficient memory amount is received from the image storing apparatus (NO at Step S2808 in FIG. 28), this effect. It is therefore possible to provide an apparatus in which a user can be notified of that image data cannot be registered because of an insufficient memory amount.

The information processing apparatus further comprises instructing means (function of CPU 4001 using the control program at Step S2809 of FIG. 28) for instructing, when image data is registered in response to an instruction from said registration instructing means and a notice of insufficient memory amount is received from the image storing apparatus, whether or not the memory amount is increased, wherein if the instructing means instructs to increase the memory amount in the image storing apparatus assigned to the information processing apparatus, this effect is notified to the image storing apparatus (Step S2810 of FIG. 28). It is therefore possible to provide an apparatus in which a user can be instructed to increase the assigned memory amount of the image storing apparatus or not to increase at that time, and after the user permission, the registration process can be performed.

The information processing apparatus is connected to the image storing apparatus via the Internet. It is therefore possible to provide an apparatus capable of performing a registration process of image data via the Internet.

According to the system of the third embodiment, when a user intends to register an image file in the image server, the assigned memory amount can be confirmed at this time and the registration can be canceled or an increase in the assigned memory amount can be instructed. Since the assigned memory amount can be confirmed at the registration time as different from the confirmation by an electronic mail or the like, a charge which the user does not memorize can be avoided.

By using the print system of this invention and the apparatuses constituting the system, print data including the character string data and graphic data described with page descriptive language is transmitted to the print server as the output control apparatus on the network. Therefore, the data amount can be reduced and the load on the network can be reduced.

Since image data caches in the print server are used, the occurrence frequency of transmitting print image data from the image server as the image storing apparatus or from the print controller as the image control apparatus can be reduced and the load on the image server and the like can be reduced.

Further, since only the necessary image data is transmitted from the print controller or image server to the print server, the data transmission amount can be reduced and the load on the network can be reduced.

Still further, the print controller requests the print server having the maximum amount of caching to print images. Accordingly, the caches in the print server can be used efficiently, and only the image data not cached is transmitted from the print controller so that the load on the network can be reduced more than a conventional system.

Furthermore, the print server requests for the necessary image data to other print servers as much as possible. Accordingly, the number of image data transmission requests to the print controller or image server which presumably has a considerable load can be reduced and the load on the image server can be reduced.

Furthermore, the print server sets the discard time of cached image data, and deletes the image data when a predetermined time lapses. It is therefore possible to reduce the amount of image data stored in the storage means and to renew the discard time. Accordingly, the image data frequently used can be stored in storage means longer than the image data not frequently used. Therefore, the storage means can be used efficiently.

Furthermore, the print controller randomly sets a file name of the print server. It becomes therefore difficult to guess an original image from the file name in the image storage directory of HDD 2002 of the print server 104 or to reconfigure an original image from a plurality of files. It is therefore possible to prevent fraud use of images not free.

What is claimed is:

1. An image control apparatus for sending a print order to an output control apparatus to execute a print service via the Internet, said image control apparatus comprising:
   receiving means for receiving a client order including editing information generated by editing image data from a client via the Internet;
   determining means for determining an output destination of output control apparatuses in accordance with the client order received by said receiving means; and
   order control means for generating a print order by accessing an image server with high-resolution image data based on an image ID designated by the client order, and for sending the print order to the output destination of the output control apparatuses determined by said determining means,
      wherein the print order is not directly printed and final print data to be directly printed is generated based on the print order generated by said order control means.

2. An image control apparatus according to claim 1, further comprising managing means for storing and managing identification information of the output control apparatuses and image data stored in the output control apparatuses.

3. An image control apparatus according to claim 2, wherein said managing means receives the identification information for identifying the image data stored in the output control apparatuses, from the output control apparatuses.

4. An image control apparatus according to claim 2, wherein said determining means determines as the output destination an output control apparatus with a largest amount of image data designated by the editing information, in accordance with the identification information stored and managed by said managing means.

5. An image control apparatus according to claim 1, further comprising instructing means for instructing an image storing apparatus to transmit image data, which is not stored in an output control apparatus determined to be the output destination by said determining means, to the output control apparatus.

6. An image control apparatus according to claim 1, wherein the print order transmitted to the output control apparatus includes information of image data of a high resolution converted from image data of a low resolution designated by the editing information.

7. An image control apparatus according to claim 2, wherein the identification information stored and managed by said managing means includes information of a time when image data is discarded, and, after this time lapses, a corresponding identification information is deleted.

8. An image control apparatus according to claim 1, further comprising name setting means for setting an optional file name of image data stored in the output control apparatus.

9. An image control apparatus according to claim 1, further comprising:
   storing means for storing image data of a plurality of resolutions for each set of image data; and
   controlling means responsive to a request from the client for controlling to transmit image data of a low resolution to the client and for controlling to transmit image data of a high resolution to be used for the editing information received from the client, to the output control apparatus.

10. An image control apparatus according to claim 2, wherein said managing means stores and manages the identification information in units of a plurality of tiles divided from each set of image data.

11. An image control apparatus according to claim 1, wherein the editing information is described in a script format.

12. An image control apparatus according to claim 1, wherein the image ID includes a URL for accessing the high-resolution image data via the Internet.

13. An image storing apparatus for providing image contents to be used in a print service via the Internet, comprising:
   determining means for receiving access from a client via the Internet and determining whether the client can log into an image storing apparatus;
   management means for receiving high-resolution image data and generating low-resolution image data based on the received image data, and managing each image data stored in storing means, if said determining means determines that the client can log into the image storing apparatus; and
   controlling means, responsive to a request from an output control apparatus, which is different from the client, via the Internet, for controlling data transmission such that high-resolution image data corresponding to the image data designated by the request is transmitted to the output control apparatus.

14. An image storing apparatus according to claim 13, wherein said controlling means executes a control operation after an instruction to transmit the high-resolution image data to the output control apparatus is received from an external apparatus different from the output control apparatus.

15. An image storing apparatus according to claim 13, wherein said controlling means controls to transmit image data in units of tiles to the client or to the output control apparatus.

16. An image storing apparatus according to claim 13, wherein said management means comprises registering means for registering image data entered by the client.

17. An image storing apparatus according to claim 16, further comprising notifying means for comparing a memory amount permitted to an external apparatus to be transmitted image data with the image data, during a registration process by said management means, and notifying a comparison result to the external apparatus.

18. An image storing apparatus according to claim 17, wherein, if an instruction of increasing the memory amount is received from the external apparatus, the memory amount permitted to the external apparatus is increased.

19. An image storing apparatus according to claim 13, wherein said management means determines memory capacities for managing image data for respective clients and the memory capacities can be changed in response to a request from the clients.

20. An output control apparatus for executing a print service via the Internet, comprising:
 receiving means for receiving a print order including editing information from an image control apparatus via the Internet;
 obtaining means for obtaining high-resolution image data via the Internet based on an image ID designated by the print order; and
 editing means for editing the image data obtained by said obtaining means in accordance with the editing information, and generating output data to be directly printed.

21. An output control apparatus according to claim 20, further comprising storing means for caching the image data obtained via the Internet by said obtaining means, the image data being continuously cached in said storing means even after printing, wherein said editing means generates output image data of one page from the image data obtained by said obtaining means and the image data cached in said storing means.

22. An output control apparatus according to claim 20, wherein said obtaining means obtains image data of a high resolution from the image control apparatus.

23. An output control apparatus according to claim 20, wherein said obtaining means obtains image data of a high resolution from an image storing apparatus that stores image data of a plurality of resolutions for each set of image data.

24. An output control apparatus according to claim 21, further comprising erasing means for erasing image data cached in said storing means, wherein said erasing means erases the image data cached in said storing means when a predetermined time lapses.

25. An output control apparatus according to claim 20, further comprising printing means for printing the image data edited by said editing means.

26. An output control apparatus according to claim 21, further comprising notifying means for notifying the image control apparatus of identification information of the image data cached in said storing means and of cache information including a data cancel time.

27. An output control apparatus according to claim 20, wherein the editing information is data described in a script format.

28. An output control apparatus according to claim 21, further comprising determination means for determining whether the image data is to be obtained by said obtaining means via the Internet based on the image ID designated by the print order or whether the image data cached in said storing means is to be used.

29. An information processing apparatus connected to an image storing apparatus storing image data via a network, comprising:
 registration instructing means for transmitting an instruction of registering image data in the image storing apparatus;
 receiving means for receiving image data of a low resolution corresponding to the image data registered in the image storing apparatus;
 editing means for editing the received image data; and
 print requesting means for instructing an external apparatus to print editing information representative of the contents edited by said editing means, except the image data.

30. An information processing apparatus according to claim 29, wherein said registration instructing means transmits identification information of said information processing apparatus to the image storing apparatus, and, after an access permission is obtained, transmits image data to the image storing apparatus.

31. An information processing apparatus according to claim 29, further comprising displaying means for displaying, when image data is registered in response to an instruction from said registration instructing means and a notice of insufficient memory amount is received from the image storing apparatus, a message to this effect.

32. An information processing apparatus according to claim 29, further comprising instructing means for instructing, when image data is registered in response to an instruction from said registration instructing means and a notice of insufficient memory amount is received from the image storing apparatus, whether or not the memory amount is to be increased, wherein, if said instructing means instructs to increase the memory amount in the image storing apparatus assigned to said information processing apparatus, this effect is notified to the image storing apparatus.

33. An information processing apparatus according to claim 29, wherein said information processing apparatus is connected to the image storing apparatus via the Internet.

34. A print system connected to a client, an image control apparatus, an image storing apparatus, and output control apparatuses via a network, wherein:
 the image storing apparatus comprises:
  determining means for receiving access from the client via the Internet and determining whether the client can log into the image storing apparatus;
  management means for receiving high-resolution image data and generating low-resolution image data based on the received image data, and managing each image data stored in storing means, if the determining means determines that the client can log into the image storing apparatus; and
  controlling means, responsive to a request from an output control apparatus, which is different from the client, via the Internet, for controlling data transmission such that high-resolution image data corresponding to the image data designated by the request is transmitted to the output control apparatus,
 the image control apparatus comprises:
  receiving means for receiving a client order including editing information generated by editing image data from the client via the Internet;

determining means for determining an output destination of the output control apparatuses in accordance with the client order received by the receiving means; and order control means for generating a print order by accessing an image server with high-resolution image data based on an image ID designated by the client order, and for sending the print order to the output destination of the control apparatuses determined by the determining means, wherein the print order is not directly printed and final print data to be directly printed is generated based on the print order generated by the order control means, and each of the output control apparatuses comprises:

receiving means for receiving the print order including the editing information from the image control apparatus via the Internet;

obtaining means for obtaining high-resolution image data via the Internet based on an image ID designated by the print order; and editing means for editing the image data obtained by the obtaining means in accordance with the editing information, and generating output data to be directly printed.

35. A print system connected to a client, an image control apparatus, and output control apparatuses via an network, wherein:

the image control apparatus comprises:

storing means for storing image data of a plurality of resolutions;

controlling means, responsive to a request from the client, for controlling to transmit image data of a low resolution to the client, and, responsive to a request from an output control apparatus, for controlling to transmit image data of a high resolution corresponding to the image data of the low resolution to the output control apparatus;

receiving means for receiving a client order including editing information generated by editing image data from the client via the Internet;

determining means for determining an output destination of the output control apparatuses in accordance with the client order received by the receiving means; and order control means for generating a print order by accessing an image server with high-resolution image data based on an image ID designated by the client order, and for sending the print order to an output destination of the output control apparatuses determined by the determining means, wherein the print order is not directly printed and final print data to be directly printed is generated based on the print order generated by the order control means, and each of the output control apparatuses comprises:

receiving means for receiving the print order including the editing information from the image control apparatus;

obtaining means for obtaining high-resolution image data via the Internet based on an image ID designated by the print order; and editing means for editing the image data obtained by the obtaining means in accordance with the editing information, and generating output data to be directly printed.

36. An image control method for sending a print order to an output control apparatus to execute a print service via the Internet, comprising:

a receiving step of receiving a client order including editing information generated by editing image data from a client via the Internet;

a determining step of determining an output destination of output control apparatuses in accordance with the client order received in said receiving step; and a generating step of generating a print order by accessing an image server with high-resolution image data based on an image ID designated by the client order, and sending the print order to the output destination of the output control apparatuses determined in said determining steps, wherein the print order is not directly printed and final print data to be directly printed is generated based on the print order generated in said generating step.

37. An image control method according to claim 36, further comprising a managing step of storing and managing identification information of the output control apparatuses and image data stored in the output control apparatuses.

38. An image control method according to claim 37, wherein said managing step receives the identification information for identifying the image data stored in the output control apparatuses, from the output control apparatuses.

39. An image control method according to claim 37, wherein said determining step determines as the output destination an output control apparatus with a largest amount of image data designated by the editing information, in accordance with the identification information stored and managed in said managing step.

40. An image control method according to claim 36, further comprising an instructing step of instructing an image storing apparatus to transmit image data, which is not stored in an output control apparatus determined to be the output destination in said determining step, to the output control apparatus.

41. An image control method according to claim 36, wherein the print order transmitted to the output control apparatus includes information of image data of a high resolution converted from image data of a low resolution designated by the editing information.

42. An image control method according to claim 37, wherein the identification information stored and managed in said managing step includes information of a time when image data is discarded, and after this time lapses, a corresponding identification information is deleted.

43. An image control method according to claim 36, further comprising a name setting step for setting an optional file name of image data stored in the output control apparatus.

44. An image control method according to claim 36, further comprising:

a storing step of storing image data of a plurality of resolutions for each set of image data; and a controlling step responsive to a request from the client for controlling to transmit image data of a low resolution to the client and for controlling to transmit image data of a high resolution to be used for the editing information received from the client, to the output control apparatus.

45. An image control method according to claim 37, wherein said managing step stores and manages the identification information in units of a plurality of tiles divided from each set of image data.

46. An image control method according to claim 36, wherein the editing information is described in a script format.

47. An image control method according to claim 36, wherein the image ID includes a URL for accessing the high-resolution image data via the Internet.

48. A method of controlling an image storing apparatus for providing image contents to be used in a print service via the Internet, comprising:

a determining step of receiving access from a client via the Internet and determining whether the client can log into an image storing apparatus;

a managing step of receiving high-resolution image data and generating low-resolution image data based on the received image data, and managing each image data stored in a storage unit, if said determining step determines that the client can log into the image storing apparatus; and a controlling step, responsive to a request from an output control apparatus, which is different from the client, via the Internet, of controlling data transmission such that a high-resolution image data corresponding to the image data designated by the request is transmitted to the output control apparatus.

49. A method according to claim 48, wherein said controlling step executes a control operation after an instruction to transmit the high-resolution image data to the output control apparatus is received from an external apparatus different from the output control apparatus.

50. A method according to claim 48, wherein said controlling step controls to transmit image data in units of tiles to the client or to the output control apparatus.

51. A method according to claim 48, wherein said managing step includes registering image data entered by the client.

52. A method according to claim 51, further comprising a notifying step of comparing a memory amount permitted to an external apparatus to be transmitted image data with the image data, during a registration process in said managing step, and notifying a comparison result to the external apparatus.

53. A method according to claim 52, wherein, if an instruction of increasing the memory amount is received from the external apparatus, the memory amount permitted to the external apparatus is increased.

54. A method according to claim 48, wherein said management step determines memory capacities for managing image data for respective clients and the memory capacities can be changed in response to a request from the clients.

55. A method of controlling an output control apparatus for executing a print service via the Internet, comprising:

a receiving step of receiving a print order including editing information from an image control apparatus via the Internet;

an obtaining step of obtaining high-resolution image data via the Internet based on an image ID designated by the print order; and an editing step of editing the image data obtained in said obtaining step in accordance with the editing information, and generating output data to be directly printed.

56. A method according to claim 55, further comprising a storing step of caching the image data obtained via the Internet in said obtaining step, the image data being continuously cached even after printing, wherein said editing step generates output image data of one page from the image data obtained in said obtaining step and the image data cached in said storing step.

57. A method according to claim 55, wherein said obtaining step obtains image data of a high resolution from the image control apparatus.

58. A method according to claim 55, wherein said obtaining step obtains image data of a high resolution from an image storing apparatus that stores image data of a plurality of resolutions for each set of image data.

59. A method according to claim 56, further comprising an erasing step of erasing image data cached in said storing step, wherein said erasing step erases the image data cached in said storing step when a predetermined time lapses.

60. A method according to claim 55, further comprising a printing step of printing the image data edited in said editing step.

61. A method according to claim 56, further comprising a notifying step of notifying the image control apparatus of identification information of the image data cached in said storing step and of cache information including a data cancel time.

62. A method according to claim 55, wherein the editing information is data described in a script format.

63. A method according to claim 56, further comprising a determining step of determining whether the image data is to be obtained in said obtaining step via the Internet based on the image ID designated by the print order or whether the image data cached in said storing data is to be used.

64. A method of controlling an information processing apparatus connected to an image storing apparatus storing image data via a network, comprising:

a registration instructing step of transmitting an instruction of registering image data in the image storing apparatus;

a receiving step of receiving image data of a low resolution corresponding to the image data registered in the image storing apparatus;

an editing step of editing the received image data; and a print requesting step of instructing an external apparatus to print editing information representative of the contents edited in said editing step, except the image data.

65. A method according to claim 64, wherein said registration instructing step transmits identification information of the information processing apparatus to the image storing apparatus, and, after an access permission is obtained, transmits image data to the image storing apparatus.

66. A method according to claim 64, further comprising a displaying step of displaying, when image data is registered in response to an instruction supplied in said registration instructing step and a notice of insufficient memory amount is received from the image storing apparatus, a message this effect.

67. A method according to claim 64, further comprising an instructing step of instructing, when image data is registered in response to an instruction issued in said registration instructing step and a notice of insufficient memory amount is received from the image storing apparatus, whether or not the memory amount is to be increased, wherein, if said instructing step instructs to increase the memory amount in the image storing apparatus assigned to the information processing apparatus, this effect is notified to the image storing apparatus.

68. A method according to claim 64, wherein the information processing connected to the image storing apparatus via the Internet is controlled.

69. A method of controlling a print system connected to a client, an image control apparatus, an image storing apparatus, and output control apparatuses via a network, the method comprising:

at the image storing apparatus:

a determining step of receiving access from the client via the Internet and determining whether the client can log into the image storing apparatus;

a management step of receiving high-resolution image data and generating low-resolution image data based on the received image data, and managing each image data stored in storing means, if the determining step determines that the client can log into the image storing apparatus; and a controlling step, responsive to a request from an output control apparatus, which is different from the client, via the Internet of controlling data transmission such that high-resolution image data corresponding to the image data designated by the request is transmitted to the output control apparatus, at the image control apparatus:
　a receiving step of receiving a client order including editing information generated by editing image data from the client via the Internet;
　a determining step of determining an output destination of the output control apparatuses in accordance with the client order received in the receiving step; and
　an order control step of generating a print order by accessing an image server with high-resolution image data based on an image ID designated by the client order, and for sending the print order to the output destination of the control apparatuses determined in the determining step,
　　wherein the print order is not directly printed and final print data to be directly printed is generated based on the print order generated in the order control step, and at each of the output control apparatuses:
　a receiving step of receiving the print order including the editing information from the image control apparatus via the Internet;
　an obtaining step of obtaining high-resolution image data via the Internet based on an image ID designated by the print order; and
　an editing step of editing the image data obtained in the obtaining step in accordance with the editing information, and generating output data to be directly printed.

70. A method of controlling a print system connected to a client, an image control apparatus, and output control apparatuses via an network, the method comprising:

at the image control apparatus:
　a storing step of storing image data of a plurality of resolutions;
　a controlling step, responsive to a request from the client, of controlling to transmit image data of a low resolution to the client, and, responsive to a request from an output control apparatus, of controlling to transmit image data of a high resolution corresponding to the image data of the low resolution to the output control apparatus;
　a receiving step of receiving a client order including editing information generated by editing image data from the client via the Internet;
　a determining step of determining an output destination of the output control apparatuses in accordance with the client order received in the receiving step; and
　an order control step of generating a print order by accessing an image server with high-resolution image data based on an image ID designated by the client order, and for sending the print order to an output destination of the output control apparatuses determined in the determining step,
　　wherein the print order is not directly printed and final print data to be directly printed is generated based on the print order generated in the order control step, and at each of the output control apparatuses:
　a receiving step of receiving the print order including the editing information from the image control apparatus;
　an obtaining step of obtaining high-resolution image data via the Internet based on an image ID designated by the print order; and
　an editing step of editing the image data obtained in the obtaining step in accordance with the editing information, and generating output data to be directly printed.

71. A program (stored in a storage medium) for controlling an image control method, the program comprising:
　code for a receiving step of receiving a client order including editing information generated by editing image data from a client via the Internet;
　code for a determining step of determining an output destination of output control apparatuses in accordance with the client order received in the receiving step; and
　code for an order control step of generating a print order by accessing an image server with high-resolution image data based on an image ID designated by the client order, and for sending the print order to the output destination of the output control apparatuses determined in the determining step,
　　wherein the print order is not directly printed and final print data to be directly printed is generated based on the print order generated in the output control step.

72. A program according to claim 71, further comprising code for a managing step of storing and managing identification information of the output control apparatuses and image data stored in the output control apparatuses.

73. A program according to claim 72, wherein the managing step receives the identification information for identifying the image data stored in the output control apparatuses, from the output control apparatuses.

74. A program according to claim 72, wherein the determining step determines as the output destination an output control apparatus with a largest amount of image data designated by the editing information, in accordance with the identification information stored and managed in the managing step.

75. A program according to claim 71, further comprising code for an instructing step of instructing an image storing apparatus to transmit image data, which is not stored in an output control apparatus determined to be the output destination in the determining step, to the output control apparatus.

76. A program according to claim 71, wherein the print order transmitted to the output control apparatus includes information of image data of a high resolution converted from image data of a low resolution designated by the editing information.

77. A program according to claim 72, wherein the identification information stored and managed in the managing step includes information of a time when image data is discarded, and, after this time lapses, a corresponding identification information is deleted.

78. A program according to claim 71, further comprising code for a name setting step for setting an optional file name of image data stored in the output control apparatus.

79. A program according to claim 71, further comprising:
　code for a storing step of storing image data of a plurality of resolutions for each set of image data; and code for a controlling step responsive to a request from the client for controlling to transmit image data of a low resolution to the client and for controlling to transmit image data of a high resolution to be used for the editing information received from the client, to the output control apparatus.

80. A program according to claim 72, wherein the managing step stores and manages the identification information in units of a plurality of tiles divided from each set of image data.

81. A program according to claim 71, wherein the editing information is described in a script format.

82. A program according to claim 71, wherein the image ID includes a URL for accessing the high-resolution image data via the Internet.

83. A program (stored in a storage medium) for controlling an image storing apparatus connected to a client and an output control apparatus via a network, the program comprising:

code for a determining step of receiving access from a client via the Internet and determining whether the client can log into an image storing apparatus;

code for a management step of receiving high-resolution image data and generating low-resolution image data based on the received image data, and managing each image data stored in storing means, if the determining step determines that the client can log into the image storing apparatus; and code for a controlling step, responsive to a request from an output control apparatus, which is different from the client, via the Internet, of controlling data transmission such that high-resolution image data corresponding to the image data designated by the request is transmitted to the output control apparatus.

84. A program according to claim 83, wherein the controlling step executes a control operation after an instruction to transmit the high-resolution image data to the output control apparatus is received from an external apparatus different from the output control apparatus.

85. A program according to claim 83, wherein the controlling step controls to transmit image data in units of tiles to the client or to the output control apparatus.

86. A program according to claim 83, wherein the management step includes registering image data entered by the client.

87. A program according to claim 86, further comprising code for a notifying step of comparing a memory amount permitted to an external apparatus to be transmitted image data with the image data, during a registration process in the management step, and notifying a comparison result to the external apparatus.

88. A program according to claim 87, wherein, if an instruction of increasing the memory amount is received from the external apparatus, the memory amount permitted to the external apparatus is increased.

89. A program according to claim 83, wherein the management step determines memory capacities for managing image data for respective clients and the memory capacities can be changed in response to a request from the clients.

90. A program (stored in a storage medium) for controlling an output control apparatus for executing a print service via the Internet, the program comprising:

code for a receiving step of receiving a print order including editing information from an image control apparatus via the Internet;

code for an obtaining step of obtaining high-resolution image data via the Internet based on an image ID designated by the print order; and code for an editing step of editing the image data obtained in the obtaining step in accordance with the editing information, and generating output data to be directly printed.

91. A program according to claim 90, further comprising code for a storing step of caching the image data obtained in the obtaining acquiring step, the image data being continuously cached even after printing, wherein the editing step generates output image data of one page from the image data obtained in the obtaining step and the image data cached in the storing step.

92. A program according to claim 90, wherein the obtaining step obtains image data of a high resolution from the image control apparatus.

93. A program according to claim 90, wherein the obtaining step obtains image data of a high resolution from an image storing apparatus that stores image data of a plurality of resolutions for each set of image data.

94. A program according to claim 91, further comprising code for an erasing step of erasing image data cached in the storing step, wherein the erasing step erases the image data cached in the storing step when a predetermined time lapses.

95. A program according to claim 90, further comprising code for a printing step of printing the image data edited in the editing step.

96. A program according to claim 91, further comprising code for a notifying step of notifying the image control apparatus of identification information of the image data cached in the storing step.

97. A program according to claim 90, wherein the editing information is data described in a script format.

98. A program according to claim 91, further comprising code for a determining step of determining whether the image data is to be obtained in the obtaining step via the Internet based on the image ID designated by the print order or whether the image data cached in the storing step is to be used.

99. A program (stored in a storage medium) for controlling an information processing apparatus connected to an image storing apparatus storing image data via a network, the program comprising:

code for a registration instructing step of transmitting an instruction of registering image data in the image storing apparatus;

code for a receiving step of receiving image data of a low resolution corresponding to the image data registered in the image storing apparatus;

code for an editing step of editing the received image data; and code for a print requesting step of instructing an external apparatus to print editing information representative of the contents edited in the editing step, except the image data.

100. A program according to claim 99, wherein the registration instructing step transmits identification information of the information processing apparatus to the image storing apparatus, and, after an access permission is obtained, transmits image data to the image storing apparatus.

101. A program according to claim 99, further comprising code for a displaying step of displaying, when image data is registered in response to an instruction supplied in the registration instructing step and a notice of insufficient memory amount is received from the image storing apparatus, a message this effect.

102. A program according to claim 99, further comprising code for an instructing step of instructing, when image data is registered in response to an instruction issued in the registration instructing step and a notice of insufficient memory amount is received from the image storing apparatus, whether or not the memory amount is to be increased, wherein, if the instructing step instructs to increase the memory amount in the image storing apparatus assigned to the information processing apparatus, this effect is notified to the image storing apparatus.

103. A program according to claim 99, wherein the information processing connected to the image storing apparatus via the Internet is controlled.

104. A program (stored in a storage medium) for controlling a print system connected to a client, an image control apparatus, an image storing apparatus, and output control apparatuses via a network, the program comprising:

for the image storing apparatus:
  code for a determining step of receiving access from the client via the Internet and determining whether the client can log into the image storing apparatus;
  code for a management step of receiving high-resolution image data and generating low-resolution image data based on the received image data, and managing each image data stored in storing means, if the determining step determines that the client can log into the image storing apparatus; and
  code for a controlling step, responsive to a request from an output control apparatus, which is different from the client, via the Internet, of controlling data transmission such that high-resolution image data corresponding to the image data designated by the request is transmitted to the output control apparatus, for the image control apparatus:
  code for a receiving step of receiving a client order including editing information generated by editing image data from the client via the Internet;
  code for a determining step of determining an output destination of the output control apparatuses in accordance with the client order received in the receiving step; and
  code for an output control step of generating a print order by accessing an image server with high-resolution image data based on an image ID designated by the client order, and for sending the print order to the output destination of the control apparatuses determined in the determining step,
    wherein the print order is not directly printed and final print data to be directly printed is generated based on the print order generated in the order control step, and for each of the output control apparatuses:
  code for a receiving step of receiving the print order including the editing information from the image control apparatus via the Internet;
  code for an obtaining step of obtaining high-resolution image data via the Internet based on an image ID designated by the print order; and
  code for an editing step of editing the image data obtained in the obtaining step in accordance with the editing information, and generating output data to be directly printed.

105. A program (stored in a storage medium) for controlling a print system connected to a client, an image control apparatus, and output control apparatuses via a network, the program comprising:

for the image control apparatus:
  code for a storing step of storing image data of a plurality of resolutions;
  code for a controlling step, responsive to a request from the client, of controlling to transmit image data of a low resolution to the client, and, responsive to a request from an output control apparatus, of controlling to transmit image data of a high resolution corresponding to the image data of the low resolution to the output control apparatus;
  code for a receiving step of receiving a client order including editing information generated by editing image data from the client via the Internet;
  code for a determining step of determining an output destination of the output control apparatuses in accordance with the client order received in the receiving step; and
  code for an order control step of generating a print order by accessing an image server with high-resolution image data based on an image ID designated by the client order, and for sending the print order to an output destination of the control apparatuses determined in the determining step,
    wherein the print order is not directly printed and final print data to be directly printed is generated based on the print order generated in the order control step, and for each of the output control apparatuses:
  code for a receiving step of receiving the print order including the editing information from the image control apparatus;
  code for an obtaining step of obtaining high-resolution image data via the Internet based on an image ID designated by the print order; and
  code for an editing step of editing the image data obtained in the obtaining step in accordance with the editing information, and generating output data to be directly printed.

106. An image control apparatus comprising:

receiving means for receiving editing information of image data stored in an image storing apparatus from a client;

determining means for determining an output destination of output control apparatuses in accordance with the editing information received by said receiving means;

outputting means for outputting a print order corresponding to the editing information to the output destination of the control apparatuses determined by said determining means; and managing means for storing and managing identification information of the output control apparatuses and image data stored in the output control apparatuses,
  wherein said determining means determines as the output destination the output control apparatus having a largest amount of image data designated by the editing information, in accordance with the identification information stored and managed by said managing means.

107. An image control apparatus comprising:

receiving means for receiving editing information of image data stored in an image storing apparatus from a client;

determining means for determining an output destination of output control apparatuses in accordance with the editing information received by said receiving means;

outputting means for outputting a print order corresponding to the editing information to the output destination of the control apparatuses determined by said determining means; and instructing means for instructing the image storing apparatus to transmit image data not stored in the output control apparatus determined as the output destination by said determining means, to the output control apparatus.

108. An image control apparatus comprising:

receiving means for receiving editing information of image data stored in an image storing apparatus from a client;

determining means for determining an output destination of output control apparatuses in accordance with the editing information received by said receiving means;

outputting means for outputting a print order corresponding to the editing information to the output destination of the control apparatuses determined by said determining means; and managing means for storing and managing identification information of the output control apparatuses and image data stored in the output control apparatuses,
wherein said managing means stores and manages the identification information in the unit of a plurality of tiles divided from each set of image data.

109. An image storing apparatus connected to a client and an output control apparatus via a network, comprising:

storing means for storing image data of a plurality of resolutions for each set of image data; and controlling means responsive to a request from the client for controlling to transmit image data of a low resolution to the client and for controlling to transmit image data of a high resolution corresponding to the image data of the low resolution to the output control apparatus,
wherein said controlling means controls to transmit image data in the unit of a tile to the client or to the output control apparatus.

110. An image storing apparatus connected to a client and an output control apparatus via a network, comprising:

storing means for storing image data of a plurality of resolutions for each set of image data;

controlling means responsive to a request from the client for controlling to transmit image data of a low resolution to the client and for controlling to transmit image data of a high resolution corresponding to the image data of the low resolution to the output control apparatus;

registering means for registering externally input image data in said storing means; and notifying means for comparing a memory amount permitted to an external apparatus transmitted image data with the image data, during a registration process by said registering means, and notifying a comparison result to the external apparatus.

111. An image storing apparatus according to claim 110, wherein if an instruction of increasing the memory amount is received from the external apparatus, the memory amount permitted to the external apparatus is increased.

112. An image control method comprising:

a receiving step of receiving editing information of image data stored in an image storing apparatus from a client;

a determining step of determining an output destination of output control apparatuses in accordance with the editing information received at said receiving step;

an outputting step for outputting a print order corresponding to the editing information to the output destination of the control apparatuses determined by said determining step; and a managing step of storing and managing identification information of the output control apparatuses and image data stored in the output control apparatuses
wherein said determining step determines as the output destination the output control apparatus having a largest amount of image data designated by the editing information, in accordance with the identification information stored and managed by said managing step.

113. An image control method comprising:

a receiving step of receiving editing information of image data stored in an image storing apparatus from a client;

a determining step of determining an output destination of output control apparatuses in accordance with the editing information received at said receiving step;

an outputting step for outputting a print order corresponding to the editing information to the output destination of the control apparatuses determined by said determining step; and an instructing step of instructing the image storing apparatus to transmit image data not stored in the output control apparatus determined as the output destination by said determining step, to the output control apparatus.

114. An image control method comprising:

a receiving step of receiving editing information of image data stored in an image storing apparatus from a client;

a determining step of determining an output destination of output control apparatuses in accordance with the editing information received at said receiving step;

an outputting step of outputting a print order corresponding to the editing information to the output destination of the control apparatuses determined by said determining step; and a managing step of storing and managing identification information of the output control apparatuses and image data stored in the output control apparatuses,
wherein said managing step stores and manages the identification information in a unit of a plurality of tiles divided from each set of image data.

115. A method of controlling an image storing apparatus connected to a client and an output control apparatus via a network, comprising:

a storing step of storing image data of a plurality of resolutions for each set of image data; and a controlling step, responsive to a request from the client, of controlling to transmit image data of a low resolution to the client and of controlling to transmit image data of a high resolution corresponding to the image data of the low resolution to the output control apparatus,
wherein said controlling step controls to transmit image data in a unit of a tile to the client or to the output control apparatus.

116. A method of controlling an image storing apparatus connected to a client and an output control apparatus via a network, comprising:

a storing step of storing image data of a plurality of resolutions for each set of image data;

a controlling step, responsive to a request from the client, of controlling to transmit image data of a low resolution to the client and of controlling to transmit image data of a high resolution corresponding to the image data of the low resolution to the output control apparatus;

a registering step of registering externally input image data in said storing means; and a notifying step of comparing a memory amount permitted to an external apparatus transmitted image data with the image data, during a registration process at said registering step, and notifying a comparison result to the external apparatus.

117. A method according to claim 116, wherein if an instruction of increasing the memory amount is received from the external apparatus, the memory amount permitted to the external apparatus is increased.

118. A program (stored in a storage medium) for controlling an image control method, the program comprising:

a receiving step of receiving editing information of image data stored in an image storing apparatus from a client;

a determining step of determining an output destination of output control apparatuses in accordance with the editing information received at said receiving step;

an outputting step for outputting a print order corresponding to the editing information to the output destination of the control apparatuses determined by said determining step; and a managing step of storing and managing identification information of the output control apparatuses and image data stored in the output control apparatuses, wherein said determining step determines as the output destination the output control apparatus having a largest amount of image data designated by the editing information, in accordance with the identification information stored and managed by said managing step.

119. A program (stored in a storage medium) for controlling an image control method, the program comprising;

a receiving step of receiving editing information of image data stored in an image storing apparatus from a client;

a determining step of determining an output destination of output control apparatuses in accordance with the editing information received at said receiving step;

an outputting step for outputting a print order corresponding to the editing information to the output destination of the control apparatuses determined by said determining steps; and an instructing step of instructing the image storing apparatus to transmit image data not stored in the output control apparatus determined as the output destination by said determining step, to the output control apparatus.

120. A program (stored in a storage medium) for controlling an image control method, the program comprising:

a receiving step of receiving editing information of image data stored in an image storing apparatus from a client;

a determining step of determining an output destination of output control apparatuses in accordance with the editing information received at said receiving step;

an outputting step for outputting a print order corresponding to the editing information to the output destination of the control apparatuses determined by said determining step; and a managing step of storing and managing identification information of the output control apparatuses and image data stored in the output control apparatuses, wherein said managing step stores and manages the identification information in a unit of a plurality of tiles divided from each set of image data.

121. A program (stored in a storage medium) for controlling an image storing apparatus connected to a client and an output control apparatus via a network, the program comprising:

a storing step of storing image data of a plurality of resolutions for each set of image data; and a controlling step, responsive to a request from the client, of controlling to transmit image data of a low resolution to the client and of controlling to transmit image data of a high resolution corresponding to the image data of the low resolution to the output control apparatus, wherein said controlling step controls to transmit image data in the unit of a tile to the client or to the output control apparatus.

122. A program (stored in a storage medium) for controlling an image storing apparatus connected to a client and an output control apparatus via a network, the program comprising:

a storing step of storing image data of a plurality of resolutions for each set of image data;

a controlling step, responsive to a request from the client, of controlling to transmit image data of a low resolution to the client and of controlling to transmit image data of a high resolution corresponding to the image data of the low resolution to the output control apparatus;

a registering step of registering externally input image data in said storing means; and a notifying step of comparing a memory amount permitted to an external apparatus transmitted image data with the image data, during a registration process at said registering step, and notifying a comparison result to the external apparatus.

123. A program according to claim 122, wherein if an instruction of increasing the memory amount is received from the external apparatus, the memory amount permitted to the external apparatus is increased.

124. A program (stored in a storage medium) for controlling an information processing apparatus connected to an image storing apparatus storing image data via a network, the program comprising:

a registration instructing step of transmitting an instruction of registering image data in the image storing apparatus;

a receiving step of receiving image data of a low resolution corresponding to the image data registered in the image storing apparatus;

an editing step of editing the received image data;

a print requesting step of instructing an external apparatus to print editing information representative of the contents edited at said editing step, excepting the image data; and a displaying step of displaying, when image data is registered in response to an instruction supplied at said registration instructing step and a notice of insufficient memory amount is received from the image storing apparatus, this effect.

125. A program (stored in a storage medium) for controlling an information processing apparatus connected to an image storing apparatus storing image data via a network, the program comprising:

a registration instructing step of transmitting an instruction of registering image data in the image storing apparatus;

a receiving step of receiving image data of a low resolution corresponding to the image data registered in the image storing apparatus;

an editing step of editing the received image data;

a print requesting step of instructing an external apparatus to print editing information representative of the contents edited at said editing step, excepting the image data; and an instructing step of instructing, when image data is registered in response to an instruction issued at said registration instructing step and a notice of insufficient memory amount is received from the image storing apparatus, whether or not the memory amount is increased, wherein if said instructing step instructs to increase the memory amount in the image storing apparatus assigned to the information processing apparatus, this effect is notified to the image storing apparatus.

* * * * *

UNITED STATES PATENT AND TRADEMARK OFFICE
CERTIFICATE OF CORRECTION

PATENT NO. : 6,330,068 B1
DATED : December 11, 2001
INVENTOR(S) : Yoichi Matsuyama It is certified that error appears in the above-identified patent and that said Letters Patent is hereby corrected as shown below:

Column 1,
Line 36, "print" should read -- prints --.

Column 2,
Line 21, "while" should read -- which --.

Column 11,
Line 56, "t he" should read -- the --.

Column 24,
Line 65, "IN DEX" should read -- INDEX --.

Column 25,
Line 29, "th e" should read -- the --;
Line 34, "not" should read -- not free. --.

Column 26,
Line 50, "Further more," should read -- Furthermore, --.

Column 27,
Line 22, "what" should read -- that --.

Column 40,
Line 11, "steps," should read -- step, --;
Line 42, "and" should read -- and, --.

Column 45,
Line 22, "high-resolution" should read -- high-resolution --.

Signed and Sealed this

Seventh Day of May, 2002

Attest:

Attesting Officer

JAMES E. ROGAN
Director of the United States Patent and Trademark Office